United States Patent [19]

Itoh et al.

[11] Patent Number: 5,197,008
[45] Date of Patent: Mar. 23, 1993

[54] SYSTEM FOR CONTROLLING THE OUTPUT POWER OF A MOTOR VEHICLE

[75] Inventors: Masayoshi Itoh, Okazaki; Kiichi Yamada, Nagoya; Hiroaki Yoshida, Okazaki; Katsunori Ohtake, Nagoya; Yasunobu Miyata, Komaki; Masayuki Hashiguchi, Ohbu; Masanori Tani, Okazaki; Keiji Isoda, Nagoya; Toshio Shigehara, Okazaki; Hiroo Yuasa, Nagoya, all of Japan

[73] Assignee: Mitsubishi Jidosha Kokyo Kabushiki Kaisha, Tokyo, Japan

[21] Appl. No.: 645,828

[22] Filed: Jan. 25, 1991

[30] Foreign Application Priority Data

Jan. 25, 1990 [JP] Japan .................................. 2-13553
Jan. 30, 1990 [JP] Japan .................................. 2-17821
Jan. 30, 1990 [JP] Japan .................................. 2-17828
May 16, 1990 [JP] Japan ................................ 2-124280
May 16, 1990 [JP] Japan ................................ 2-124293
May 18, 1990 [JP] Japan ................................ 2-127011

[51] Int. Cl.$^5$ .................................................. B60K 31/12
[52] U.S. Cl. ................................. 364/426.01; 180/197; 180/282; 364/431.03
[58] Field of Search ................... 364/424.05, 426.01, 364/426.02, 426.03, 426.04, 431.03, 431.07, 426.04; 180/197, 282, 179

[56] References Cited

U.S. PATENT DOCUMENTS

| 4,319,221 | 3/1982 | Sakoe | 340/146.3 |
| 4,326,101 | 4/1982 | Sakoe | 179/1 SD |
| 4,467,437 | 8/1984 | Tsuruta et al. | 364/513.5 |
| 4,484,348 | 11/1984 | Shizuno | 382/48 |
| 4,528,688 | 7/1985 | Ichikawa et al. | 381/43 |
| 4,530,110 | 7/1985 | Nojiri et al. | 381/43 |
| 4,559,604 | 12/1985 | Ichikawa et al. | 364/513.5 |
| 4,624,011 | 11/1986 | Watanabe et al. | 381/43 |
| 4,637,487 | 1/1987 | Itoh et al. | 180/197 |
| 4,651,289 | 3/1987 | Maeda et al. | 364/513.5 |
| 4,716,593 | 12/1987 | Hirai et al. | 381/42 |
| 4,723,290 | 2/1988 | Watanabe et al. | 381/43 |
| 4,731,845 | 3/1988 | Matsuki et al. | 381/43 |
| 4,745,562 | 5/1988 | Prazdny | 364/551 |
| 4,752,957 | 6/1988 | Maeda | 381/42 |
| 4,763,262 | 8/1988 | Leiber | 364/426.03 |
| 4,773,099 | 9/1988 | Bokser | 382/14 |
| 4,783,806 | 11/1988 | Nakamura et al. | 381/43 |
| 4,794,539 | 12/1988 | Wallentowitz et al. | 364/426.01 |
| 4,809,183 | 2/1989 | Eckert | 364/426.02 X |
| 4,866,618 | 9/1989 | Tamura et al. | 364/426.02 X |
| 4,876,731 | 10/1989 | Loris et al. | 382/40 |
| 4,893,255 | 1/1990 | Tomlinson, Jr. | 364/513 |
| 4,897,811 | 1/1990 | Scofield | 364/900 |
| 4,933,856 | 6/1990 | Leiber | 364/426.01 |
| 4,933,857 | 6/1990 | Hashiguchi et al. | 364/426.02 |
| 4,946,015 | 8/1990 | Browalski et al. | 364/426.03 X |
| 4,985,837 | 1/1991 | Togai et al. | 364/426.02 |
| 4,985,838 | 1/1991 | Hashiguchi et al. | 364/426.02 |
| 5,019,989 | 5/1991 | Ueda et al. | 364/431.03 X |
| 5,041,978 | 8/1991 | Nakayama et al. | 364/426.03 |
| 5,051,908 | 9/1991 | Shiraishi | 364/426.02 |
| 5,096,015 | 3/1992 | Akishino et al. | 180/179 |

OTHER PUBLICATIONS

"Empirically Guided Software Development Using Metric-Based Classification Trees", Porter et al., IEEE Software, Mar. 1990, pp. 46–54.

(List continued on next page.)

Primary Examiner—Parshotam S. Lall
Assistant Examiner—Collin W. Park

[57] ABSTRACT

A motor vehicle output power control system quickly reduces the drive torque produced by an engine on a motor vehicle depending on the magnitude of a lateral acceleration which is produced when the motor vehicle makes a turn, or the amount by which drive wheels slips when the motor vehicle is accelerated. A target drive torque depending on the lateral acceleration and a demanded drive torque demanded by the driver of the motor vehicle are added at a predetermined ratio into a turn target drive torque, which is selected as a final target drive torque. The motor vehicle output power control system includes an electronic control unit for controlling an actuator to lower the output drive torque of the engine, independent from controlling action of the driver, such that the output drive torque of the engine is equalized to the final target drive torque.

24 Claims, 38 Drawing Sheets

OTHER PUBLICATIONS

"Change Management for Very Large Software Systems", Maarek et al., Seventh Ann. Int'l Phoenix Conf. on Computers & Comm., Scottsdale, Ariz., Mar. 1988, pp. 280-285.

"Information Distribution Aspects of Design Methodology", Parnas, Information Processing 71, North-Holland Publishing Company (1972), pp. 339-344.

Paper entitled "On the Criteria To Be Used In Decomposing Systems Into Modules", by Parnas.

Ada 9X Program Structure and Compilation Issues, Draft Mapping Document, Feb. 21, 1991, pp. 10-1-1-0-5.

"Software Change Dynamics or Half of all Ada Compilations are Redundant", Adams et al., Univ. of Karlsruhe, Karlsruhe, FRG, Jun. 8, 1989, pp. 1-15.

"System Structure Analysis: Clustering with Data Bindings", Hutchens et al., IEEE Transactions on Software Eng., vol. SE-11, No. 8, Aug. 1985, pp. 749-757.

"System Partitioning and Its Measure", Belady et al., The Journal of Systems & Software 2, 23-29 (1981), Elsevier North Holland, Inc., 1981, pp. 23-29.

"Features of Similarity", Tversky, Psychological Review, vol. 84, No. 4, Jul. 1977, pp. 327-351.

"A Parallel Network that Learns to Play Backgammon", Tesauro et al., Artificial Intelligence 39 (1989), pp. 357-390.

"Modularization and Hierarchy in a Family of Operating Systems", Habermann et al., Communications of the ACM, May 1976, vol. 19, No. 5, pp. 266-272.

"Version Management in Gypsy", Cohen et al., Proceedings of the ACM SIGSOFT/SIGPLAN . . . , Boston, Mass., Nov. 28-30, 1988, pp. 201-215.

"Error Localization During Software Maintenance: Generating Hierarchical System Descriptions from the Source Code Alone", Selby et al., Conference on Software Maintenance-1988, Phoenix, Ariz., Oct. 24-27, 1988, pp. 192-197.

"Extracting and Restructuring the Design of Large Systems", Choi et al., IEEE Software, Jan. 1990, pp. 66-71.

Article entitled "Tools for Software Configuration Management" by Tichy.

"Configuration Management, The Notion and the Tools", Estublier, Proceedings of the International Workshop on Software Version and Configuration Control, Jan. 27-29, 1988 Grassau, pp. 38-61.

"Program-Variations-in-the-Small", Winkler et al., Proceedings of the International Workshop on Software Version and Configuration Control, Jan. 27-29, 1988 Grassau, pp. 175-196.

"Learning Internal Representations by Error Propagation", Rumelhart, pp. 318-362.

"A Taxonomy of Some Principal Types of Data and of Multidimensional Methods for Their Analysis", Shepard, pp. 21-47.

"Programming-in-the-Large Versus Programming-in-the-Small", DeRemer et al., IEEE Transactions on Software Engineering, vol. SE-2, No. 2, Jun. 1976, pp. 80-86.

"The C Information Abstraction System", Chen et al., IEEE Transactions on Software Engineering, vol. 16, No. 3, Mar. 1990, pp. 325-334.

"Configuration Management in BiiN TM SMS", Schwanke et al.

"A Method for Improving the Classification Speed of Clustering Algorithms Which Use a Euclidean Distance Metric", Curle et al., Proceedings of the IEEE, vol. 69, No. 1, Jan. 1981, pp. 128-129.

| GEARS | $\rho_{KI}$ | $\rho_{KP}$ | $\rho_T$ |
|---|---|---|---|
| 1ST | 1.0 | 1.0 | 1.0 |
| 2ND | 0.7 | 0.7 | 1.5 |
| 3RD | 0.7 | 0.7 | 1.5 |
| 4TH | 0.7 | 0.7 | 1.5 |
| REVERSE | 1.0 | 1.0 | 1.0 |

SYSTEM FOR CONTROLLING THE OUTPUT POWER OF A MOTOR VEHICLE

BACKGROUND OF THE INVENTION

The present invention relates to a system for controlling the output power of a motor vehicle such as an automobile, for example.

Road conditions abruptly vary from time to time while a motor vehicle is running, or a motor vehicle often runs on slippery road surfaces with low coefficients of friction, such as snow- or ice-covered roads. In such cases, the drive wheels of the motor vehicle are apt to spin, making it difficult for the driver to control the motor vehicle.

One practical way of getting the motor vehicle under control in such conditions is for the driver to adjust the depression of the accelerator pedal for controlling the output power of the engine so that the drive wheels do not spin. However, even highly skilled drivers find it difficult to make fine accelerator pedal adjustments while driving.

While a motor vehicle is making a turn, the motor vehicle is subjected to a centrifugal force corresponding to the lateral acceleration which acts in a direction perpendicular to the direction of travel of the motor vehicle. If the speed of the motor vehicle is too high with respect to the turning circle, then the motor vehicle will slip laterally under the centrifugal force that exceeds the gripping force of the tires.

In order to drive the motor vehicle safely with a turning radius corresponding to the turning circle while lowering the output power of the engine, the driver is required to be highly adept at driving particularly if the end of the turning circle cannot be confirmed or the radius of curvature of the turning circle is progressively smaller.

When a general motor vehicle with an understeer response makes a turn, the steering angle of the steered wheels has to be progressively increased as the lateral acceleration on the motor vehicle increases. If the lateral acceleration exceeds a certain value inherent in the motor vehicle, the steering angle is greatly increased, making it difficult or impossible to turn the motor vehicle safely. As is well known in the art, the above tendency is greater with front-engine front-drive motor vehicles which have a stronger understeer response.

There has been proposed a motor vehicle output power control system for detecting a spinning condition of a drive wheel of a motor vehicle and forcibly lowering the output power of the engine on the motor vehicle irrespective of the depression by the driver of the accelerator pedal if the driven wheel spins, or for detecting a lateral acceleration of a motor vehicle and forcibly lowering the output power of the engine on the motor vehicle irrespective of the depression by the driver of the accelerator pedal before a limit condition as indicated by the lateral acceleration, in which it is difficult or impossible to turn the motor vehicle safely, is reached. The driver can select a control mode in which the motor vehicle output control mode is in operation to control the output power of the engine, or a normal mode in which the output power of the engine is controlled solely depending on how deeply the accelerator pedal is depressed.

According to known principles of such a motor vehicle output control system, the rotational speeds of drive and driven wheels are detected with the difference between the detected rotational speeds being regarded as a slip of the drive wheel, and the drive torque produced by the engine is controlled depending on the slip, or the yaw rate of the motor vehicle is detected, and the drive torque produced by the engine is controlled depending on the yaw rate.

The yawing of the motor vehicle while it makes a sharp turn during high-speed travel becomes greater as the vehicle speed is higher and the turn is sharper. When the yaw rate of the motor vehicle is detected by a vibration sensor, an acceleration sensor, or the like, or when the yaw rate goes higher than a predetermined value, the drive torque of the engine is reduced.

For greater safety during a turn, a target drive torque may be established on the basis of a lateral acceleration which is detected, and the drive torque of the engine may be controlled to reach the target drive torque, irrespective of the depression of the accelerator pedal.

With the above motor vehicle turn control systems, since the drive torque is controlled on the basis of only detected conditions of the motor vehicle, the drivability of the motor vehicle may not be fully achieved. For example, even if the driver wants to accelerate the motor vehicle at the end of a turning circle, because the drive torque has been determined by the control system irrespective of the depression of the accelerator pedal, the driver's intention is not reflected.

It is not practical to entirely ignore the drive torque which is demanded by the driver during operation of the control system. In view of this, it may be possible to determine the drive torque demanded by the driver from the rotational speed of the engine and the accelerator opening. If the demanded drive torque is smaller than the target drive torque, then the demanded drive torque may be employed to control the engine, and if the demanded drive torque is larger than the target drive torque, then the target drive torque may be corrected according to the demanded drive torque.

However, the output signal from an accelerator opening sensor may not accurately represent the accelerator opening. The output signal from the accelerator opening sensor and the actual accelerator opening are proportional to each other, and the accelerator opening sensor is installed such that its output signals are constant when the accelerator is fully closed. When the accelerator opening sensor is detached and attached again for motor vehicle inspection, it is troublesome and virtually impossible to put the accelerator opening sensor exactly back into its original position. In addition, the accelerator opening sensor may be displaced in position over a long period of time.

Since the output signal from the accelerator opening sensor may not accurately represent the actual accelerator opening for the above reasons, the fully closed position of the accelerator should be detected from time to time in some way, and the detected accelerator opening should be corrected according to the fully closed position.

SUMMARY OF THE INVENTION

It is an object of the present invention to provide a motor vehicle output power control system which forcibly controls the output power of a motor vehicle and also reflects the intention of the driver for acceleration at times.

Another object of the present invention is to provide a motor vehicle output power control system which forcibly controls the output power of a motor vehicle and also varies a ratio at which the intention of the driver for acceleration is reflected, either with time or as the steering angle varies, for greater drivability.

Still another object of the present invention is to provide a motor vehicle output power control system which corrects accelerator opening information, which represents the intention of the driver for acceleration, into an accurate value for higher control reliability.

Yet another object of the present invention is to provide a motor vehicle output power control system which establishes a more accurate final target drive torque, as selected from a plurality of target drive torques, for greater motor vehicle safety.

According to the present invention, a system for controlling the output power of a motor vehicle having an engine, comprises torque control means, target drive torque calculating means, demanded drive torque calculating means, turn torque calculating means, selecting means, and electronic control means.

The torque control means can lower the drive torque of the engine independent from controlling action by the driver of the motor vehicle, and may comprise an actuator for actuating the throttle valve of the engine independent from an accelerator ink system coupled to the throttle valve.

The target drive torque calculating means calculates a target drive torque depending on a lateral acceleration of the motor vehicle. For example, a steering angle sensor detects an angle through which a steering shaft of the motor vehicle has turned, and a vehicle speed sensor detects a speed at which the motor vehicle runs. The target drive torque calculating means calculates the lateral acceleration of the motor vehicle based on detected signals from the steering angle sensor and the vehicle speed sensor.

The demanded drive torque calculating means calculates a demanded drive torque which is demanded by the driver. For example, an engine speed sensor detects a rotational speed of the engine, and an accelerator opening sensor detects an accelerator opening of the engine. The demanded drive torque calculating means calculates the demanded drive torque based on detected signals from the engine speed sensor and the accelerator opening sensor.

Alternatively the demanded drive torque calculating means may detect a fully closed accelerator position by a detected signal from the accelerator opening sensor, and may determine the demanded drive torque from an amount of accelerator operation based on the fully closed accelerator position and a detected signal from the engine speed sensor.

Alternatively, the demanded drive torque calculating means may detect a minimum value of a detected signal from the accelerator opening sensor and regard the minimum value as the fully closed position of the accelerator opening sensor while an idling switch is being turned on and a timer is counting a fixed period of time.

Furthermore, the demanded drive torque calculating means may comprise means for clipping the minimum value with upper and lower clip values, and means for comparing the clipped minimum value with a value corresponding to a previous fully closed position and establishing the previous fully closed position as it is shifted a predetermined value toward the minimum value, as a value corresponding to a preset fully closed position.

The torque calculating means determines the target drive torque depending on the lateral acceleration of the motor vehicle and the demanded drive torque, and adds these drive torques at a predetermined ratio into a turn target drive torque. For example, the predetermined ratio at which the drive torques are added may be varied with time after the output power of the motor vehicle has started to be controlled.

Alternatively, the proportion of the target drive torque may be reduced with time after the output power of the motor vehicle has started to be controlled, and the proportion of the demanded drive torque may be increased with time after the output power of the motor vehicle has started to be controlled.

The system may further include steering amount calculating means for calculating an amount by which the motor vehicle is steered, and the proportions of the target drive torque and the demanded drive torque may be varied depending on the amount by which the motor vehicle is steered.

Alternatively, the proportions of the target drive torque and the demanded drive torque may be varied, and the proportion of the turn target drive torque may be increased as the amount by which the motor vehicle is steered is increased.

The selecting means may select a smaller one of the turn target drive torque and the slip control target drive torque as the final target drive torque. The turn torque calculating means may calculate turn target drive torques for a plurality of roads having different coefficients of friction, and the selecting means may select each of the turn target drive torques and the slip control target drive torques, successively from a smaller one, as the final target drive torque.

The electronic control means controls the torque control means to equalize the drive torque produced by the engine to the final target drive torque.

Since the turn torque calculating means adds the target drive torque depending on the lateral acceleration and the demanded drive torque at the predetermined ratio into the turn target drive torque, the drive torque produced by the engine can be lowered independently of the action of the driver for allowing the motor vehicle to run safely and reliably along a turning circle or path. The demanded drive torque is added at the predetermined ratio in order to take into account the intention of the driver when necessary. Therefore, the acceleration capability of the motor vehicle at the exit end of the turning path can be improved with increased safety.

The proportion of the target drive torque can be increased as the amount by which the motor vehicle is steered is increased, so that the motor vehicle can make a safe turn.

The fully closed accelerator position is learned, and the accelerator opening is achieved with high accuracy at all times through an amount of accelerator operation which is based on the learned fully closed accelerator position. Thus, the demanded drive torque can accurately be calculated. Reduction of the control reliability due to time-dependent degradation of the accelerator opening sensor is therefore prevented from taking place.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
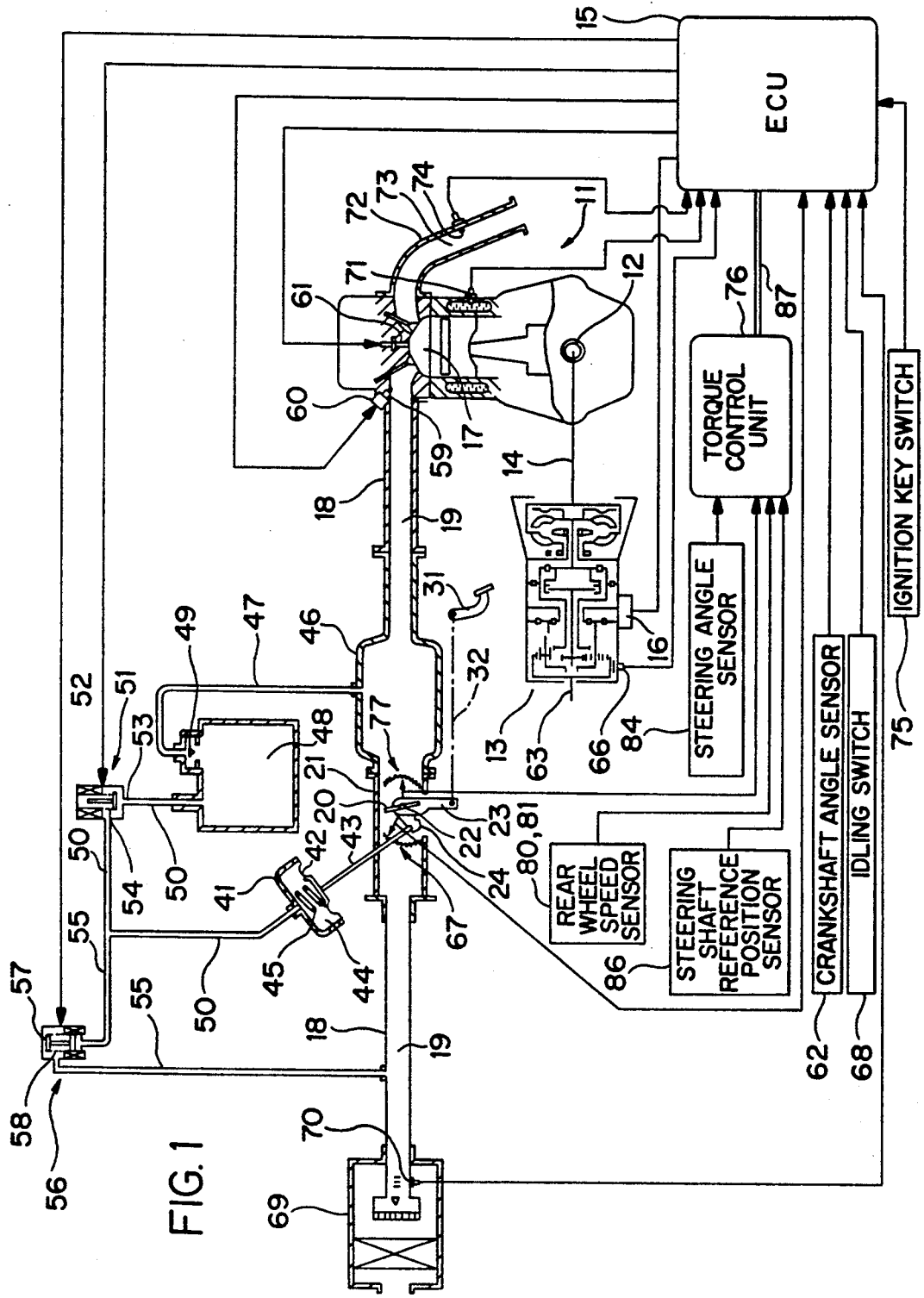
FIG. 1 is a block diagram, partly in cross section, of a motor vehicle output power control system according to an embodiment of the present invention.
Figure 2:
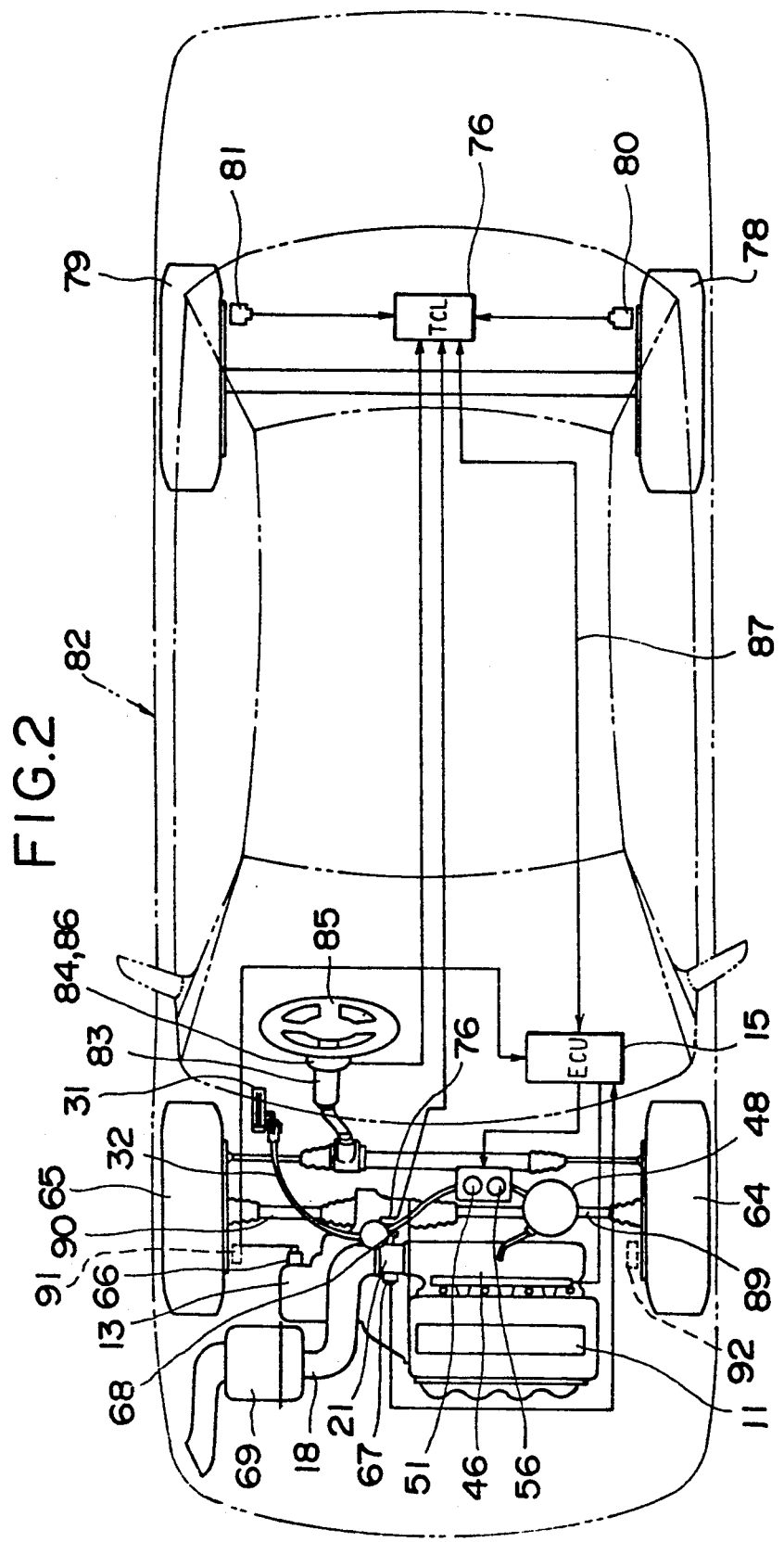
FIG. 2 is plan view of an automobile which incorporates the motor vehicle output power control system shown in FIG. 1.

FIG. 1 shows a motor vehicle output power control system according to an embodiment of the present invention, which is incorporated in a front-wheel-drive motor vehicle, such as an automobile, having an automatic transmission with four forward gear positions and one reverse gear position. The motor vehicle is schematically indicated at 82 in FIG. 2.

The motor vehicle has an internal combustion engine 11 whose output shaft 12 is connected to the input shaft 14 of a hydraulic automatic transmission 13. The hydraulic automatic transmission 13 is actuated to automatically select a gear position by a hydraulic control device 16 which is controlled by a control signal from an electronic control unit (ECU) 15 that controls operation of the engine 11 depending on the position of the gearshift (not shown) which is selected by the driver and also on operating conditions of the motor vehicle. The specific structure and operation of the hydraulic automatic transmission 13 are well known from Japanese Laid-Open Patent Publications Nos. 58(1983)-54270 and 61(1986)-31749, for example. The hydraulic control device 16 contains a pair of gearshift control solenoid-operated valves (not shown) for engaging and disengaging a plurality of frictional engaging elements of the hydraulic automatic transmission 13. The energization and de-energization of these gearshift control solenoid-operated valves are controlled by the ECU 15 for smoothly selecting one, at a time, of the four forward gear positions and the single reverse gear position.

Figure 3:
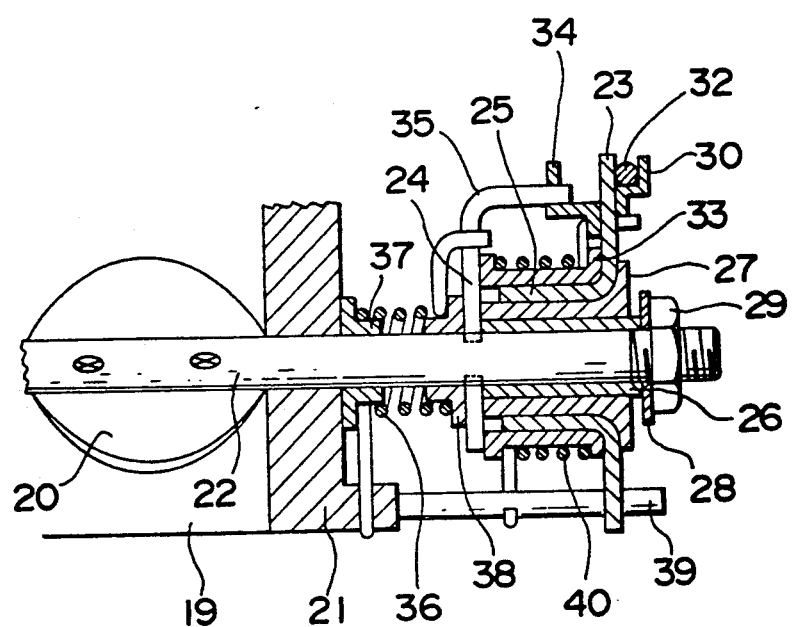
FIG. 3 is a cross-sectional view of an actuator mechanism for a throttle valve in the motor vehicle output power control system shown in FIG. 1.

The engine 11 has a plurality of, e.g., four, combustion chambers 17 (only one shown) each communicating with an intake pipe 18 which includes a throttle body 21 housing a throttle valve 20 for varying the opening of an intake passage 19 defined in the intake pipe 18 to regulate the rate of intake air to be supplied into the combustion chamber 17. As shown in FIGS. 1 and 3, the throttle valve 20 is fixed to a shaft 22 which is angularly movably supported at its opposite end in the throttle body 21. One end of the shaft 22 projects out of the intake pipe 18 and supports an accelerator lever 23 and a throttle lever 24 which are coaxially coupled to the shaft 22.

Between the shaft 22 and a tubular portion 25 of the accelerator lever 23, there are interposed a bushing 26 and a spacer 27 which allow the accelerator lever 23 to be rotatable around and with respect to the shaft 22. The accelerator lever 23 is retained on the shaft 22 against removal therefrom by a washer 28 and a nut 29 which are mounted on the projecting end of the shaft 22. The accelerator lever 23 has an integral cable retainer 30 to which an accelerator pedal 31 that can be depressed by the driver of the motor vehicle is connected through a cable 32. Therefore, the accelerator lever 23 is angularly movable about and with respect to the shaft 22 through an angle depending on the depression of the accelerator pedal 31.

The throttle lever 24 is fixed to the shaft 22 for rotation therewith, so that angular movement of the throttle lever 24 causes the shaft 22 to turn the throttle valve 20 about the axis of the shaft 22. A collar 33 is coaxially fitted over the tubular portion 25 of the accelerator lever 23. The throttle lever 24 has a stopper 35 on a radially outer end thereof for engaging a finger 34 on the collar 33. The finger 34 and the stopper 35 are mutually positioned such that they engage each other when the throttle lever 24 is turned in a direction to open the throttle valve 20 or the accelerator lever 23 is turned in a direction to close the throttle valve 20.

A torsion coil spring 36 acts between the throttle body 21 and the throttle lever 24 for normally urging the stopper 35 into pushing engagement with the finger 34 in order to open the throttle valve 20. The torsion coil spring 36 is coaxially disposed around the shaft 22 and supported on tubular spring supports 37, 38 fitted over the shaft 22. Another torsion coil spring 40 acts between a stopper pin 39 mounted on the throttle body 21 and the accelerator lever 23 for normally urging the finger 34 to be pressed against the stopper 35 in order to close the throttle valve 20, thereby biasing the accelerator pedal 31 as with a detent. The torsion coil spring 40 is disposed about the collar 33 on the tubular portion 25 in coaxial relation to the shaft 22.

To the radially outer end of the throttle lever 24 there is coupled an end of a control rod 43 fixed to a diaphragm 42 of an actuator 41. The actuator 41 has a pressure chamber 44 defined therein and housing a compression coil spring 45 which urges, in combination with the torsion coil spring 36, the stopper 35 to be pressed against the finger 34 in order to open the throttle valve 20. The spring force of the torsion coil spring 40 is selected to be larger than the combined spring force of the springs 36, 45, so that the throttle valve 20 cannot be opened unless the accelerator pedal 31 is depressed.

The intake passage 19 includes a surge tank 46 coupled to a downstream side of the throttle body 21. A vacuum tank 48 is connected through a joint pipe 47 to the surge tank 46. A check valve 49 for allowing air to flow only from the vacuum tank 48 to the surge tank 46 is disposed between the vacuum tank 48 and the joint pipe 47, thereby maintaining a vacuum pressure in the vacuum tank 48, which is approximately equal to the minimum pressure in the surge tank 46.

The interior of the vacuum tank 48 and the pressure chamber 44 of the actuator 41 are held in communication with each other through a pipe 50 which has a first torque control solenoid-operated valve 51 that is closed when de-energized. The first torque control solenoid-operated valve 51 has a plunger 52 which is normally urged against a valve seat 53 by a spring 54 thereby to close the pipe 50.

A pipe 55, communicating with the intake passage 19 upstream of the throttle valve 20, is connected to the pipe 50 between the first torque control solenoid-operated valve 51 and the actuator 41. The pipe 55 has a second torque control solenoid-operated valve 56 which is open when de-energized. The second torque control solenoid-operated valve 56 has a plunger 57 which is normally urged by a spring 58 to open the pipe 55.

The first and second torque control solenoid-operated valves 51, 56 are electrically connected to the ECU 15 which applies control signals to control the energization and de-energization, or the duty ratio, of these solenoid-operated valves 51, 56. The ECU 15 and the first and second torque control solenoid-operated valves 51, 56 jointly serve as a torque lowering section.

When the duty ratio of the torque control solenoid-operated valves 51, 56 is 0%, then the pressure in the pressure chamber 44 of the actuator 41 is the atmospheric pressure which is substantially the same as the pressure in the intake passage 19 upstream of the throttle valve 20. At this time, therefore, the opening of the throttle valve 20 is directly proportional to, or in one-to-one correspondence to, the depression of the accelerator pedal 31. When the duty ratio of the torque control solenoid-operated valves 51, 56 is 100%, the pressure in the pressure chamber 44 of the actuator 41 is a vacuum which is substantially the same as the pressure in the vacuum tank 48. The control rod 43 is pulled obliquely upward (FIG. 1), thereby closing the throttle valve 20 irrespective of the depression of the accelerator pedal 31, so that the drive torque produced by the engine 11 is forcibly reduced. By thus adjusting the duty ratio of the torque control solenoid-operated valves 51, 56, the opening of the throttle valve 20 can be varied regardless of the depression of the accelerator pedal 31, thereby adjusting the drive torque of the engine 11 as desired.

In this embodiment, the opening of the throttle valve 20 is controlled simultaneously by the accelerator pedal 31 and the actuator 41. However, two throttle valves may be disposed in series in the intake passage 19, one connected to only the accelerator pedal 31 and the other to only the actuator 41, so that the two throttle valves can be controlled independently.

The downstream end of the intake pipe 18 has as many fuel injection nozzles 59 as the number of cylinders (e.g., four cylinders) of the engine 11. The fuel injection nozzles 59 serve to inject fuel into the respective combustion chambers 17. Each of the fuel injection nozzles 59 is supplied with fuel through a solenoid-operated valve 60 whose duty ratio is controlled by the ECU 15. When the time during which the solenoid-operated valve 60 is open is controlled by the ECU 15, the rate of fuel to be supplied to the combustion chamber 17 is regulated to supply the fuel into the combustion chamber 17 at a desired air-fuel ratio. The fuel supplied into the combustion chamber 17 is ignited by a spark plug 61.

To the ECU 15, there are electrically connected a crankshaft angle sensor 62 attached to the engine 11 for detecting the rotational speed of the engine 11, a front wheel speed sensor 66 for detecting the rotational speed of the output shaft 63 of the hydraulic automatic transmission 13 to determine the average peripheral speed of a pair of front drive wheels 64, 65 of the motor vehicle 82, a throttle opening sensor 67 mounted on the throttle body 21 for detecting the opening of the throttle lever 24, an idling switch 68 mounted on the throttle body 21 for detecting a fully closed condition of the throttle valve 20, an air flow sensor 70, such as a Kármán vortex air flow sensor, disposed in an air cleaner 69 at the distal end of the intake passage 18 for detecting the rate of air flowing into the combustion chambers 17 of the engine 11, a coolant temperature sensor 71 attached to the engine 11 for detecting the temperature of a coolant in the engine 11, an exhaust temperature sensor 74 mounted on an exhaust pipe 72 for detecting the temperature of exhaust gases flowing through an exhaust passage 73 defined in the exhaust pipe 72, and an ignition key switch 75 for detecting when the engine 11 starts operating. Instead of the front wheel speed sensor 66, there may be employed front wheel speed sensors 91, 92 (indicated by the dot-and-dash lines in FIG. 2) for detecting the respective rotational speeds of the front wheels 64, 65, and the average peripheral speed of the front wheels 64, 65 may be calculated from rotational speeds detected by the front wheel speed sensors 91, 92.

Output signals from the crankshaft angle sensor 62, the front wheel speed sensor 66, the throttle opening sensor 67, the idling switch 68, the air flow sensor 70, the coolant temperature sensor 71, the exhaust temperature sensor 74, and the ignition key switch 75 are supplied to the ECU 15.

To a torque calculating unit (TCL) 76 for calculating a target drive torque for the engine 11, there are connected an accelerator opening sensor 77 mounted on the throttle body 21 for detecting the opening of the accelerator lever 23, a pair of rear wheel speed sensors 80, 81 for detecting the rotational speeds of respective rear driven wheels 78, 79 of the motor vehicle 82, a steering angle sensor 84 for detecting the angle through which a steering shaft 83 is turned from a reference angular position in which the motor vehicle 82 runs straight, and a steering shaft reference position sensor 86 for detecting a normal phase, in each 360° turn, of a steering wheel 85 integral with the steering shaft 83 (the reference angular position in which the motor vehicle 82 runs straight is one such normal phase). Output signals from these sensors 77, 80, 81, 84, 86 are applied to the TCL 76.

The ECU 15 and the TCL 76 are connected to each other through a communication cable 87. The ECU 15 transmits, over the communication cable 87, information about operating conditions of the engine 11, such as the engine speed, the rotational speed of the output shaft 73 of the hydraulic automatic transmission 13, the detected signal from the idling switch 68, etc., to the TCL 76. The TCL 76 sends, over the communication cable 87, information relative to a target drive torque calculated by the TCL 76 and a retard ratio of ignition timing, to the ECU 15.

The TCL 76 calculates a target drive torque for the engine 11 in a slip control process in which the drive torque produced by the engine 11 is reduced for maintaining maneuverability and preventing an energy loss when an amount of slip of the front drive wheels 64, 65 in the longitudinal direction of the motor vehicle 82 exceeds a predetermined level, and also calculates a target drive torque for the engine 11 in a turn control process in which the drive torque produced by the engine 11 is reduced to prevent the motor vehicle 82 from running off a desired turning circle or path when a lateral acceleration applied transversely to the motor vehicle 82 during a turn exceeds a predetermined level. The TCL 76 selects an optimum final target drive torque from the target drive torques thus calculated, and reduces the drive torque produced by the engine 11 based on the selected optimum final target drive torque. Therefore, the TCL 76 serves as a slip torque calculating section, a turn torque calculating section, and a selecting section. Taking into account the fact that the output power or torque of the engine 11 may not be reduced quickly enough when the throttle valve 20 is fully closed through the throttle actuator 41 the TCL 76 also establishes a target retard for ignition timing in order to quickly lower the drive torque produced by the engine 11.

Figure 4A:
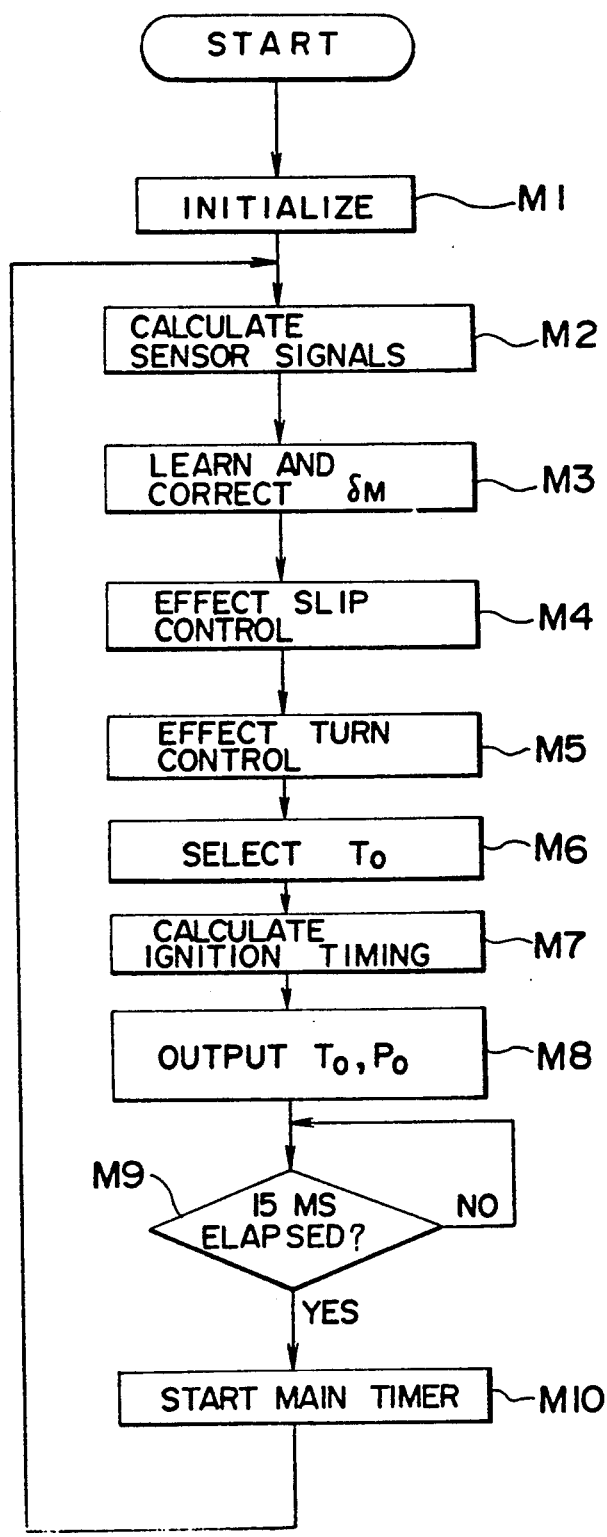
FIGS. 4[A] and 4[B] are flowcharts of different control sequences of the motor vehicle output power control system.
Figure 4B:
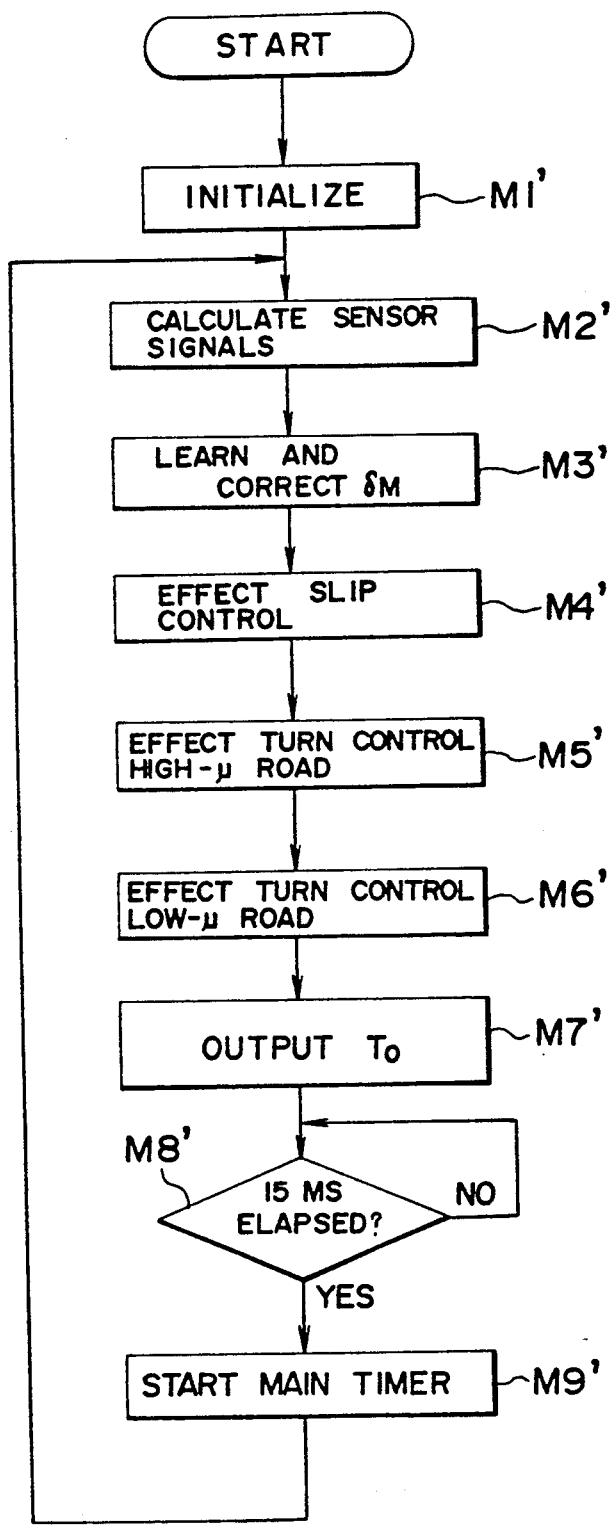

FIG. 4[A] shows a sequence of the above control processes. The TCL 76 simultaneously calculates a target drive torque $T_{OS}$ (slip control target drive torque) for the engine 11 in the slip control process and target drive torque $T_{OC}$ (turn control target drive torque) for the engine 11 in the turn control process, selects an optimum final target drive torque $T_O$ from the above two target drive torques $T_{OS}$, $T_{OC}$, and lowers the drive torque of the engine 11 as necessary.

More specifically, the sequence shown in FIG. 4[A] is started when the ignition key switch 75 is turned on. First, an initial angular position $\delta_{m(o)}$ of the steering shaft is read and various flags are reset or a main timer starts counting a sampling period of 15 milliseconds in an initializing step M1.

Then, the TCL 76 calculates a vehicle speed V and other values based on detected signals from the various sensors in a step M2, and a neutral position $\delta_M$ of the steering shaft 83 is learned and corrected in a step M3. The neutral position $\delta_M$ of the steering shaft 83 is not stored in memories (not shown) in the ECU 15 and the TCL 76. Therefore, each time the ignition key switch 75 is turned on, the initial position $\delta_{m(o)}$ is read, and learned and corrected only when the motor vehicle 82 satisfies straight running conditions (described later on). The initial position $\delta_{m(o)}$ is learned and corrected until the ignition key switch 75 is turned off.

The TCL 76 then calculates, in a step M4, a target drive torque $T_{OS}$ for the engine 11 in the slip control process in which the drive torque produced by the engine 11 is limited on the basis of a detected signal from the front wheel speed sensor 66 and detected signals from the rear wheel speed sensors 80, 81. The TCL 76 also calculates, in a step M5, a target drive torque $T_{OC}$ for the engine 11 in the turn control process in which the drive torque produced by the engine 11 is limited on the basis of detected signals from the rear wheel speed sensors 80, 81 and a detected signal from the steering angle sensor 84.

In a step M6, the TCL 76 selects an optimum final target drive torque $T_O$ from the calculated target drive torques $T_{OS}$, $T_{OC}$ primarily in consideration of safety, according to a process described later on. When the motor vehicle 82 starts to run abruptly or the road condition changes from an ordinary dry surface to an ice-covered surface, the output torque of the engine 11 may not be lowered quickly enough even if the throttle valve 20 is fully closed through the actuator 41. To cope with such a situation, the TCL 76 selects a retard ratio for correcting a basic retard $p_B$ based on a ratio of change $G_s$ of an amount of slip s of the front wheels 64, 65 in a step M7, and then transmits data relative to the final target drive torque $T_O$ and the retard ratio for correcting the basic retard $p_B$ to the ECU 15 in a step M8.

As shown in FIG. 4[B], the TCL 76 may also simultaneously calculate the target drive torque $T_{OS}$ for the engine in the slip control process, a target drive torque $T_{OH}$ for the engine 11 in the turn control process on a road surface having a high coefficient of friction such as a dry road surface (hereinafter referred to as a "high-μ road"), and a target drive torque $T_{OL}$ for the engine in the turn control process on a road surface having a low coefficient of friction such as an ice-covered or wet road surface (hereinafter referred to as a "low-μ road"), and select an optimum final target drive torque $T_O$ from these three target drive torques $T_{OS}$, $T_{OH}$, $T_{OL}$, so that the drive torque of the engine 11 can be lowered on the basis of the selected final target drive torque $T_O$. In the sequence shown in FIG. 4[B], the steps M5 through M7 shown in FIG. 4[A] are replaced with steps M5', M6'. More specifically, after the steps M1 through M4, the TCL 76 calculates a target drive torque $T_{OH}$ for the engine 11 in the turn control process on a high-μ road in the step M5', and then calculates a target drive torque $T_{OL}$ for the engine in the turn control process on a low-μ road in the step M6'. Thereafter, the TCL 27 selects in a step M7', an optimum final target drive torque $T_O$ from the target drive torques $T_{OS}$, $T_{OH}$, $T_{OL}$. The ECU 54 controls the duty ratio of the torque control solenoid-operated valves 51, 56 so that the drive torque produced by the engine 11 reaches the final target drive torque $T_O$, thus controlling the motor vehicle 82 to run safely.

When the driver positively selects the slip control process or the turn control process through a manual switch (not shown), the ECU 15 controls the duty ratio of the torque control solenoid operated valves 51, 56 so that the drive torque of the engine 11 reaches the final target drive torque $T_O$, calculates a target retard $p_O$ based on the retard ratio, and delays the ignition timing P by the target retard $p_O$, thereby controlling the motor vehicle 82 to run safely.

When the driver does not positively select the slip control process or the turn control process, the ECU 15 sets the duty ratio of the torque control solenoid-operated valves 51, 56 to 0%. The motor vehicle 82 is now driven with the output torque of the engine 11 being controlled solely depending on the depression of the accelerator pedal 31.

The drive torque produced by the engine 11 is continuously controlled until the sampling period of 15 milliseconds is counted down by the main timer in a step M9 (FIG. 4[A]) or a step M8' (FIG. 4[B]). Then, the main timer starts counting the sampling period again in a step M10 (FIG. 4[A]) or a step M9' (FIG. 4[B]). Thereafter, the steps M2 through M9 (FIG. 4[A]) or the steps M2' through M8' (FIG. 4[B]) are repeated until the ignition key switch 75 is turned off.

In the step M5 to calculate the target drive torque $T_{OC}$ for the engine in the turn control process, the TCL 76 calculates a vehicle speed V according to the equation (1), given below, based on detected signals from the rear wheel speed sensors 80, 81, a steering angle $\delta$ of the front wheels 64, 65 according to the equation (2), given below, based on a detected signal from the steering angle sensor 84, and a target lateral acceleration $G_{YO}$ for the motor vehicle 82 according to the equation (3), given below.

$$V = \frac{V_{RL} + V_{RR}}{2} \quad (1)$$

$$\delta = \frac{\delta_H}{\rho_H} \quad (2)$$

$$G_{YO} = \frac{\delta}{l \cdot \left(A + \frac{1}{V^2}\right)} \quad (3)$$

where $V_{RL}$, $V_{RR}$ are the peripheral speeds (hereinafter referred to as "rear wheel speeds") of the rear wheels 78, 79, $\rho_H$ the speed reduction ratio of the steering gears, $\delta_H$ the angle through which the steering shaft 83 is turned, l the wheelbase of the motor vehicle 82, and A the stability factor (described later on) of the motor vehicle 83.

As can be seen from the equation (3), if the neutral position $\delta_M$ of the steering shaft 83 varies due to adjustment of the toe-in of the front wheels 64, 65 when the motor vehicle 82 is serviced or due to aging such as wear on the steering gears (not shown), the angular position $\delta_m$ to which the steering shaft 82 is turned and the actual steering angle $\delta$ of the front wheels 64, 65 may differ from each other. As a result, the target acceleration $G_{YO}$ for the motor vehicle 82 may not accurately be calculated, and hence the turn control process may not be carried out well. Furthermore, since a reference drive torque for the engine 11 is corrected based on the angle $\delta_H$ through which the steering shaft 83 is turned, by a cornering drag correcting section (described later on) in the slip control process in the step M4, the slip control process may not be carried out well either. In view of the above consideration, the neutral position $\delta_M$ of the steering shaft 83 should be learned and corrected in the step M3.

Figure 5:
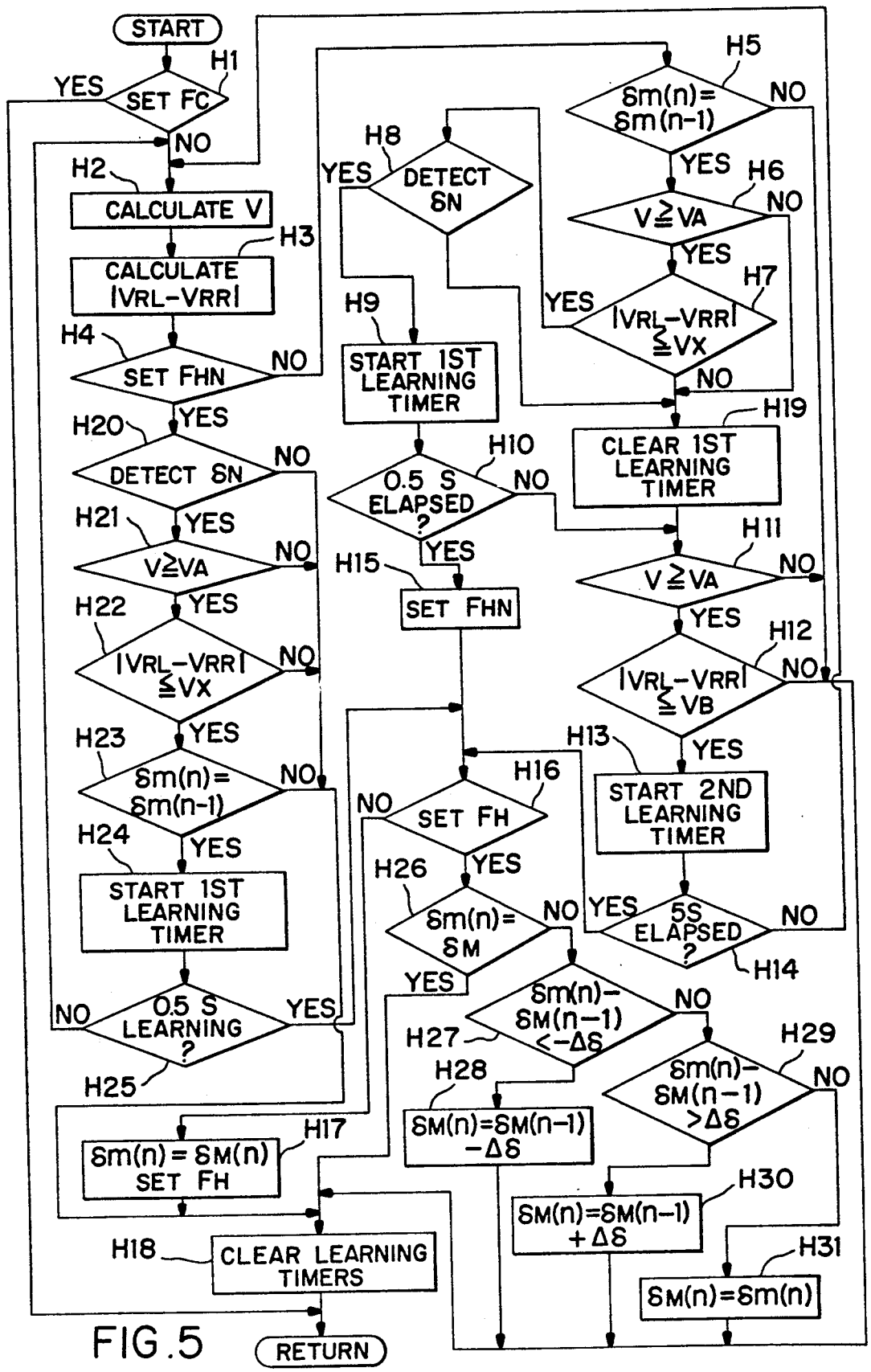
FIG. 5 is a flowchart of a process for learning and correcting a neutral position of a steering shaft.

A process for learning and correcting the neutral position $\delta_M$ of the steering shaft 83 is shown in FIG. 5. First, the TCL 76 determines whether a turn control flag $F_C$ is set or not in a step H1. If the turn control flag $F_C$ is set, indicating that the motor vehicle 83 is in the turn control process, then the TCL 76 does not learn and correct the neutral position $\delta_M$ of the steering shaft 83 since if the TCL 76 learned and corrected the neutral position $\delta_M$, the output power of the engine 11 would abruptly vary, lowering riding comfort.

If the motor vehicle 82 is determined not to be in the turn control process in the step H1, then since no trouble will arise if the neutral position $\delta_M$ of the steering shaft 83 is learned and corrected, the TCL 76 calculates a vehicle speed V according to the above equation (1) in a step H2 for the learning of the neutral position $\delta_H$ and the turn subsequent control process. Then, the TCL 76 calculates the difference $|V_{RL}-V_{RR}|$ (hereinafter referred to as a "rear wheel speed difference") between the rear wheel speeds $V_{RL}$, $V_{RR}$ in a step H3. Thereafter, the TCL 76 determines, in a step H4, whether the neutral position $\delta_M$ has been learned and corrected, with the reference position $\delta_N$ of the steering shaft 83 being detected by the steering shaft reference position sensor 86, i.e., whether a steering angle neutral position learned flag $F_{HN}$ has been set with the reference position $\delta_N$ of the steering shaft 83 being detected.

Immediately after the ignition key switch 75 is turned on, the steering angle neutral position learned flag $F_{HN}$ is not set. Therefore, since the neutral position $\delta_M$ is learned for a first time, the TCL 76 determines, in a step H5, whether a steering shaft angular position $\delta_{m(n)}$, which is presently calculated, is equal to a previously calculated steering shaft angular position $\delta_{m(n-1)}$ or not. In order to avoid the influence of minor oscillatory angular movements of the steering wheel 85 caused by the driver, the resolution of the steering angle sensor 84 to detect the angular movement of the steering shaft 83 should preferably be 5 degrees.

If the presently calculated steering shaft angular position $\delta_{m(n)}$ is equal to the previously calculated steering shaft angular position $\delta_{m(n-1)}$ in the step H5, then the TCL 76 determines whether or not the vehicle speed V is equal to or higher than a predetermined threshold value $V_A$ in a step H6. The decision step H6 is necessary because the rear wheel speed difference $|V_{RL}-V_{RR}|$ due to a steering action cannot be detected unless the motor vehicle 82 runs at a certain high speed. The threshold value $V_A$ may be experimentally set to 10 km/hour, for example, based on running characteristics of the motor vehicle 82.

If the vehicle speed V is equal to or higher than the threshold valve $V_A$ in the step H6, then the TCL 76 determines, in a step H7, whether or not the rear wheel speed difference $|V_{RL}-V_{RR}|$ is equal to or smaller than a predetermined threshold value $V_X$, e.g., 0.3 km/hour, i.e., whether the motor vehicle 82 runs straight or not. The threshold value $V_X$ is not set to 0 km/hour because if the air pressures in the tires of the rear wheels 78, 79 are not equal to each other, the peripheral speeds $V_{RL}$, $V_{RR}$ of the rear wheels 78, 79 differ from each other and the motor vehicle 82 may be determined not to run straight when it actually runs straight.

Figure 6:
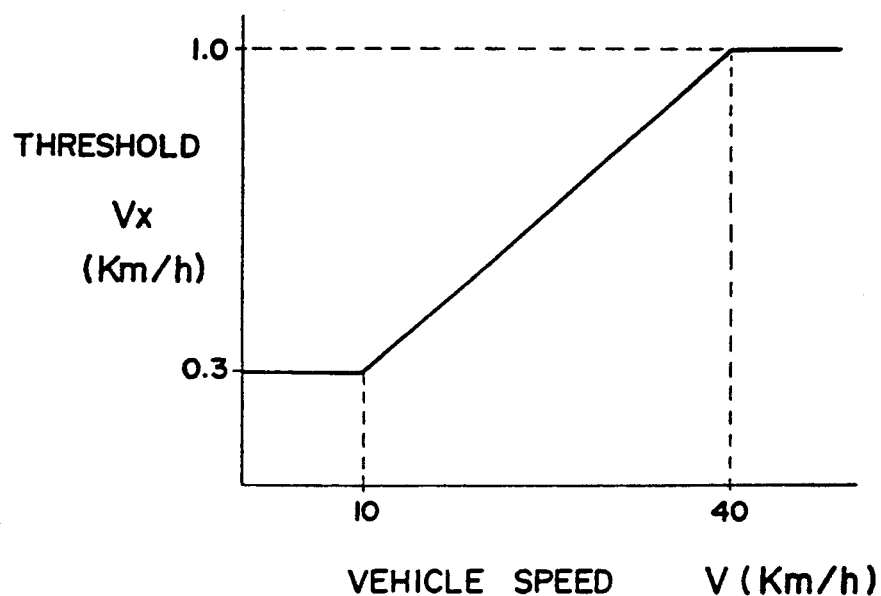
FIG. 6 is a graph showing the relationship between a vehicle speed and a variable threshold value.

If the air pressures in the types of the rear wheels 78, 79 are not the same as each other, then since the rear wheel speed difference $|V_{RL}-V_{RR}|$ tends to be greater in proportion to the vehicle speed V, a map of threshold values $V_X$ as shown in FIG. 6 may be employed, and a threshold value $V_X$ corresponding to the detected vehicle speed V may be read from the map of FIG. 6.

If the rear wheel speed difference $|V_{RL}-V_{RR}|$ is equal to or smaller than the threshold value $V_X$ in the step H7, then the TCL 76 determines, in a step H8, whether the steering shaft reference position sensor 86 is detecting the reference position $\delta_N$ of the steering shaft 83 or not. If the steering shaft reference position sensor 86 is detecting the reference position $\delta_N$ of the steering shaft 83, i.e., if the motor vehicle 82 is running straight, in the step H8, then a first learning timer (not shown) in the TCL 76 starts counting time in a step H9.

Thereafter, the TCL 76 determines, in a step H10, whether 0.5 second has elapsed from the start of the counting of the first learning timer, i.e., the motor vehicle 82 has been running continuously for 0.5 second or not. If 0.5 second has not elapsed from the start of the counting of the first learning timer, then the TCL 76 determines whether or not the vehicle speed V is equal to or higher than the threshold value $V_A$ in a step H11. If the vehicle speed V is equal to or higher than the threshold value $V_A$ in the step H11, then the TCL 76 determines, in a step H12, whether or not the rear wheel speed difference $|V_{RL}-V_{RR}|$ is equal to or smaller than a threshold value $V_B$, e.g., 0.1 km/hour. If the rear wheel speed difference $|V_{RL}-V_{RR}|$ is equal to or smaller than the threshold value $V_B$ in the step H12, i.e., if the motor vehicle 82 is running straight, then a second learning timer (not shown) in the TCL 76 starts counting time in a step H13.

Thereafter, the TCL 76 determines, in a step H14, whether 5 seconds have elapsed from the start of the counting of the second learning timer, i.e., the motor vehicle 82 has been running continuously for 5 seconds or not. If 5 seconds have not elapsed from the start of the counting of the second learning timer, then control goes back to the step H2, repeating the steps H2 through H14.

If 0.5 second has elapsed from the start of the counting of the first learning timer, i.e., if the motor vehicle 82 has been running continuously for 0.5 second, in the step H10, then the steering angle neutral position learned flag $F_{HN}$ with the reference position $\delta_N$ of the steering shaft 83 being detected is set in a step H15. Then, the TCL 76 determines, in a step S16, whether a steering angle neutral position learned flag $F_H$ with the reference position $\delta_N$ of the steering shaft 83 being not detected is set or not. Control also goes to the step H16 if 5 seconds have elapsed from the start of the counting of the second learning timer in the step H14.

Since the steering angle neutral position learned flag $F_H$ with the reference position $\delta_N$ of the steering shaft 83 being not detected has not been set yet, the TCL 76 determines in the step H16 that the steering angle neutral position learned flag $F_H$ is not set, i.e., the neutral position $\delta_M$ with the reference position $\delta_N$ of the steering shaft 83 being detected is learned for a first time. The TCL 76 regards the present steering shaft angular position $\delta_{m(n)}$ as a new neutral position $\delta_{M(n)}$ of the steering shaft 83, reads the neutral position $\delta_{M(n)}$ into the memory in the TCL 76, and sets the steering angle neutral position learned flag $F_H$ with the reference position $\delta_N$ of the steering shaft 83 being not detected.

After the new neutral position $\delta_{M(n)}$ has been established, the TCL 76 calculates the angle $\delta_H$ through which the steering shaft 83 is turned from the neutral position $\delta_M$ thereof. The TCL 76 then clears the learning timers in a step H18, after which the steering angle neutral position is learned again.

If the presently calculated steering shaft angular position $\delta_{m(n)}$ is not equal to the previously calculated steering shaft angular position $\delta_{m(n-1)}$ in the step H5, or if the vehicle speed V is lower than the threshold value $V_A$, i.e., the rear wheel speed difference $|V_{RL}-V_{RR}|$ calculated in the step H12 is not reliable, or if the rear wheel speed difference $|V_{RL}-V_{RR}|$ is larger than the threshold $V_B$ in the step H12, then since the motor vehicle 82 is not running straight, control jumps to the step H18.

If the rear wheel speed difference $|V_{RL}-V_{RR}|$ is larger than the predetermined threshold value $V_X$ in the step H7, or if the steering shaft reference position sensor 86 is not detecting the reference position $\delta_N$ of the steering shaft 83, then the first learning timer is cleared in a step H19, and control goes to the step H11. Control also goes to the step H11 if the vehicle speed V is lower than the threshold value $V_A$ in the step H6 since it cannot be determined that the motor vehicle 82 is running straight.

If the steering angle neutral position learned flag $F_{HN}$ with the reference position $\delta_N$ of the steering shaft 83 being detected is set in the step H4, i.e., if the neutral position $\delta_M$ is learned second time or subsequently the TCL 76 determines, in a step H20, whether the steering shaft reference position sensor 86 is detecting the reference position $\delta_N$ of the steering shaft 83. If the steering shaft reference position sensor 86 is detecting the reference position $\delta_N$ of the steering shaft 83 in the step H20, then the TCL 76 determines whether or not the vehicle speed V is equal to or higher than the threshold value $V_A$ in a step H21.

If the vehicle speed V is equal to or higher than the threshold valve $V_A$ in the step H21, then the TCL 76 determines, in a step H22, whether or not the rear wheel speed difference $|V_{RL}-V_{RR}|$ is equal to or smaller than the predetermined threshold value $V_X$, i.e., whether the motor vehicle 82 runs straight or not. If the rear wheel speed difference $|V_{RL}-V_{RR}|$ is equal to or smaller than the threshold value $V_X$ in the step H22, then the TCL 76 determines, in a step H23, whether the presently calculated steering shaft angular position $\delta_{m(n)}$ is equal to the previously calculated steering shaft angular position $\delta_{m(n-1)}$ or not. If the presently calculated steering shaft angular position $\delta_{m(n)}$ is equal to the previously calculated steering shaft angular position $\delta_{m(n-1)}$ in the step H23, then the first learning timer starts counting time in a step H24.

Thereafter, the TCL 76 determines, in a step H25, whether 0.5 second has elapsed from the start of the counting of the first learning timer, i.e., the motor vehicle 82 has been running continuously for 0.5 second or not. If 0.5 second has not elapsed from the start of the counting of the first learning timer, then control goes back to the step H2, and repeats the steps H2 through H4 and the steps H20 through H25. If 0.5 second has elapsed from the start of the counting of the first learning timer in the step H25, then control jumps to the step H16.

If the steering shaft reference position sensor 86 is not detecting the reference position $\delta_N$ of the steering shaft 83 in the step H20, or if the vehicle speed V is lower than the threshold value $V_A$, i.e., the rear wheel speed difference $|V_{RL}-V_{RR}|$ calculated in the step H22 is not reliable, or if the rear wheel Speed difference $|V_{RL}-V_{RR}|$ is larger than the threshold $V_X$ in the step H22, or if the presently calculated steering shaft angular position $\delta_{m(n)}$ is not equal to the previously calculated steering shaft angular position $\delta_{m(n-1)}$ in the step H23, then control proceeds to the step H18.

If the steering angle neutral position learned flag $F_H$ is set in the step H16, i.e., if the neutral position $\delta_M$ is learned for a second time or subsequently, the TCL 76 determines, in a step H26, whether or not the presently calculated steering shaft angular position $\delta_{m(n)}$ is equal to the previously calculated steering shaft angular position $\delta_{M(n-1)}$, i.e., $$\delta_{m(n)}=\delta_{M(n-1)}.$$

If the presently calculated steering shaft angular position $\delta_{m(n)}$ is equal to the previously calculated steering shaft angular position $\delta_{M(n-1)}$ in the step H26, then control goes to the step H18, and a next steering neutral position is learned.

If the present steering shaft angular position $\delta_{m(n)}$ is not equal to the previous steering shaft angular position $\delta_{M(n-1)}$ due to a play of the steering system or the like in the step H26, then the present steering shaft angular position $\delta_{m(n)}$ is not regarded as a new steering shaft neutral position $\delta_{M(n)}$. If the absolute value of the difference between the present and previous steering shaft angular positions is greater than a predetermined corrective limit amount $\Delta\delta$, then the corrective limit amount $\Delta\delta$ is added to or subtracted from the previous steering shaft angular position $\delta_{m(n-1)}$, and the sum or difference is regarded as a new steering shaft neutral position $\delta_{M(n)}$, which is stored in the memory in the TCL 76.

More specifically, the TCL 76 determines, in a step H27, whether the difference produced by subtracting the previous steering shaft angular position $\delta_{M(n-1)}$ from the present steering shaft angular position $\delta_{m(n)}$ is smaller than a predetermined negative corrective limit amount $-\Delta\delta$ or not. If the difference is smaller than the negative corrective limit amount $-\Delta\delta$ in the step H27, then the new steering shaft neutral position $\delta_{M(n)}$ is changed to:

$$\delta_{M(n)}=\delta_{M(n-1)}-\Delta\delta,$$

using the previous steering shaft angular position $\delta_{M(n-1)}$ and the negative corrective limit amount $-\Delta\delta$ in a step H28, so that the learned and corrected amount in one cycle will not be negatively increased unconditionally.

As a consequence, even when an abnormal detected signal is transmitted from the steering angle sensor 84 for some reason, the neutral position $\delta_M$ of the steering shaft 83 does not abruptly change, and the malfunction of the steering angle sensor 84 may quickly be coped with.

If the difference is larger than the negative corrective limit amount $-\Delta\delta$ in the step H27, then the TCL 76 determines, in a step H29, whether the difference produced by subtracting the previous steering shaft angular position $\delta_{M(n-1)}$ from the present steering shaft angular position $\delta_{m(n)}$ is larger than a predetermined positive corrective limit amount $\Delta\delta$ or not. If the difference is larger than the positive corrective limit amount $\Delta\delta$ in the step H29, then the new steering shaft neutral position $\delta_{M(n)}$ is changed to:

$$\delta_{M(n)} = \delta_{M(n-1)} + \Delta\delta,$$

using the previous steering shaft angular position $\delta_{M(n-1)}$ and the positive corrective limit amount $\Delta\delta$ in a step H30, so that the learned and corrected amount in one cycle will not be positively increased unconditionally.

As a consequence, even when an abnormal detected signal is transmitted from the steering angle sensor 84 for some reason, the neutral position $\delta_M$ of the steering shaft 83 does not abruptly change, and the malfunction of the steering angle sensor 84 may quickly be coped with.

If the difference is smaller than the positive corrective limit amount $\Delta\delta$ in the step H29, then the present steering shaft angular position $\delta_{m(n)}$ is read as the new steering shaft neutral position $\delta_{M(n)}$ in a step H31.

As described above, when the neutral position $\delta_M$ of the steering shaft 83 is learned and corrected, the rear wheel speed difference $|V_{RL} - V_{RR}|$ and also the detected signal from the steering shaft reference position sensor 86 are employed. Therefore, the neutral position $\delta_M$ of the steering shaft 83 can be learned and corrected relatively early after the motor vehicle 82 has started. In addition, in the event of a failure of the steering shaft reference position sensor 86, the neutral position $\delta_M$ of the steering shaft 83 can be learned and corrected using only the rear wheel speed difference $|V_{RL} - V_{RR}|$. The control system is thus safe in operation.

Figure 7:
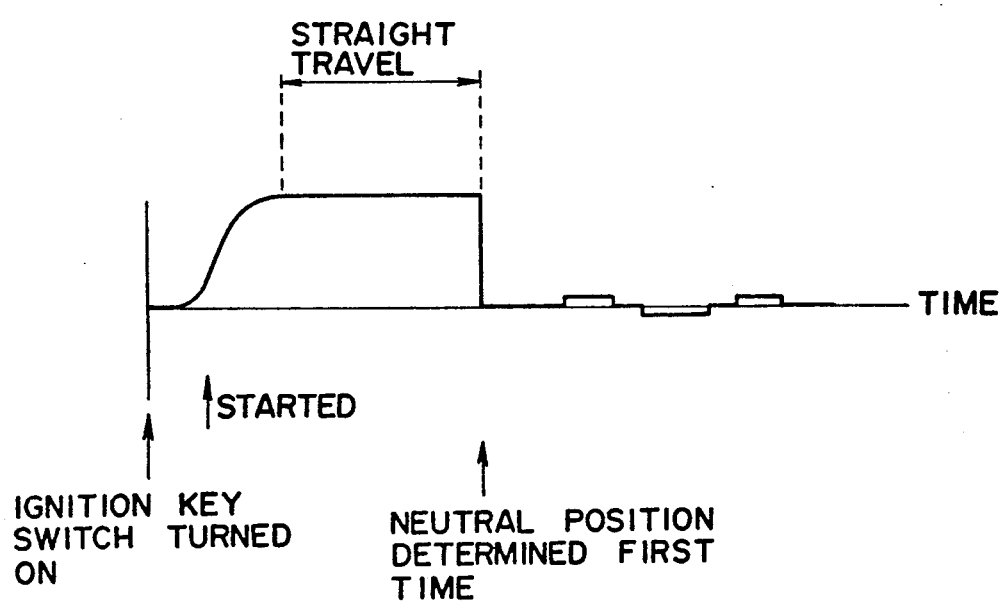
FIG. 7 is a graph showing, by way of example, a corrected amount at the time the neutral position of the steering shaft is learned and corrected.

When the motor vehicle 82 starts from a stop with the front wheels 64, 65 left turned, the neutral position $\delta_M$ of the steering shaft 83 varies as shown in FIG. 7 by way of example. When the neutral position $\delta_M$ of the steering shaft 83 is learned first time, the corrected amount from the initial steering shaft angular position $\delta_{m(o)}$ in the step M1 shown in FIG. 4[A] is very large. However, the neutral position $\delta_M$ as it is learned second time or subsequently is corrected a small amount in the steps H17, H19.

After the neutral position $\delta_M$ of the steering shaft 83 has been learned and corrected, the target drive torque $T_{OS}$ is calculated for the slip control process for limiting the drive torque produced by the engine 11, based on the detected signal from the front wheel speed sensor 66 and the detected signals from the rear wheel speed sensors 80, 81.

The coefficient of friction between the tires and the road surface may be regarded as being equivalent to the rate of change (hereinafter referred to as a "longitudinal acceleration") $G_X$ of the vehicle speed V of the motor vehicle 82. The longitudinal acceleration $G_X$ is calculated on the basis of the detected signals from the rear wheel speed sensors 80, 81, and a reference drive torque $T_B$ of the engine 11, which corresponds to the maximum value of the longitudinal acceleration $G_X$, is corrected on the basis of the difference (hereinafter referred to as a "slip") between a front wheel speed $V_F$ detected by the front wheel speed sensor 66 and a target front wheel speed $V_{FO}$ corresponding to the vehicle speed V, thereby producing the target drive torque $T_{OS}$.

Figure 8:
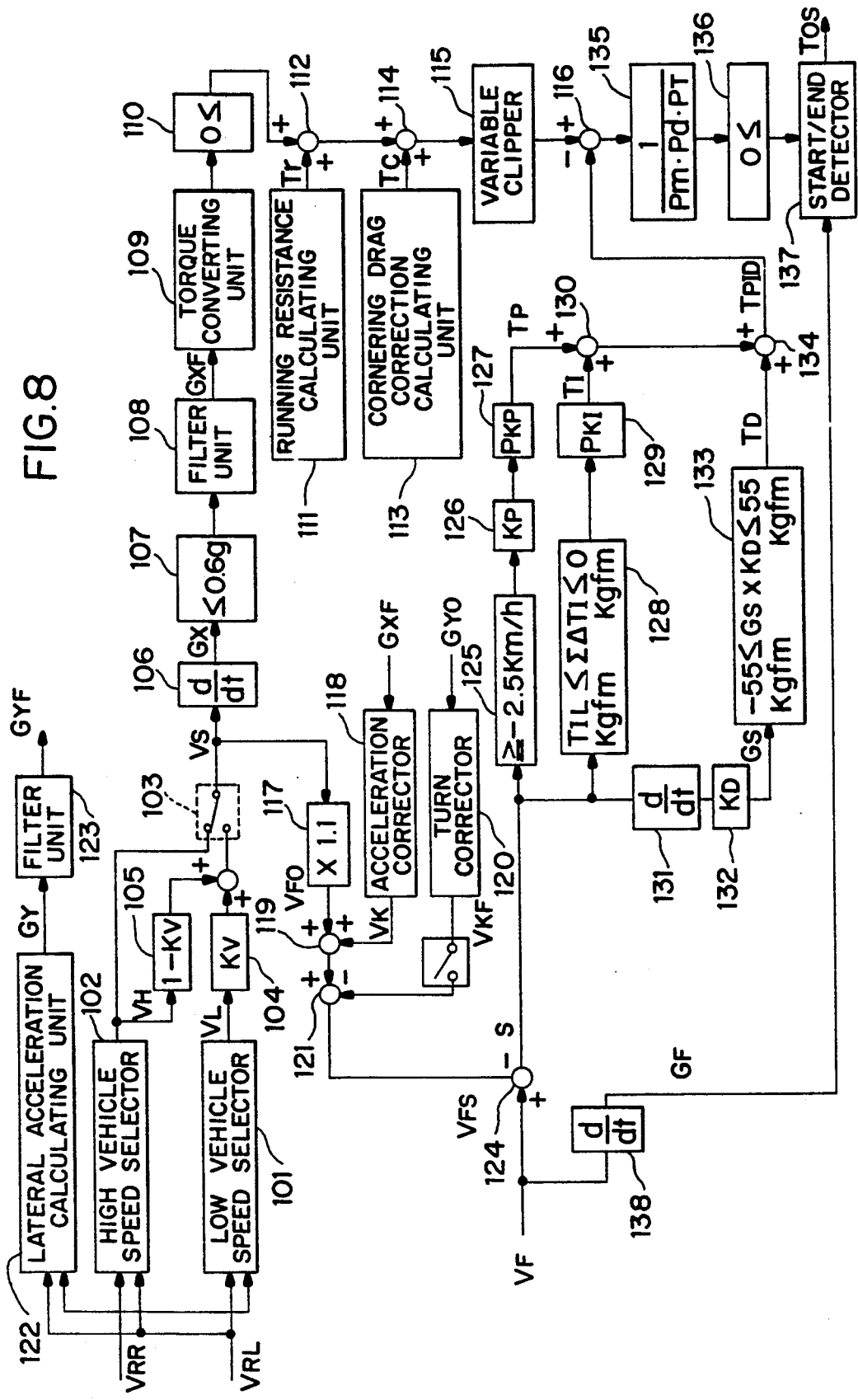
FIG. 8 is a block diagram illustrating a procedure for calculating a target drive torque to be used in a slip control process.

FIG. 8 shows in block form a procedure for calculating the target drive torque $T_{OS}$. The TCL 76 first calculates a vehicle speed $V_s$ for the slip control process based on the detected signals from the rear wheel speed sensors 80, 81. More specifically, a smaller one of the two rear wheel speeds $V_{RL}$, $V_{RR}$ is selected as a first vehicle speed $V_s$ for the slip control process with a lower vehicle speed selector 101, and a larger one of the two rear wheel speeds $V_{RL}$, $V_{RR}$ is selected as a second vehicle speed $V_s$ for the slip control process with a higher vehicle speed selector 102. Then, one of output signals from the two selectors 101, 102 is selected by a switch 103.

The first vehicle speed $V_s$ selected by the lower vehicle speed selector 101 is determined by multiplying the smaller value $V_L$ of the two rear wheel speeds $V_{RL}$, $V_{RR}$ by a weighting coefficient $K_V$, which corresponds to the vehicle speed V calculated according to the equation (1), with a multiplier 104, multiplying the larger value $V_H$ of the two rear wheel speeds $V_{RL}$, $V_{RR}$ by $(1 - k_V)$ with a multiplier 105, and adding the products from the multipliers 104, 105.

More specifically, while the drive torque produced by the engine 11 is being lowered in the slip control process, i.e., a slip control flag $F_s$ is being set, a smaller one of the rear wheel speeds $V_{RL}$, $V_{RR}$ is selected as the vehicle speed VS by the switch 103. While the drive torque produced by the engine 11 is not being lowered even if the driver wants to effect the slip control process, i.e., the slip control flag $F_S$ is being reset, a larger one of the rear wheel speeds $V_{RL}$, $V_{RR}$ is selected by the switch 103.

The above selection of the vehicle speed is carried out in order to make it difficult to switch from a condition in which the drive torque of the engine 11 is not lowered to a condition in which the drive torque of the engine 11 is lowered, and also to make it difficult to switch from the latter condition to the former condition. For example, if a smaller one of the two rear wheel speeds $V_{RL}$, $V_{RR}$ is selected as the vehicle speed $V_s$, then it may be determined that a slip is produced and the drive torque of the engine 11 is lowered though the front wheels 64, 65 which are not subjected to any slip. Such an undesired condition can be avoided by the above vehicle speed selection process. Furthermore, the above vehicle speed selection is effective to continue a condition in which the drive torque of the engine 11 is once lowered in view of safety of the motor vehicle 82 while it is running.

Figure 9:
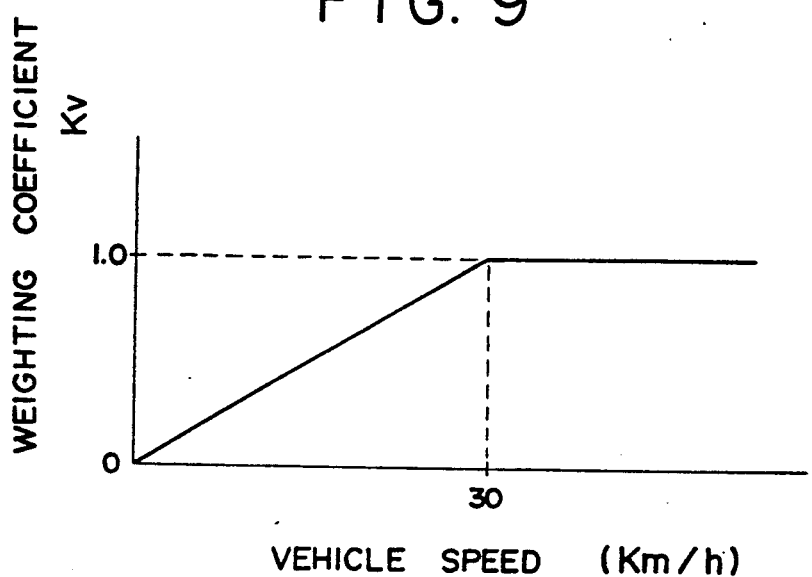
FIG. 9 is a graph showing a map which indicates the relationship between a vehicle speed and a corrective coefficient.

In the calculation of the vehicle speed $V_s$ using the low vehicle speed selector 101, the smaller value $V_L$ of the two rear wheel speeds $V_{RL}$, $V_{RR}$ is multiplied by the weighting coefficient $K_V$ with the multiplier 104, the larger value $V_H$ of the two rear wheel speeds $V_{RL}$, $V_{RR}$ is multiplied by $(1 - K_V)$ with the multiplier 105, and the products from the multipliers 104, 105 are added, because when the motor vehicle 82 runs along a turning circle having a relatively small radius of curvature, such as a right or left turn at an intersection, the average of the peripheral speeds of the front wheels 64, 65 and the smaller one $V_L$ of the rear wheel speeds $V_{RL}$, $V_{RR}$ is largely different from each other, so that the corrected amount of the drive torque due to feedback would too large to accelerate the motor vehicle 82 sufficiently The weighting coefficient $K_V$ is read from a map shown in FIG. 9 based on the vehicle speed V according to the equation (1), which represents the average of the peripheral speeds of the rear wheels 78, 79.

The longitudinal acceleration $G_X$ is calculated on the basis of the vehicle speed $V_S$ thus calculated for the slip control process. A present longitudinal acceleration $G_{X(n)}$ of the motor vehicle 82 is calculated according to the equation, given below, by a differentiator 106, based on a vehicle speed $V_{S(n)}$ which is presently calculated and a vehicle speed $V_{S(n-1)}$ which has been calculated in a preceding cycle.

$$G_{X(n)} = \frac{V_{S(n)} - V_{S(n-1)}}{3.6 \cdot \Delta t \cdot g}$$

where $\Delta t$ is the sampling period of 15 milliseconds, and g is the gravitational acceleration.

If the calculated longitudinal acceleration $G_{X(n)}$ is 0.6 g or greater, then it is clipped to 0.6 g by a clipper 107 so that the maximum value of the longitudinal acceleration $G_{X(n)}$ does not exceeds 0.6 g to provide for safety against calculation errors. Furthermore, the longitudinal acceleration $G_{X(n)}$ is filtered to remove noise through a filter unit 108, thus providing a corrected longitudinal acceleration $G_{XF}$.

The longitudinal acceleration $G_{X(n)}$ of the motor vehicle 82 may be regarded as being equivalent to the coefficient of friction between the tires and the road surface. Even when the maximum value of the longitudinal acceleration $G_{X(n)}$ varies to the extent that the slip ratio S of the tires deviates from a target slip ratio $S_O$ corresponding to the maximum value of the coefficient of friction between the tires and the road surface or a value in the vicinity of the target slip ratio $S_O$, the longitudinal acceleration $G_{X(n)}$ is corrected by the filtering process in the filter unit 108 so that the slip ratio S of the tires will be maintained as the target slip ratio $S_O$ corresponding to the maximum value of the coefficient of friction between the tires and the road surface or as a value smaller than and in the vicinity of the target slip ratio $S_O$. More specifically, the longitudinal acceleration $G_{X(n)}$ is filtered as described in the following portion.

If the present longitudinal acceleration $G_{X(n)}$ is equal to or higher than the previous filtered or corrected longitudinal acceleration $G_{XF(n-1)}$, i.e., if the motor vehicle 82 is continuously accelerated, then the present corrected longitudinal acceleration $G_{XF(n)}$ is calculated according to the equation:

$$G_{XF(n)} = \frac{28}{256} \cdot \Sigma(G_{X(n)} - G_{XF}(n-1))$$

thus removing noise through a delay process, so that the corrected longitudinal acceleration $G_{XF(n)}$ will converge to the longitudinal acceleration $G_{X(n)}$ relatively soon.

If the present longitudinal acceleration $G_{X(n)}$ is smaller than the previous corrected longitudinal acceleration $G_{XF(n-1)}$, i.e., if the motor vehicle 82 is not accelerated, then the process described in the following portion is carried out at each sampling time $\Delta t$ counted by the main timer:

If the slip control flag $F_S$ is not set, i.e., if the drive torque produced by the engine 11 is not lowered by the slip control process, then since the motor vehicle 82 is being decelerated, the corrected longitudinal acceleration $G_{XF(n)}$ is calculated as:

$$G_{XF(n)} = G_{XF(n-1)} - 0.002$$

so that it is prevented from being lowered. The response to the demand of the driver for acceleration of the motor vehicle 82 is thereby maintained.

Even when the slip s is positive, i.e., the front wheels 64, 65 are subjected to a slip while the drive torque of the engine 11 is being lowered by the slip control process, since the motor vehicle 82 is being decelerated, no safety problem arises, and the corrected longitudinal acceleration $G_{XF(n)}$ is calculated as:

$$G_{XF(n)} = G_{XF(n-1)} - 0.002$$

so that it is prevented from being lowered. The response to the demand of the driver for acceleration of the motor vehicle 82 is thereby maintained.

When the slip s is negative, i.e., the motor vehicle 82 is being decelerated while the drive torque of the engine 11 is being lowered by the slip control process, the maximum value of the corrected longitudinal acceleration $G_{XF}$ is kept, thereby maintaining the response to the demand of the driver for acceleration of the motor vehicle 82.

Likewise, the hydraulic automatic transmission 13 is being shifted up by the hydraulic control device 16 while the drive torque of the engine 11 is being lowered by the slip control process, the maximum value of the corrected longitudinal acceleration $G_{XF}$ is kept in order to give the driver a feeling of acceleration.

The corrected acceleration $G_{XF}$ which is filtered by the filter unit 108 is converted into a torque by a torque converting unit 109. Inasmuch as the torque value calculated by the torque converting unit 109 is naturally positive, the torque value is clipped to a value equal to or greater than 0 by a clipper 110 in order to prevent calculation errors. Thereafter, a running resistance $T_R$ which is calculated by a running resistance calculating unit 111 is added to the torque value by an adder 112. To the sum, there is also added a cornering drag corrected torque $T_C$, which is calculated by a cornering drag correction calculating unit 113 based on the detected signal from the steering angle sensor 84, by an adder 114, thus providing a reference drive torque $T_B$ expressed by the following equation (4):

$$T_B = G_{XF} \cdot W_b \cdot r + T_R + T_C \tag{4}$$

where $W_b$ is the weight of the motor vehicle and r is the effective radius of the front wheels 64, 65.

Figure 10:
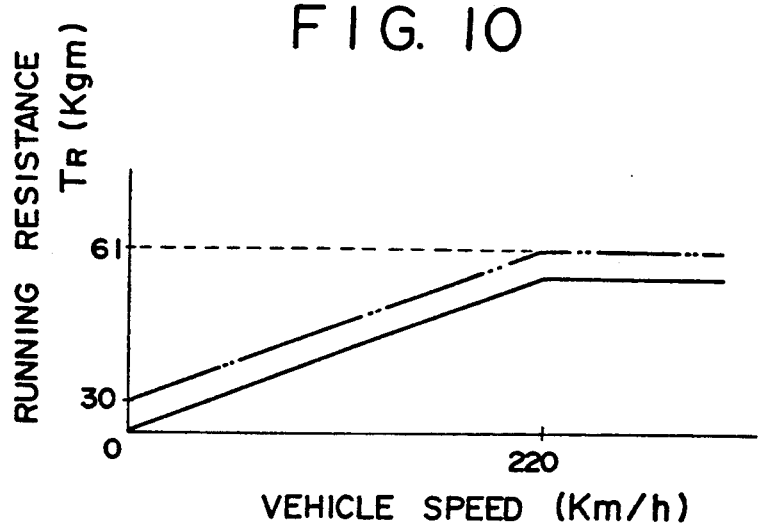
FIG. 10 is a graph showing a map which indicates the relationship between a vehicle speed and a running resistance.

The running resistance $T_R$ may be calculated as a function of the vehicle speed V, but is determined from a map shown in FIG. 10 in the illustrated embodiment. Since the running resistance $T_R$ have different values on flat and uphill roads, the map shown in FIG. 10 includes two curves, one in the solid line for flat roads and one in the two-dot-and-dash line for uphill roads, and one of the curves is selected based on a detected signal from an inclination sensor (not shown) on the motor vehicle 82. However, more values of the running resistance $T_R$ including those for a downhill road may also be established.

Figure 11:
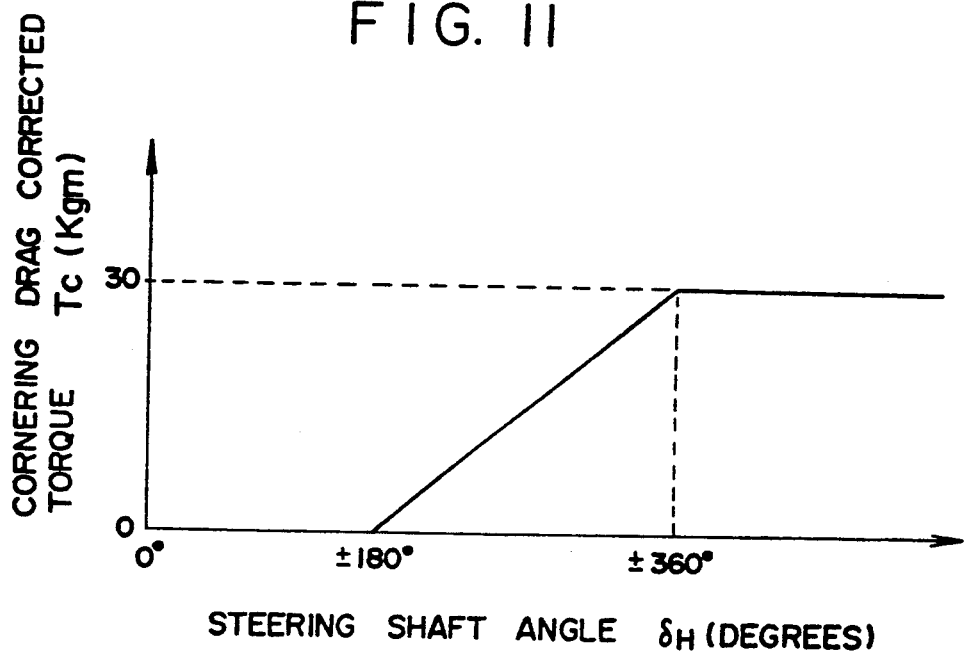
FIG. 11 is a graph showing a map which indicates the relationship between a steering shaft angle and a corrected torque.

In the illustrated embodiment, the cornering drag corrected torque $T_C$ is determined from a map shown in FIG. 11, so that the reference drive torque $T_B$ can be established in a manner to match actual running conditions of the motor vehicle 82. Since the reference drive torque $T_B$ of the engine 11 is slightly large right after the motor vehicle 82 finishes a turn, the acceleration feeling which the driver gets after the motor vehicle 82 leaves a turning circle or path is improved.

Figure 12:
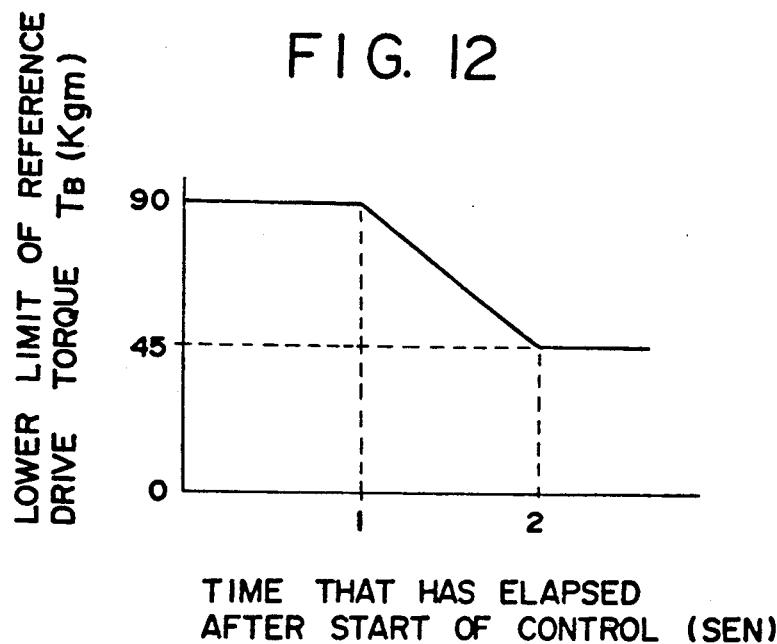
FIG. 12 is a graph showing a map which defines a lower limit for a target drive torque immediately after the slip control process is started.

A lower limit is established by a variable clipper 115 with respect to the reference drive torque $T_B$ calculated according to the equation (4) so that a value, which is produced by subtracting a final corrected torque $T_{PID}$ (described later on) from the reference drive torque $T_B$ with a subtractor 116, is prevented from being negative. As shown in FIG. 12, the lower limit for the reference drive torque $T_B$ is lowered stepwise depending on the time which has elapsed from the start of the slip control process.

The TCL 76 calculates the actual front wheel speed $V_F$ based on the detected signal from the front wheel speed sensor 66, and also calculates the target drive torque $T_{OS}$ for the engine 11 through feedback control of the reference drive torque $T_B$, using the slip s which is the difference between the front wheel speed $V_F$ and a corrected torque calculating target front wheel speed $V_{FS}$ that is established on the basis of a target front wheel speed $V_{FO}$ which is in turn established on the basis of the vehicle speed $V_S$ for the slip control process.

In order to have the drive torque generated by the engine 11 effectively work when the motor vehicle 82 is accelerated, it is desirable that the slip ratio S of the tires of the front wheels 64, 65 as they are running be adjusted to be equal to the target slip ratio $S_O$ corresponding to the maximum value of the coefficient of friction between the tires and the road surface or to a value smaller than and close to the target slip ratio $S_O$, thereby avoiding any energy loss and maintaining maneuverability and accelerating capability of the motor vehicle 82.

It is known that the target slip ratio $S_O$ is variable in the range of from 0.1 to 0.25 depending on the condition of the road surface on which the motor vehicle 82 runs. Therefore, it is desirable to cause the front wheels 64, 65, which are drive wheels, to produce a slip s of about 10% with respect to the road surface while the motor vehicle 82 is running. In view of the above considerations, the target front wheel speed $V_{FO}$ is calculated by a multiplier 117 as follows:

$$V_{FO} = 1.1 \cdot V.$$

Figure 14:
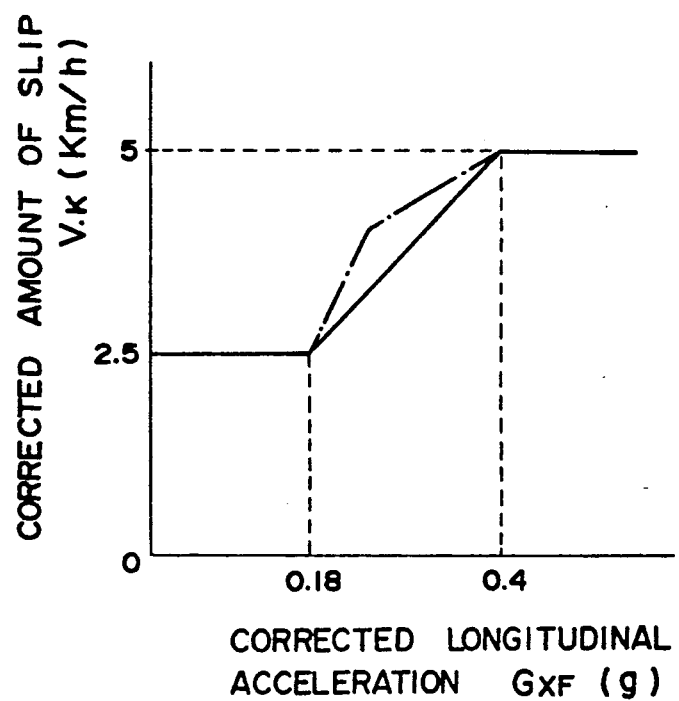
FIG. 14 is a graph showing a map which indicates the relationship between a corrected longitudinal acceleration and a corrected amount of slip upon acceleration.

Then, the TCL 76 reads a corrected amount of slip $V_K$ corresponding to the corrected longitudinal acceleration $G_{XF}$ from the map shown in FIG. 14, with an acceleration corrector 118, and adds the corrected amount of slip $V_K$ to the reference torque calculating target front wheel speed $V_{FO}$ with an adder 119. The corrected amount of slip $V_K$ is increased stepwise as the corrected longitudinal acceleration $G_{XF}$ is increased. The map shown in FIG. 14 is generated on the basis of actual running tests.

Figure 13:
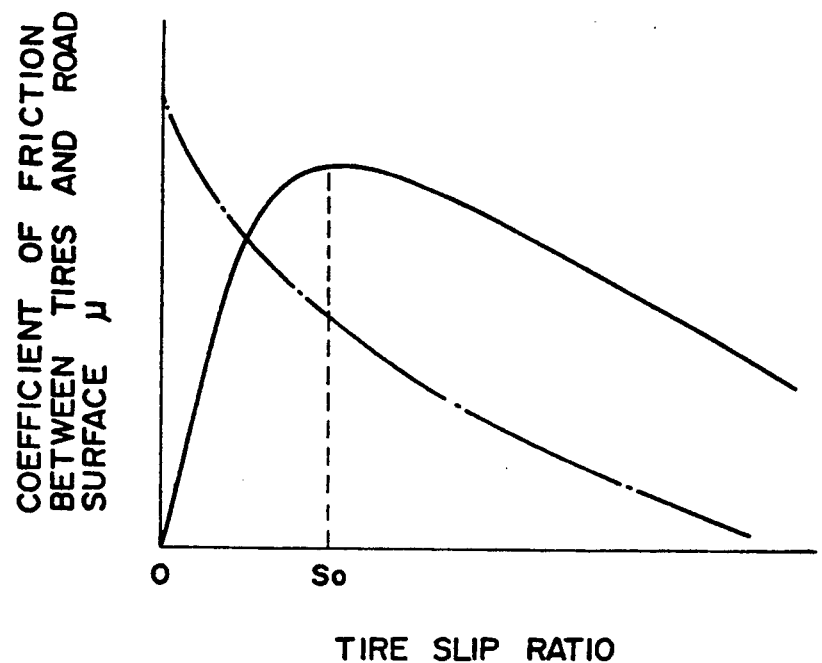
FIG. 13 is a graph showing a map which indicates the relationship between a coefficient of friction between a tire and a road surface and a slip rate of the tire.

The corrected torque calculating target front wheel speed $V_{FS}$ is increased, and the slip ratio S upon acceleration is selected to be equal to the target slip ratio $S_O$ indicated by the solid line in FIG. 13 or a value smaller than and close to the target slip ratio $S_O$.

The dot-and-dash-line curve in FIG. 13 represents the relationship between the coefficient of friction between the tires and the road surface while the motor vehicle is turning and the slip ratio S of the tires. As indicated by this curve, the slip ratio of the tires, which is the maximum value of the coefficient of friction between the tires and the road surface during the turn, is considerably smaller than the target slip ratio $S_O$ for the tires which is the maximum value of the coefficient of friction between the tires and the road surface while the motor vehicle 82 is running straight. Therefore, in order to allow the motor vehicle 82 to make a smooth turn, it is desirable that the target front wheel speed $V_{FO}$ during the turn be smaller than that during a straight travel.

Figure 15:
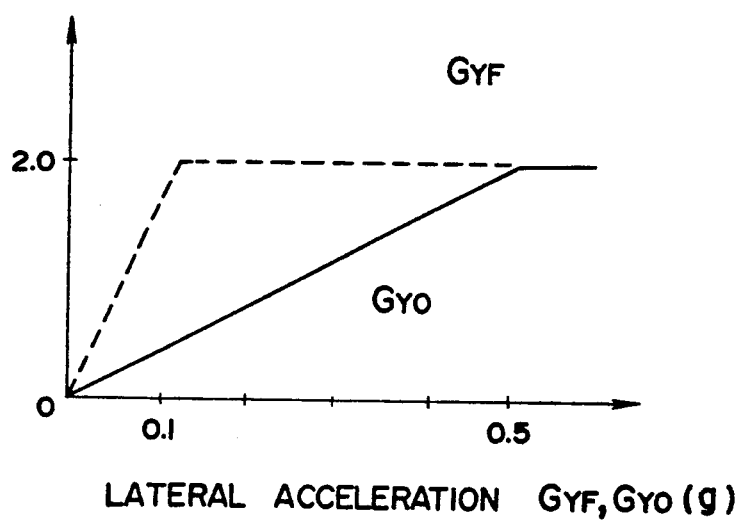
FIG. 15 is a graph showing a map which indicates the relationship between a lateral acceleration and a corrected amount of slip upon turning.

In a turn corrector 120, a corrected amount of slip $V_{KC}$ corresponding to the target lateral acceleration $G_{YO}$ is read from the map shown in FIG. 15 according to the solid-line curve therein. The corrected amount of slip $V_{KC}$ is then subtracted from the reference torque calculating target front wheel speed $V_{FO}$ in a subtractor 121. However, until the first neutral position $\delta_M$ of the steering shaft 83 is learned after the ignition key switch 75 is turned on, the angle $\delta_H$ of the steering shaft 83 is not reliable, and hence the corrected amount of slip $V_{KC}$ is read from the map of FIG. 15 according to the broken-line curve based on a lateral acceleration $G_Y$ acting on the motor vehicle 82 due to the peripheral speeds $V_{RL}$, $V_{RR}$ of the rear wheels 78, 79.

The target lateral acceleration $G_{YO}$ is determined according to the equation (3) using the steering angle $\delta$ which is calculated according to the equation (4) based on the detected angle from the steering angle sensor 84, and the neutral position $\delta_M$ of the steering shaft 83 is learned and corrected.

If the steering angle sensor 84 or the steering shaft reference position sensor 86 fails, the target lateral acceleration $G_{YO}$ may be of an entirely erroneous value. In the event of a failure of the steering angle sensor 84 or the steering shaft reference position sensor 86, an actual lateral acceleration $G_Y$ acting on the motor vehicle 82 is calculated using the rear wheel speed difference $|V_{RL} - V_{RR}|$, and employed instead of the target lateral acceleration $G_{YO}$.

More specifically, the actual lateral acceleration $G_Y$ is calculated according to the equation (5), given below, in a lateral acceleration calculating unit 122 in the TCL 76, from the rear wheel speed difference $|V_{RL} - V_{RR}|$ and the vehicle speed V, and is filtered through a filter unit 123 to remove noise, thus producing a corrected lateral acceleration $G_{YF}$.

$$G_Y = \frac{|V_{RL} - V_{RR}| \cdot V}{3.6^2 \cdot b \cdot g} \quad (5)$$

where b is the tread of the rear wheels 78, 79. In the filter unit 123, a present corrected lateral acceleration $G_{YF(n)}$ is produced through a low-pass process according to the digital calculation expressed below, from a presently calculated lateral acceleration $G_{Y(n)}$ and a previously calculated corrected lateral acceleration $G_{YF(n-1)}$.

$$G_{YF(n)} = \Sigma \frac{20}{256} \{G_{Y(n)} - G_{YF(n-1)}\}$$

Figure 16:
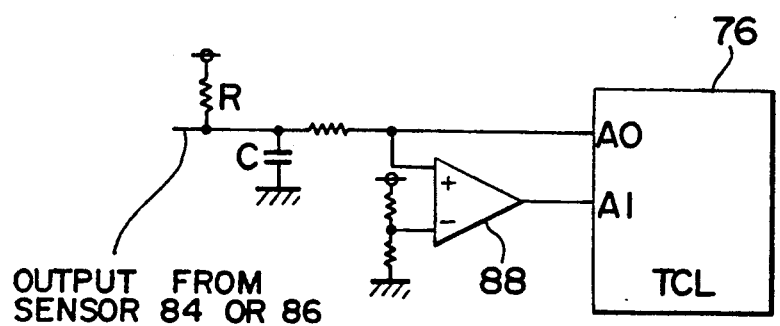
FIG. 16 is a block diagram of a circuit for detecting a failure of a steering angle sensor.

A failure of the steering angle sensor 84 or the steering shaft reference position sensor 86 is detected by the TCL 76 through a wire breakage detector shown in FIG. 16 or the like. The output signals from the steering angle sensor 84 and the steering shaft reference position sensor 86 are pulled up by a pull-up resistor R and grounded through a capacitor C, and are also applied to a terminal A0 of the TCL 76 for various control processes and to a terminal A1 of the TCL 76 through a comparator 88. The comparator 88 has a negative terminal to which a reference voltage of 4.5 volts is applied. When the steering angle sensor 84 or the steering shaft reference position sensor 86 suffers a wire breakage, the voltage applied to the terminal A0 exceeds the reference voltage, turning on the comparator 88, whereupon the voltage applied to the terminal A1 goes high in level. If the voltage applied to the terminal A1 is continuously high for a certain period of time, e.g., 2 seconds, then the TCL 76 determines that the steering angle sensor 84 or the steering shaft reference position sensor 86 has failed due to a wire breakage.

In the above embodiment, a failure of the steering angle sensor 84 or the steering shaft reference position sensor 86 is detected through a hardware arrangement. However, such a failure may be detected by a software program.

Figure 17:
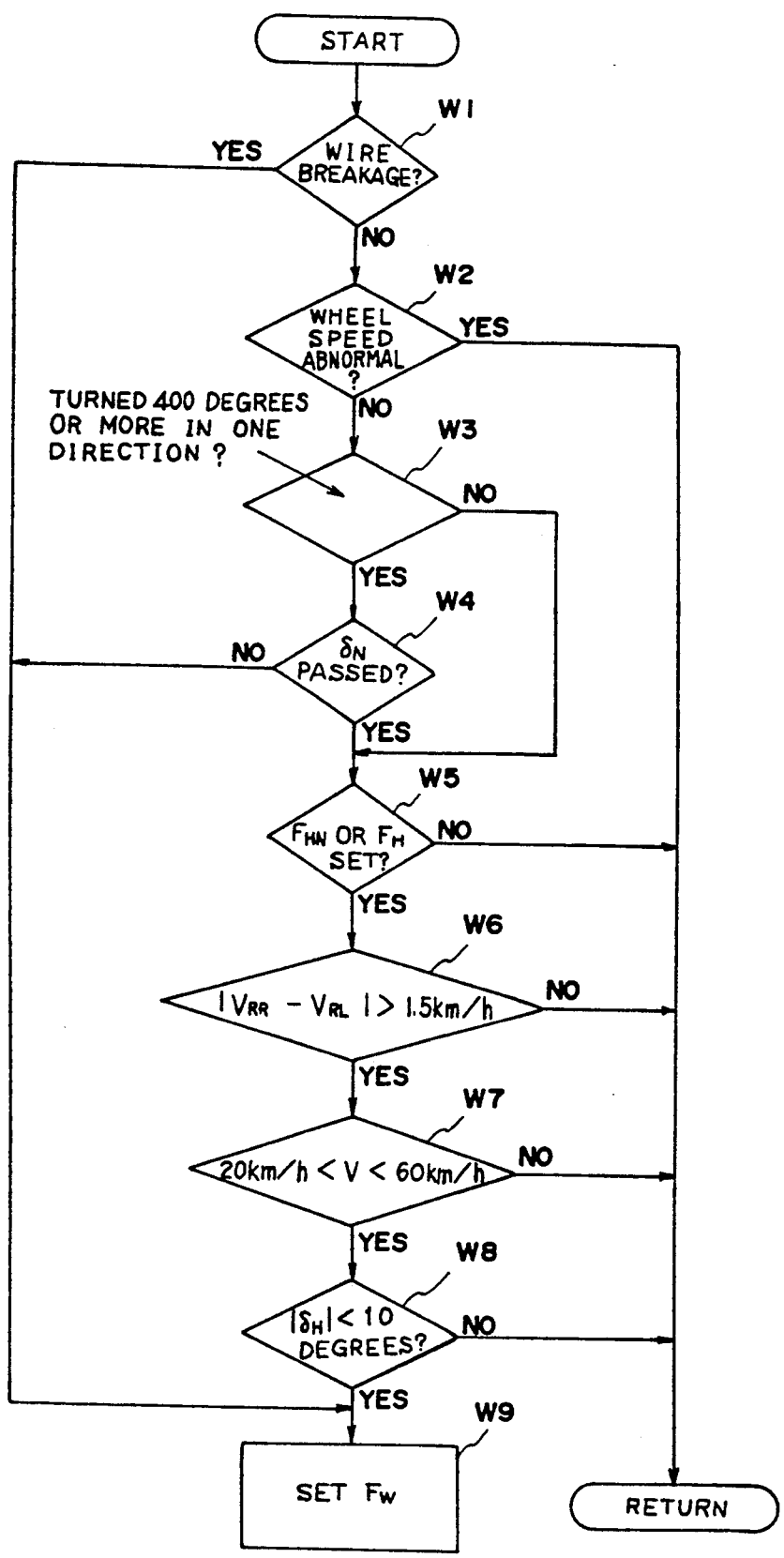
FIG. 17 is a flowchart of a process for detecting a failure of a steering angle sensor.

For example, FIG. 17 shows a software procedure for detecting a failure of the steering angle sensor 84. The TCL 76 first determines whether there is a failure due to a wire breakage through the circuit arrangement shown in FIG. 16 in a step W1. If no failure is detected in the step W1, then the TCL 76 determines whether the front wheel speed sensor 66 and the rear wheel speed sensors 80, 81 suffer a failure in a step W2. If no failure is determined in the step W2, then the TCL 76 determines whether the steering shaft 83 has turned through one revolution or more, e.g., 400 degrees or more, in one direction in a step W3. If the steering shaft 83 has turned through 400 degrees or more in the step W3, then the TCL 76 determines whether there is a signal from the steering shaft reference position sensor 86, indicating the reference position $\delta_N$ of the steering shaft 83, in a step W4.

If there is no signal indicating the reference position $\delta_N$ of the steering shaft 83 in the step W4, and if the steering shaft reference position sensor 86 is normal, then since at least one signal indicating the reference position $\delta_N$ should be detected, the TCL 76 determines that the steering angle sensor 84 has failed and a failure flag $F_W$ is set in a step W9.

If the steering shaft 83 has not turned through 400 degrees or more in one direction in the step W3, or if there is a signal from the steering shaft reference position sensor 86, indicating the reference position $\delta_N$ of the steering shaft 83 in the step W4, then the TCL 76 determines, in a step W5, whether the neutral position $\delta_M$ has been learned or not, i.e., whether at least one of the two steering angle neutral position learned flags $F_{HN}$, $F_H$ has been set.

If the neutral position $\delta_M$ of the steering shaft 83 has been learned in the step W5, then control goes to a step W6. If the rear wheel speed difference $|V_{RL} - V_{RR}|$ exceeds 1.5 km/hour in the step W6, and if the vehicle speed V ranges between 20 km/hour and 60 km/hour in a step W7, and the absolute value of the angle $\delta_H$ to which the steering shaft 83 has been turned is less than 10 degrees at this time in a step W8, i.e., if the motor vehicle 82 is making a turn at a certain speed, then the TCL 76 determines, in the step W9, that the steering angle sensor 84 has failed, because the absolute value of the angle $\delta_H$ should be 10 degrees or more if the steering angle sensor 84 functioned normally.

Figure 18:
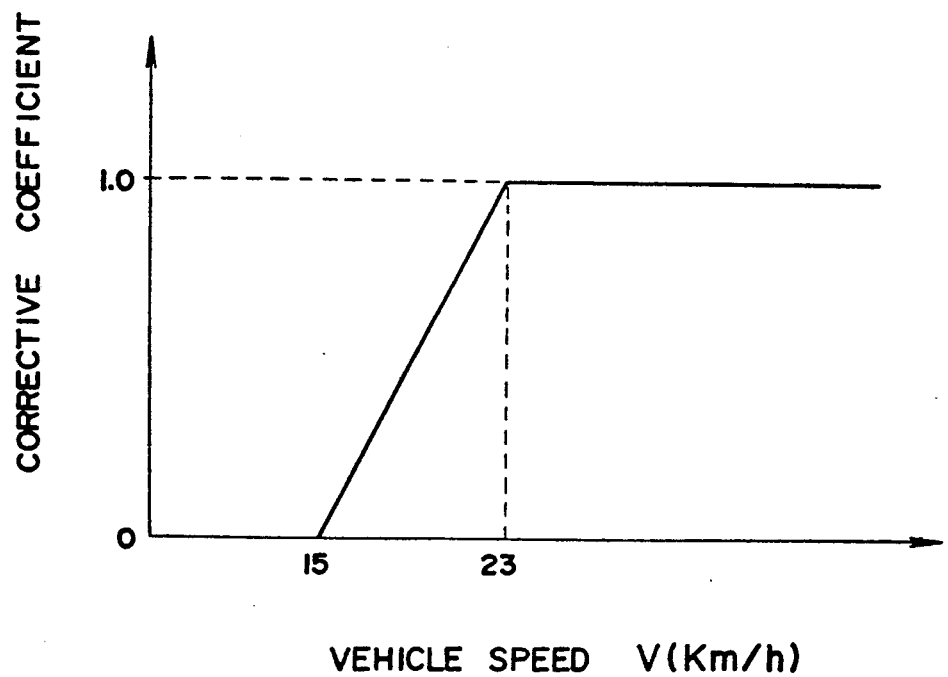
FIG. 18 is a graph showing a map which indicates the relationship between a vehicle speed and a corrective coefficient.

Since the driver may further turn the steering wheel 85, the corrected amount of slip $V_{KC}$ corresponding to the target lateral acceleration $G_{YO}$ is selected to be smaller than the corrected amount of slip $V_{KC}$ corresponding to the corrected lateral acceleration $G_{YF}$ in a region where the target lateral acceleration $G_{YO}$ is small. In a region where the vehicle speed V is small, it is desirable to maintain the ability of the motor vehicle 82 to accelerate. When the vehicle speed V is higher than a certain speed, the speed with which the motor vehicle can make turns should be taken into consideration. Therefore, the corrected amount of slip $V_{KC}$ read from the map of FIG. 15 is multiplied by a corrective coefficient corresponding to the vehicle speed V and read from the map shown in FIG. 18, thereby calculating a corrected amount of slip $V_{KF}$.

The corrected torque calculating target front wheel speed $V_{FO}$ is reduced, lowering the slip ratio S during a turn to a level smaller than the target slip ratio $S_O$ during a straight travel. Though the ability of the motor vehicle 82 to accelerate is slightly lowered, the motor vehicle 82 keeps its good ability to make turns.

Figure 19:
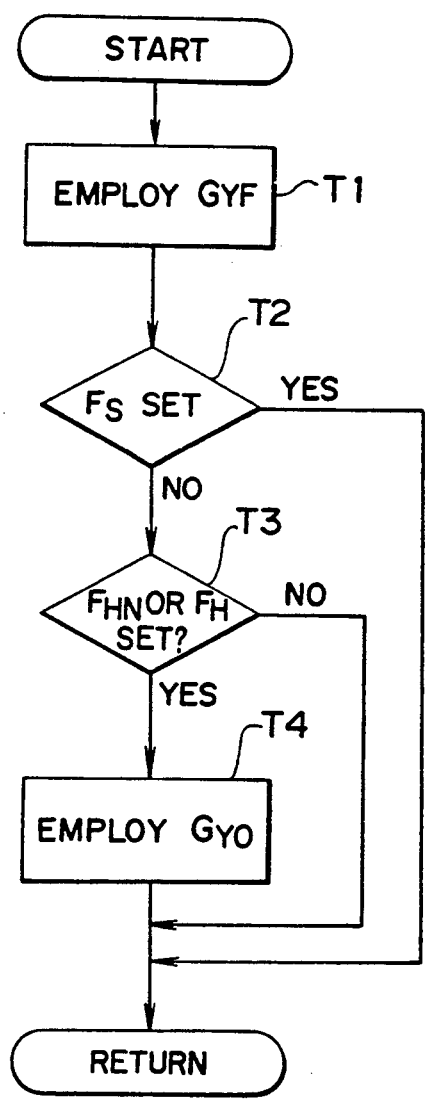
FIG. 19 is a flowchart of a procedure for selecting a lateral acceleration.

FIG. 19 shows a procedure for selecting the target lateral acceleration $G_{YO}$ and the actual lateral acceleration $G_Y$. The TCL 786 employs the corrected lateral acceleration $G_{YF}$ from the filter unit 123 as a lateral acceleration to calculate the corrected amount of slip $V_{KC}$ in a step T1, and then determines whether the slip control flag $F_S$ is set or not in a step T2.

If the slip control flag $F_S$ is set in the step T2, then the corrected lateral acceleration $G_{YF}$ is employed as it is. This is because if the lateral acceleration serving as a reference for determining the corrected amount of slip $V_{KC}$ varied from the corrected lateral acceleration $G_{YF}$ to the target lateral acceleration $G_{YO}$ during the slip control process, then the corrected amount of slip $V_{KC}$ would largely vary, tending to disturb the behavior of the motor vehicle 82.

If the slip control flag $F_S$ is not set in the step T2, then the TCL 72 determines whether either one of the two steering angle neutral position learned flags $F_{HN}$, $F_H$ is set or not in a step T3. If either one of the two steering angle neutral position learned flags $F_{HN}$, $F_H$ is not set in the step T3, then the corrected lateral acceleration $G_{YF}$ is employed as it is. If either one of the two steering angle neutral position learned flags $F_{HN}$, $F_H$ is set in the step T3, then the target lateral acceleration $G_{YO}$ is employed as a lateral acceleration to calculate the corrected amount of slip $V_{KC}$ in a step T4.

As a result, the corrected torque calculating target front wheel speed $V_{FS}$ is given by the following equation:

$$V_{FS} = V_{FO} + V_K - V_{KF}.$$

Thereafter, a slip s which is the difference between the actual front wheel speed $V_F$ that is produced by filtering the detected signal from the front wheel speed sensor 66 for noise removal and the corrected torque calculating target front wheel speed $V_{FS}$, is calculated by a subtractor 124. If the calculated slip s is equal to or smaller than a predetermined negative value, e.g., $-2.5$ km/hour, then the slip s is clipped to $-2.5$ km/hour by a clipper 125. Then, the clipped slip s is subjected to a proportional correction process (described later on), and excessive control in the proportional correction process is prevented to avoid hunting in the output.

The slip s before it is clipped is subjected to an integral correction process using an integral constant $\Delta T_i$ (described later on), and then to a differential correction process, thereby calculating a final corrected torque $T_{PID}$.

Figure 20:
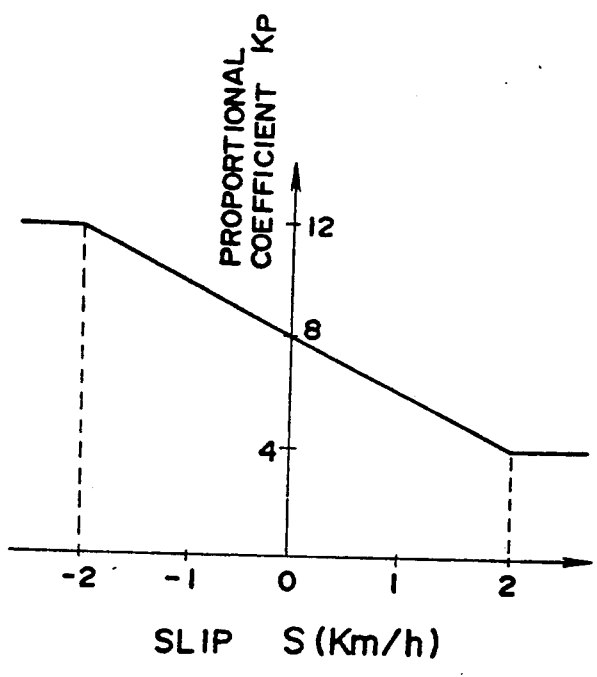
FIG. 20 is a graph showing a map which indicates the relationship between an amount of slip and a proportional coefficient.

In the proportional correction process, the slip s is multiplied by a proportional coefficient $K_P$ to determine a basic corrected amount in a multiplier 126, and the basic corrected amount is multiplied by a corrective coefficient $\rho_{KP}$ which has been preset according to the speed reduction ratio $\rho_m$ of the hydraulic automatic transmission 13 in a multiplier 127, thus providing a proportionally corrected torque $T_P$. The proportional coefficient KP is read from the map shown in FIG. 20 according to the clipped slip s.

In the integral correction process, in order to achieve a correction corresponding to a gradual change in the slip s, a basic corrected amount is calculated in an integral calculating unit 128, and the basic corrected amount is multiplied by a corrective coefficient $\rho_{KI}$ which has been preset according to the speed reduction ratio $\rho_m$ of the hydraulic automatic transmission 13 in a multiplier 129, thus providing an integrally corrected torque $T_I$. In the illustrated embodiment, a constant minute integrally corrected torque $\Delta T_I$ is integrated. If the slip s is positive in each sampling period of 15 milliseconds, then the minute integrally corrected torque $\Delta T_I$ is added. If the slip s is negative, then the minute integrally corrected torque $\Delta T_I$ is subtracted.

Figure 21:
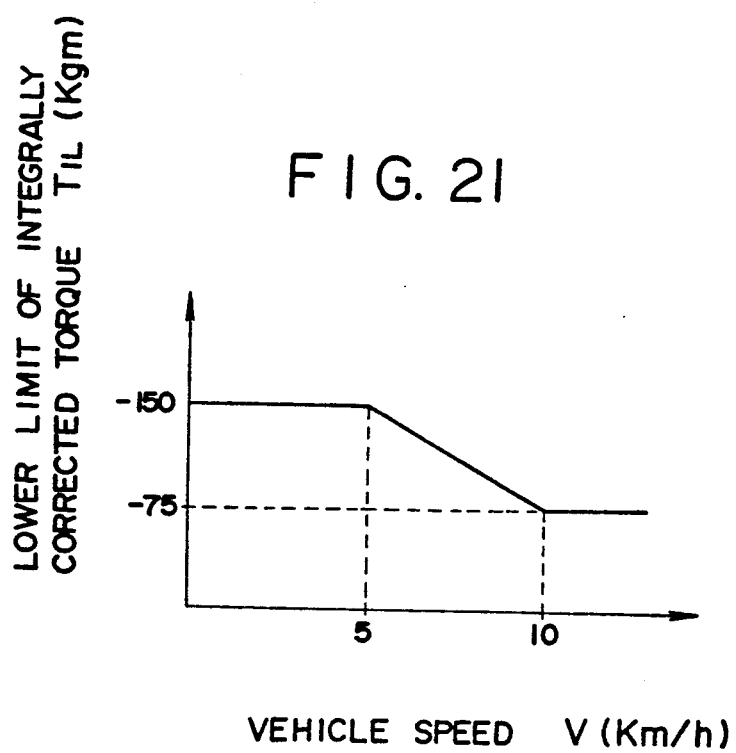
FIG. 21 is a graph showing a map which indicates the relationship between a vehicle speed and a lower limit for an integral corrected torque.

The integrally corrected torque $T_I$ has a lower limit $T_{IL}$ as shown in the map of FIG. 21, the lower limit $T_{IL}$ being variable depending on the vehicle speed V. The integrally corrected torque $T_I$ is clipped such that when the motor vehicle 82 starts moving, especially on an uphill road, a larger integrally corrected torque $T_I$ is produced to obtain a sufficient drive power from the engine 11, and when the vehicle speed V is increased after the motor vehicle 82 has started, a smaller integrally corrected torque $T_I$ is produced since control stability would be lost if the torque were excessively corrected. For higher control convergence, the integrally corrected torque $T_I$ has an upper limit, e.g., 0 kgm, and is clipped such that it varies with time as shown in FIG. 22.

The proportionally corrected torque $T_P$ and the integrally corrected torque $T_I$ are added to each other by an adder 130, thus providing a proportionall and integrally corrected torque $T_{PI}$.

Figures 22, 23:
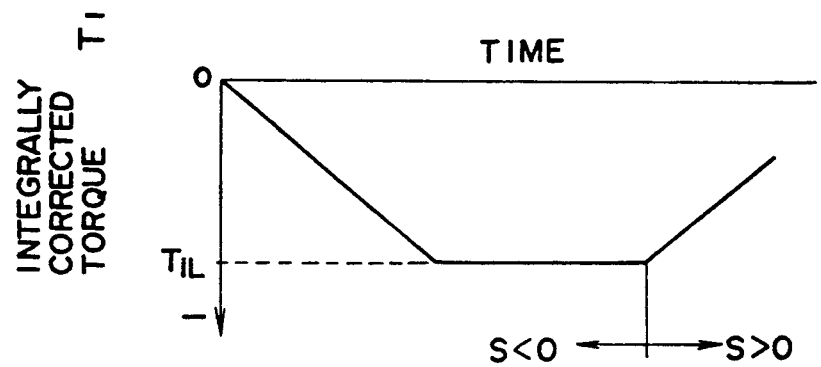
FIG. 22 is a graph showing regions where the integral corrected torque is increased and reduced.
FIG. 23 is a diagram showing a map which indicates the relationship between gear positions of a hydraulic automatic transmission and corrective coefficients corresponding to respective corrected torques.

The corrective coefficients $\rho_{KP}$, $\rho_{KI}$ are read from a map shown in FIG. 23 which is preset in relation to the speed reduction ratio $\rho_m$ of the hydraulic automatic transmission 13.

The rate of change $G_s$ of the slip s is calculated in a differentiator 131, and multiplied by a differential coefficient $K_O$ in a multiplier 132, for producing a basic corrected amount with respect to an abrupt change in the slip s. The basic corrected amount is clipped by a clipper 133 which gives upper and lower limits thereto, so that a differentially corrected torque $T_D$ which does not have an excessively large value is produced. While the motor vehicle 32 is running, the front and rear wheels may instantaneously spin or be locked depending on the road condition or running condition of the motor vehicle 82. When this happens, the rate of change $G_s$ of the slip s may be of an extremely large positive or negative value, causing the control process to diverge for a lower response. In view of this, the clipper 133 clips the rate of change $G_s$ to the lower limit of $-55$ kgm and the upper limit of 55 kgm, for example, so that the differentially corrected torque $T_D$ will not be of an excessively large value.

Thereafter, the proportionally integrally corrected torque $T_{PI}$ and the differentially corrected torque $T_D$ are added to each other by an adder 134, thus producing a final corrected torque $T_{PID}$. The final corrected torque $T_{PID}$ is then subtracted from the reference drive torque $T_B$ by the subtractor 116. The difference is then multiplied in a multiplier 135 by the reciprocal of a total speed reduction ratio between the engine 11 and respective axles 89, 90 of the front wheels 64, 65, thus producing a target drive torque $T_{OS}$ for the slip control process, as expressed by the following equation (6):

$$T_{OS} = \frac{T_B - T_{PID}}{\rho_m \cdot \rho_d \cdot \rho_T} \tag{6}$$

where $\rho_d$ is the speed reduction ratio of the differential, and $\rho_T$ is the torque converter ratio. In case the hydraulic automatic transmission 13 is shifted up, then a speed reduction ratio $\rho_m$ for a higher gear position is produced after the upshift is finished. More specifically, in case the hydraulic automatic transmission 13 is shifted up, if a speed reduction ratio $\rho_m$ for a higher gear position were produced at the time a gearshift signal is issued, then the target drive torque $T_{OS}$ would be increased causing the engine 11 to race, as can be seen from the equation (6). To avoid this drawback, during a period of time after a gearshift signal is issued and until the gearshift is completed, e.g., for 1.5 seconds, a speed reduction ratio $\rho_m$ for a lower gear position which allows the target drive torque $T_{OS}$ to be smaller is maintained, and after elapse of 1.5 seconds from the gearshift signal, a speed reduction ratio $\rho_m$ for a higher gear position is employed. For the same reason, in case the hydraulic automatic transmission 13 is shifted down, a speed reduction ratio $\rho_m$ for a lower gear position is employed immediately when a gearshift signal is issued.

Since the target drive torque $T_{OS}$ calculated according to the equation (6) above is naturally positive, the target drive torque $T_{OS}$ is clipped to a value equal to or greater than 0 by a clipper 136 in order to prevent calculation errors. Thereafter, information relative to the target drive torque $T_{OS}$ is issued to the ECU 15 by a start/end detector 137 which determines the start or end of the slip control process.

When all conditions (a) through (e) given below are satisfied, the start/end detector 137 determines that the slip control process is started, and sets the slip control flag $F_S$. The start/end detector 137 also operates the switch 103 to select the output signal from the low vehicle speed selector 101 as a vehicle speed $V_S$ for the slip control process, and transmits the information relative to the target drive torque $T_{OS}$ to the ECU 15. The start/end detector 137 continues the above operation until it detects the end of the slip control process and resets the slip control flag $F_S$.

(a) The driver of the motor vehicle 82 operates on a manual switch (not shown) for the slip control process.

(b) The drive torque $T_d$ demanded by the driver is at least a minimum drive torque, e.g., 4 kgm, required to cause the motor vehicle 82 to run.

Figure 24:
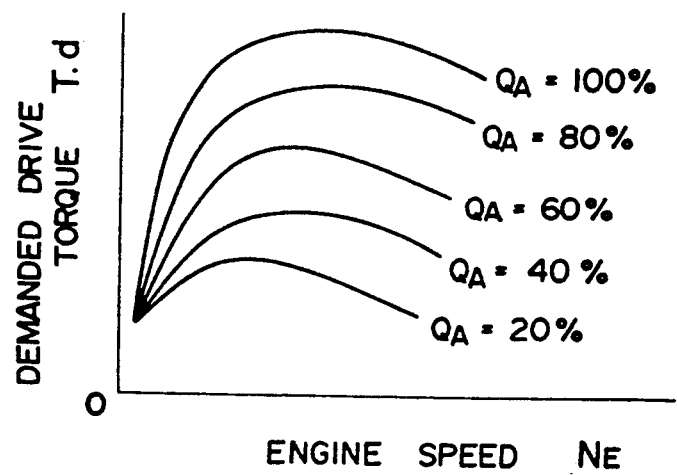
FIG. 24 is a graph showing a map which indicates an engine rotational speed, a demanded drive torque, and accelerator openings.

In the illustrated embodiment, the demanded drive torque $T_d$ is read from a map shown in FIG. 24 based on an engine speed $N_E$ calculated from the detected signal from the crankshaft angle sensor 62 and an accelerator opening $\theta_A$ calculated from the detected signal from the accelerator opening sensor 76. However, the accelerator opening $\theta_A$ is of a value which is corrected at the detected fully closed position of the accelerator opening sensor 77 (details will be described later on with reference to FIGS. 31 and 32).

(c) The slip s is 2 km/hour or more.

(d) The rate of change $G_s$ of the slip s is 0.2 g or more.

(e) The actual front wheel acceleration $G_F$, which has been produced by differentiating the actual front wheel speed $V_F$ with respect to time 138 by a differentiator 138, is 0.2 g or more.

If any one of conditions (f), (g), below, is satisfied after the start of the slip control process is detected by the start/end detector 137, then the start/end detector 137 determines that the slip control process comes to an end, and resets the slip control flag $F_S$. The start/end detector 137 also stops the transmission of the target drive torque $T_{OS}$ to the ECU 15, and operates the switch 103 to select the output signal from the high vehicle speed selector 102 as a vehicle speed $V_S$ for the slip control process.

(f) The condition that the target drive torque $T_{OS}$ is equal to or higher than the demanded drive torque $T_d$, and the slip s is equal to or smaller than a constant value, e g., −2 km/hour, continues for a certain period of time, such as 0.5 second, for example.

(g) The condition that the idling switch 68 has been turned on, i.e., the driver has released the accelerator pedal 31, continues for a certain period of time, such as 0.5 second, for example.

The motor vehicle 82 has a manual switch (not shown) with which the driver ca select the slip control process. When the driver operates on the manual switch to select the slip control process, the slip control process is carried out as described in the following portion.

Figure 25:
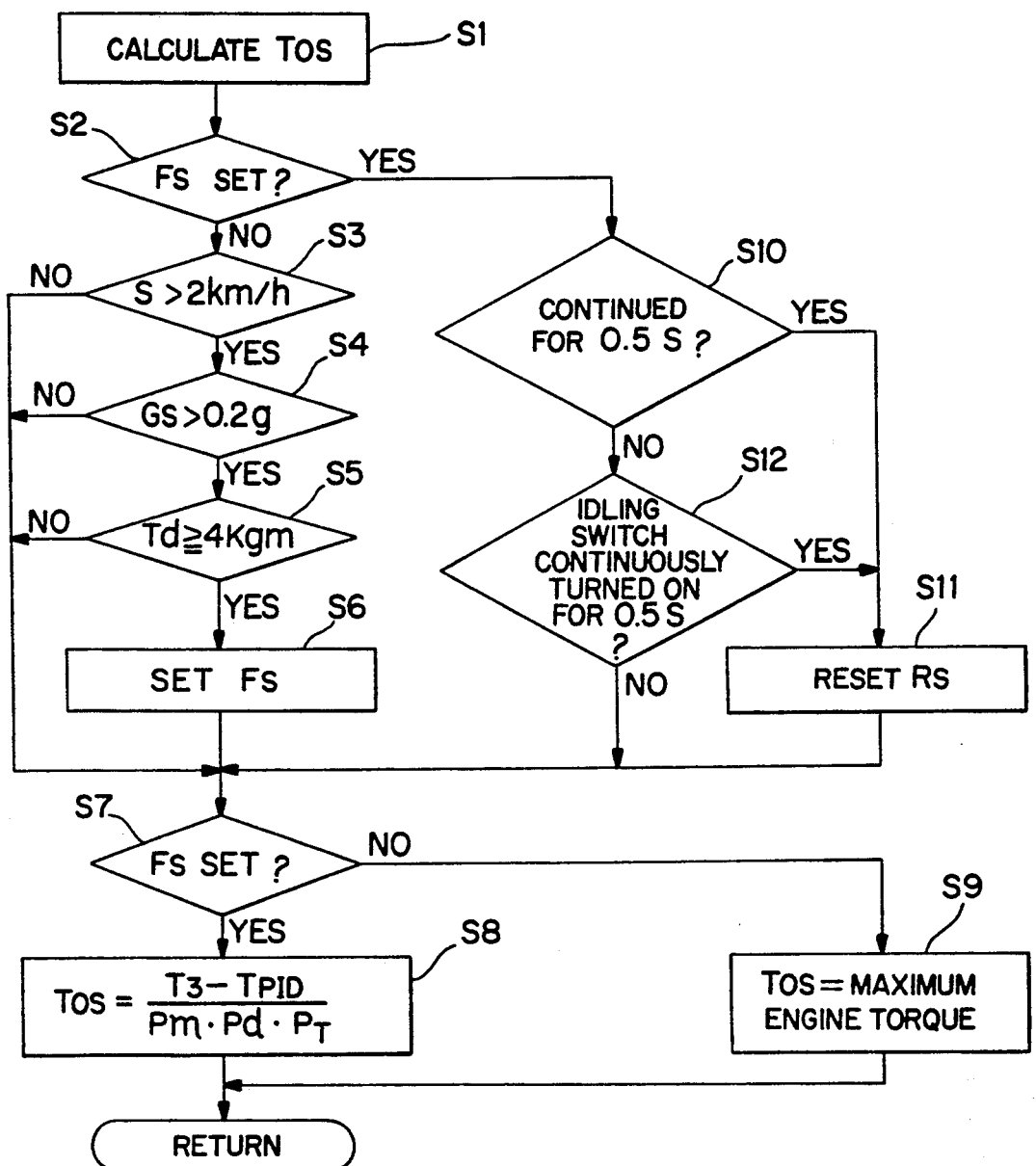
FIG. 25 is a flowchart of a slip control process.

The slip control process is shown in the flowchart of FIG. 25. As shown in FIG. 25, the TCL 76 calculates the target drive torque $T_{OS}$ through the detection of various data and calculation steps, as described above, in a step S1. The calculation of the target drive torque $T_{OS}$ is effected irrespective of the operation of the manual switch.

Then, the TCL 76 determines whether the slip control flag $F_S$ is set or not in a step S2. Since the slip control flag $F_S$ is not initially set, the TCL 76 determines, in a step S3, whether the slip s of the front wheels 64, 65 is larger than a predetermined threshold value, e.g., 2 km/hour, or not. If the slip s is larger than 2 km/hour in the step S3, then the TCL 76 determines, in a step S4, whether the rate of change $G_s$ of the slip s is larger than 0.2 g or not.

If the rate of change $G_s$ is larger than 0.2 g in the step S4, then the TCL 76 determines, in a step S5, whether or not the drive torque $T_d$ demanded by the driver is equal to or greater than a minimum drive torque, e.g., 4 kgm, required to cause the motor vehicle 82 to run, i.e., whether the driver intends to run the motor vehicle 82 or not.

If the demanded drive torque $T_d$ is equal to or greater than 4 kgm in the step S5, then the TCL 76 sets the slip control flag $F_S$ in a step S6, and determines again whether the slip control flag $F_S$ is set or not in a step S7.

If the slip control flag $F_S$ is set in the step S7, then the TCL 76 employs the target drive torque $T_{OS}$ for the slip control torque, which has been calculated according to the equation (6), as the target drive torque $T_{OS}$ for the engine 11, in a step S8.

If the slip control flag $F_S$ is reset in the step S7, then the TCL 76 employs the maximum torque of the engine 11 as the target drive torque $T_{OS}$ in a step S9. Since the ECU 15 reduces the duty ratio of the torque control solenoid-operated valves 51, 56 to 0%, the engine 11 produces a drive torque depending on the depression by the driver of the accelerator pedal 31.

If the slip s of the front wheels 64, 65 is smaller than 2 km/hour in the step S3, or if the rate of change $G_s$ of the slip s is smaller than 0.2 g in the step S4, or if the demanded drive torque $T_d$ is smaller than 4 kgm in the step S5, then control jumps to the step S7. The TCL 76 employs the maximum torque of the engine 11 as the target drive torque $T_{OS}$ in the step S9, and the ECU 15 reduces the duty ratio of the torque control solenoid-operated valves 51, 56 to 0%, with the result that the engine 11 produces a drive torque depending on the depression by the driver of the accelerator pedal 31.

If the slip control flag $F_S$ is set in the step S2, the TCL 76 determines, in a step S10, whether the condition that the slip s of the front wheels 64, 65 is equal to or smaller than −2 km/hour and the demanded drive torque $T_d$ is equal to or smaller than the target drive torque $T_{OS}$ calculated in the step S1, continues for 0.5 second or not.

If the condition that the slip s of the front wheels 64, 65 is equal to or smaller than −2 km/hour and the demanded drive torque $T_d$ is equal to or smaller than the target drive torque $T_{OS}$ calculated in the step S1, continues for 0.5 second in the step S10, i.e., if the driver does not want to accelerate the motor vehicle 82, then the TCL 76 resets the slip control flag $F_S$ in a step S11, from which control goes to the step S7.

If the condition that the slip s of the front wheels 64, 65 is equal to or smaller than −2 km/hour and the demanded drive torque $T_d$ is equal to or smaller than the target drive torque $T_{OS}$ calculated in the step S1, does not continue for 0.5 second in the step S10, i.e., if the driver wants to accelerate the motor vehicle 82, then the TCL 76 determines, in a step S12, whether the idling switch 68 is turned on or not, i.e., the fully closed condition of the throttle valve 20 continues, for 0.5 second or not.

If the idling switch 68 is turned on in the step S12, then since the driver does not step on the accelerator pedal 31, control goes to the step S11 in which the slip control flag $F_S$ is reset. Conversely, if the idling switch 68 is turned off in the step S12, then since the driver is stepping on the accelerator pedal 31, control goes from the step S12 to the step S7.

Figure 38:
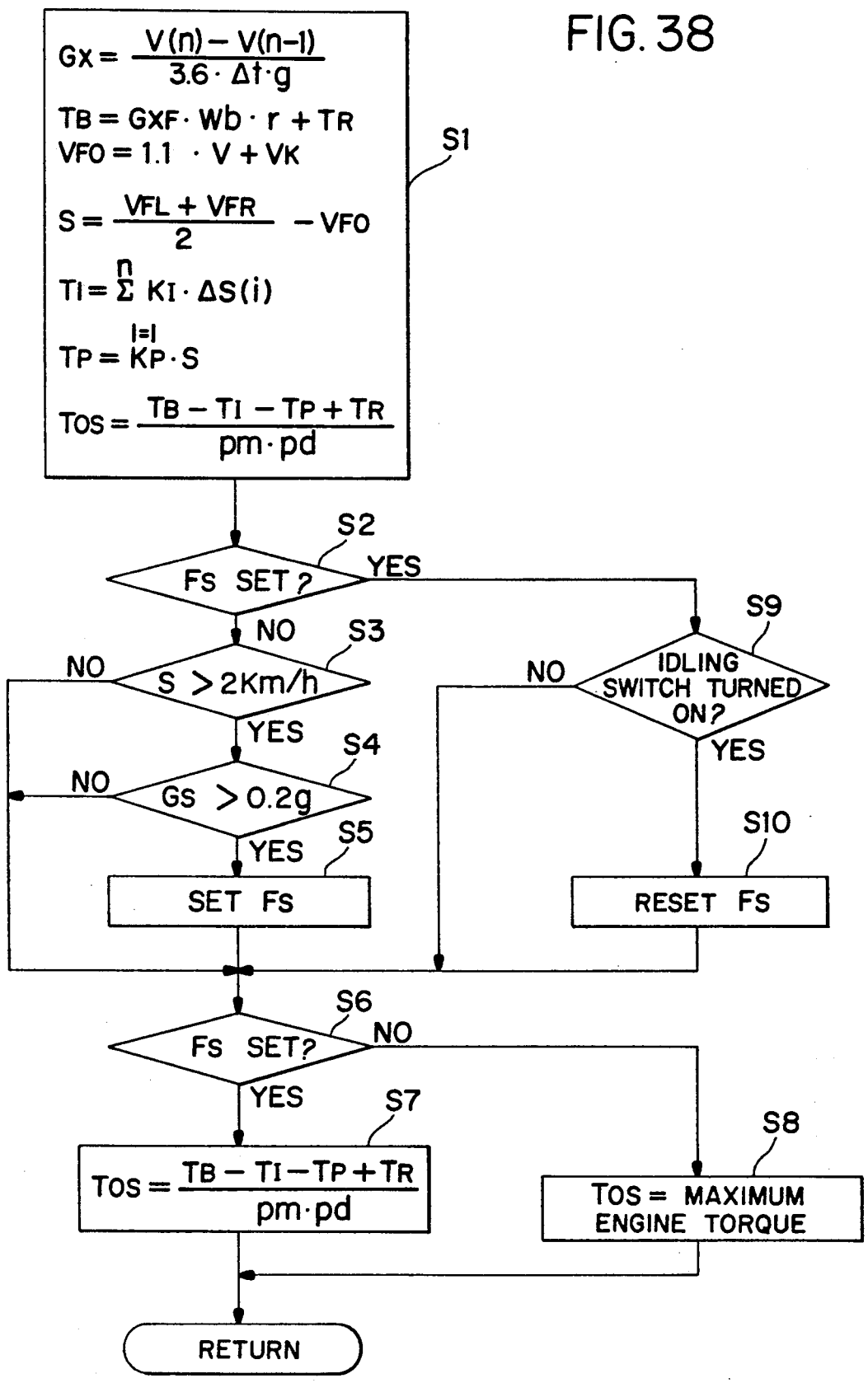
FIG. 38 is a flowchart of a slip control process.

The process for calculating the target drive torque $T_{OS}$ as shown in FIG. 25 may be replaced with a process for calculating the target drive torque $T_{OS}$ as shown in FIG. 38. In the flowchart show in FIG. 38, the target drive torque $T_{OS}$ is calculated for a slip control process which limits the drive torque produced by the engine 11 based on the difference between the vehicle speed V and the peripheral speeds $V_{FL}$, $V_{FR}$ of the front wheels 64, 65.

In order to have the drive torque generated by the engine 11 effectively, it is desirable that the slip ratio S of the tires of the front wheels 64, 65 as they are running be adjusted to be equal to the target slip ratio $S_O$ corresponding to the maximum value of the coefficient of friction between the tires and the road surface or to a value close to the target slip ratio $S_O$, thereby maintaining accelerating capability of the motor vehicle 82. The slip ratio S of the tires is given by:

$$S = \frac{\frac{V_{FL} + V_{FR}}{2} - V}{V}.$$

The target drive torque $T_{OS}$ for the engine 11 is established such that the slip ratio S will be equal to the target slip ratio $S_O$ corresponding to the maximum value of the coefficient of friction between the tires and the road surface or to a value close to the target slip ratio $S_O$. The target drive torque $T_{OS}$ is calculated as described in the following portion.

The TCL 76 calculates the present longitudinal acceleration $G_X$ of the motor vehicle 82 based on a present vehicle speed $V_{S(n)}$ which is calculated according to the equation (1) and a vehicle speed $V_{S(n-1)}$ which has been calculated in a preceding cycle, according to the equation below:

$$G_X = \frac{V_{(n)} - V_{(n-1)}}{3.6 \cdot \Delta t \cdot g}$$

where $\Delta t$ is the sampling period, which is of 15 milliseconds, of the main timer, and g is the gravitational acceleration.

Figure 37:
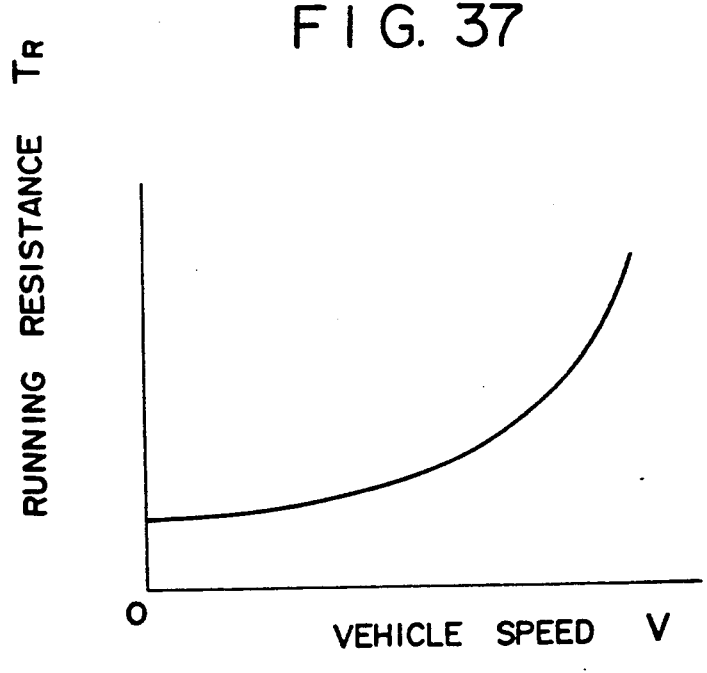
FIG. 37 is a graph showing a map which indicates a vehicle speed and a running resistance.

The drive torque $T_B$ of the engine 11 at this time is calculated according to the following equation (4)':

$$T_B = G_{XF} \cdot W_b \cdot r + T_R \quad (4)'$$

where $G_{XF}$ is the corrected longitudinal acceleration which has passed through a low-pass filter that delays a change in the longitudinal acceleration $G_X$. Since the longitudinal acceleration $G_X$ of the motor vehicle 82 is regarded as being equivalent to the coefficient of friction between the tires and the road surface, the low-pass filter corrects the longitudinal acceleration $G_X$ such that the slip ratio S of the ties will be equal to the target slip ratio $S_O$ corresponding to the maximum value of the coefficient of friction between the tires and the road surface or to a value close to the target slip ratio $S_O$, even when the longitudinal acceleration $G_X$ varies tending to cause the slip ratio S to deviate from the target slip ratio S or a value close thereto. In the equation (4)', $W_b$ represents the weight of the motor vehicle, r the effective radius of the front wheels 64, 65, and $T_R$ the running resistance. The running resistance $T_R$ may be calculated as a function of the vehicle speed V, but is determined from a map shown in FIG. 37 in the illustrated embodiment.

While the motor vehicle 82 is being accelerated, the slip of the wheels with respect to the road surface is usually about 10%. When the motor vehicle 82 runs on a rough road such as a graveled road, the maximum value of the coefficient of friction between the tires and the road surface, which maximum value corresponds to the target slip ratio $S_O$, is generally larger than when the motor vehicle 82 runs on a low-$\mu$ road. In view of the slip and road condition, the target drive wheel speed $V_{FO}$ which is the peripheral speed of the front wheels 64, 65 is calculated according to the following equation:

$$V_{FO} = 1.1 \cdot V + V_K$$

where $V_K$ is a predetermined road surface corrective amount which corresponds to the corrected longitudinal acceleration $G_{XF}$, and increases stepwise as the corrected longitudinal acceleration $G_{XF}$ becomes greater. In the illustrated embodiment, the road surface corrective amount $V_K$ is read from the dot-and-dash-line curve in the map shown in FIG. 14 which has been generated on the basis of running tests.

The slip s which is the difference between the vehicle speed V and the target drive wheel speed $V_{FO}$ is calculated as follows:

$$s = \frac{V_{FL} + V_{FR}}{2} - V_{FO}.$$

As seen in the equation (I) below, the slip s is multiplied by an integral coefficient $K_I$ and integrated in each sampling period of the main timer, thereby producing an integrally corrected torque $T_I$ ($T_I \leq 0$) for increased control stability with respect to the target drive torque $T_{OS}$.

$$T_I = \sum_{i=1}^{n} K_I \cdot s_{(i)}. \quad (I)$$

Similarly, a proportionally corrected torque $T_P$ for lessening a control delay with respect to the target drive torque $T_{OS}$ which is proportional to the slip s is multiplied by a proportional coefficient $K_P$, as indicated by the equation (P):

$$T_P = K_P s \quad (P).$$

Using the equations (4), (I), and (P), the target drive torque $T_{OS}$ for the engine 11 is calculated according to the equation (6)':

$$T_{OS} = \frac{T_B - T_I - T_P + T_R}{\rho_m \cdot \rho_d} \quad (6)'$$

where $\rho_m$ is the speed reduction ratio of the transmission, and $\rho_d$ is the speed reduction ratio of the differential.

The motor vehicle 82 has a manual switch (not shown) with which the driver can select the slip control process. When the driver operates on the manual switch to select the slip control process, the slip control process as described in the following portion is carried out:

The slip control process is shown in the flowchart of FIG. 38. As shown in FIG. 38, the TCL 76 calculates the target drive torque $T_{OS}$ through the detection of various data and calculation steps, as described above, in a step S1'. The calculation of the target drive torque $T_{OS}$ is effected irrespective of the operation of the manual switch.

Then, the TCL 76 determines whether the slip control flag $F_S$ is set or not in a step S2'. Since the slip control flag $F_S$ is not initially set, the TCL 76 determines, in a step S3', whether the slip s of the front wheels 64, 65 is larger than a predetermined threshold value, e.g., 2 km/hour, or not. If the slip s is larger than 2 km/hour in the step S3', then the TCL 76 determines, in a step S4', whether the rate of change $G_s$ of the slip s is larger than 0.2 g or not.

If the rate of change $G_s$ is larger than 0.2 g in the step S4', then the TCL 76 sets the slip control flag $F_S$ in a step S5', and determines again whether the slip control flag $F_S$ is set or not in a step S6'.

If the slip control flag $F_S$ is set in the step S6', then the TCL 76 employs the target drive torque $T_{OS}$ for the slip control torque, which has been calculated according to the equation (6)', as the target drive torque $T_{OS}$ for the engine 11, in a step S7'.

If the slip control flag $F_S$ is reset in the step S6', then the TCL 76 employs the maximum torque of the engine 11 as the target drive torque $T_{OS}$ in a step S8'. Since the ECU 15 reduces the duty ratio of the torque control solenoid-operated valves 51, 56 to 0%, the engine 11 produces a drive torque depending on the depression by the driver of the accelerator pedal 31.

The TCL 76 employs the maximum torque of the engine 11 in the step S8' because the ECU 15 necessarily reduces the duty ratio of the torque control solenoid-operated valves 51, 56, i.e., de-energizes the torque control solenoid-operated valves 51, 56 for control safety, so that the engine 11 can reliably produce a drive torque depending on the depression by the driver of the accelerator pedal 31.

If the slip s of the front wheels 64, 65 is smaller than 2 km/hour in the step S3', or if the rate of change $G_s$ of the slip s is smaller than 0.2 g in the step S4', then control jumps to the step S6'. The TCL 76 employs the maximum torque of the engine 11 as the target drive torque $T_{OS}$ in the step S8', and the ECU 15 reduces the duty ratio of the torque control solenoid-operated valves 51, 56 to 0%, with the result that the engine 11 produces a drive torque depending on the depression by the driver of the accelerator pedal 31.

If the slip control flag $F_S$ is set in the step S2', the TCL 76 determines, in a step S9', whether the idling switch 68 is turned on, i.e., the throttle valve 15 is fully closed, or not.

If the idling switch 68 is turned on in the step S9', then since the driver does not step on the accelerator pedal 31, control goes to a step S10' in which the slip control flag $F_S$ is reset, and control goes to the step S6'.

Conversely, if the idling switch 68 is turned off in the step S9', then the TCL 76 determines again whether the slip control flag $F_S$ is set or not in the step S6'.

When the manual switch for selecting the slip control process is not operated on by the driver, the TCL 76 calculates the target drive torque $T_{OS}$ for the slip control process in the manner as described above, and thereafter calculates a target drive torque for the engine 11 for the turn control process.

The lateral acceleration $G_Y$ on the motor vehicle 82 can actually be calculated using the rear wheel speed difference $|V_{RL}-V_{RR}|$ according to the equation (5). The lateral acceleration $G_Y$ to be imposed on the motor vehicle 32 can be predicted using the steering shaft angular position $\delta_H$, so that quick control can be accomplished.

For the turn control process for the motor vehicle 82, the TCL 76 calculates a target lateral acceleration $G_{YO}$ for the motor vehicle 82 according to the equation (3) from the steering shaft angular position $\delta_H$ and the vehicle speed V, and establishes an acceleration in the longitudinal direction of the motor vehicle 82 such that the motor vehicle 82 will not have an extreme understeer response, i.e., a target longitudinal acceleration $G_{XO}$, based on the target lateral acceleration $G_{YO}$. Then, the TCL 876 calculates a target drive torque $T_{OC}$ for the engine 11 which corresponds to the target longitudinal acceleration $G_{XO}$.

Figure 26:
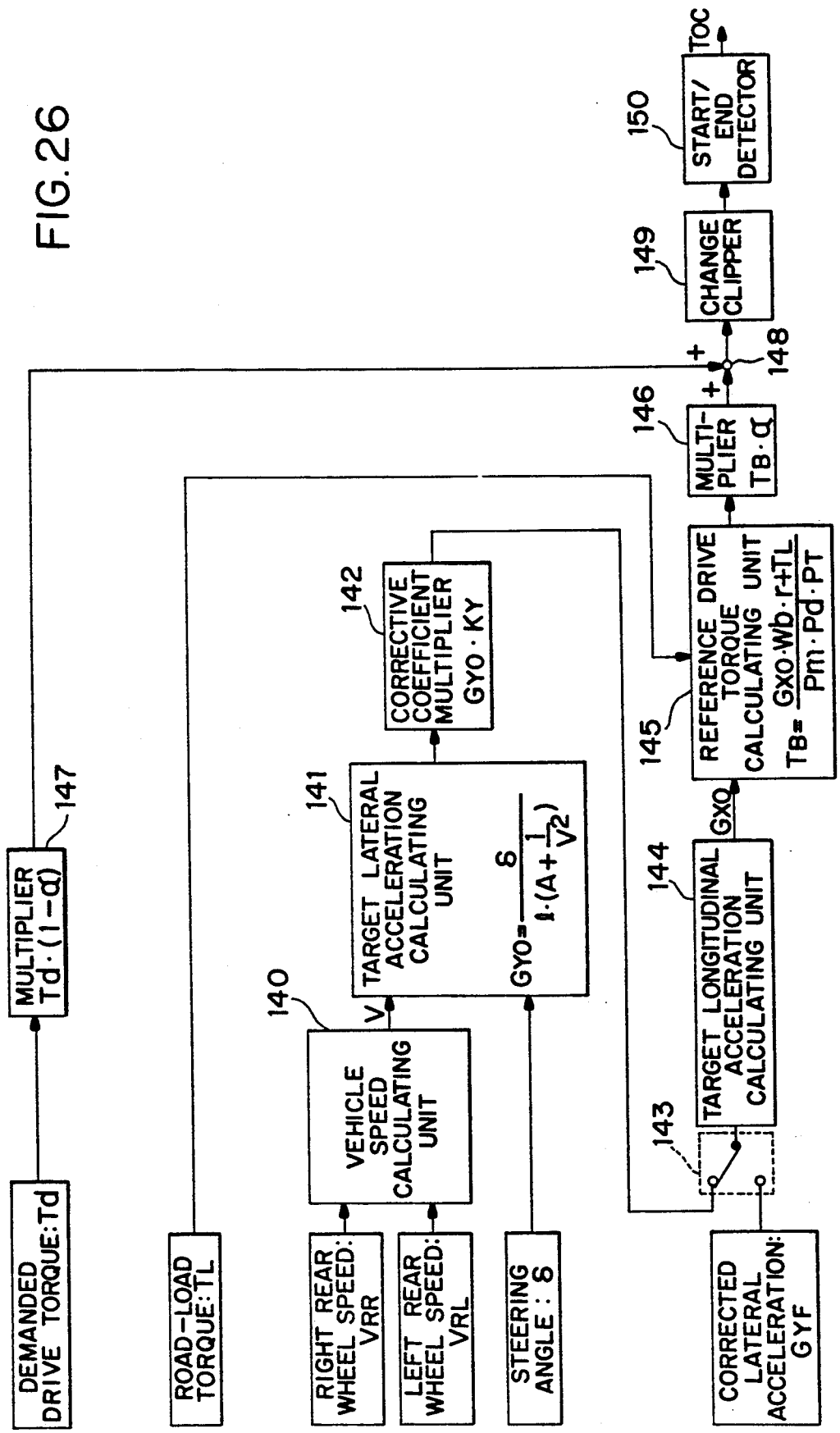
FIG. 26 is a block diagram illustrating a procedure for calculating a target drive torque for a turn control process.
Figure 27:
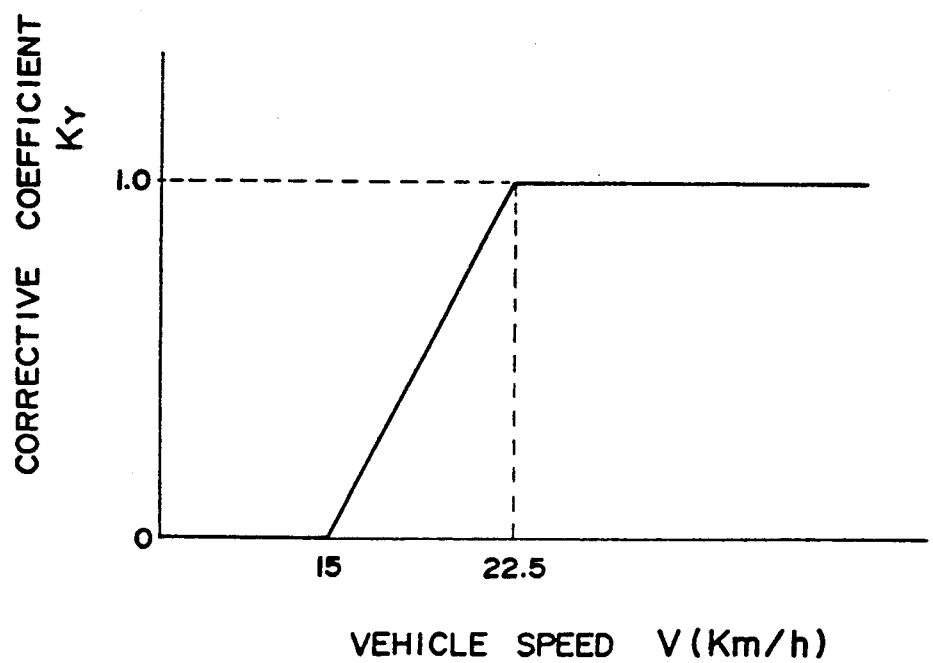
FIG. 27 is a graph showing a map which indicates the relationship between a vehicle speed and a corrective coefficient.

FIG. 26 shows in block form a calculating procedure for the turn control process. The TCL 76 calculates, in a vehicle speed calculating unit 140, the vehicle speed V according to the equation (1) from the output signals from the rear wheel speed sensors 80, 81, and also calculates the steering angle $\delta$ of the front wheels 64, 65 according to the equation (2) based on the detected signal from the steering angle sensor 84. A target lateral acceleration calculating unit 141 then calculates a target lateral acceleration $G_{YO}$ for the motor vehicle 82 according to the equation (3). If the vehicle speed V is in a low range, e.g., below 22.5 km/hour, then the motor vehicle 82 can sufficiently be accelerated upon a right or left turn at an intersection with heavy traffic by inhibiting the turn control process rather than effecting the turn control process. For better safety, therefore, the target lateral acceleration $G_{YO}$ is multiplied by a corrective coefficient $K_Y$ (FIG. 27) depending on the vehicle speed V in a corrective coefficient multiplier 142.

When the steering shaft neutral position $\delta_M$ is not learned, calculation of the target lateral acceleration $G_{YO}$ based on the steering angle 6 according to the equation (3) would pose a problem with respect to control reliability. It is therefore desirable that the turn control process be not started until the steering shaft neutral position $\delta_M$ is learned. When the motor vehicle 82 runs along a curved path immediately after it has started, the condition for starting to learn the steering shaft neutral position $\delta_M$ is not satisfied, and the turn control process is not started though the motor vehicle 82 actually needs the turn control process. In this embodiment, until the steering shaft neutral position $\delta_M$ is learned, the turn control process can be carried out with a switch 143, using the corrected lateral acceleration $G_{YF}$ from the filter unit 123 which has been calculated according to the equation (5). Specifically, insofar as both the steering angle neutral position learned flags $F_{HN}$, $F_H$ are reset, the corrected lateral acceleration $G_{YF}$ is selected by the switch 143. When at least one of the steering angle neutral position learned flags $F_{HN}$, $F_H$ is set, the target lateral acceleration $G_{YO}$ from the corrective coefficient multiplier 142 is selected by the switch 143.

The stability factor A is of a value determined depending on the structure of the suspensions of the motor vehicle 82, the properties of the tires, or the road condition. More specifically, the stability factor A is expressed as the gradient of a tangent line in the graph of FIG. 28 which shows the relationship between the actual lateral acceleration $G_Y$ which is applied to the motor vehicle 82 upon a normal circular turn and the steering angle ratio $\delta_H/\delta_{HO}$ of the steering shaft 83 at this time (i.e., the ratio of the angle $\delta_H$ of the steering shaft 83 upon acceleration to the angle $\delta_{HO}$ thereof while the motor vehicle 82 is running at a very low speed when the lateral acceleration $G_Y$ is nearly 0). In a range in which the lateral acceleration $G_Y$ is small and the vehicle speed V is not very high, the stability factor A is of a substantially constant value (=0.002). When the lateral acceleration $G_Y$ exceeds 0.6 g, the stability factor A greatly increases, causing the motor vehicle 82 to exhibit a very strong understeer response.

Figure 28:
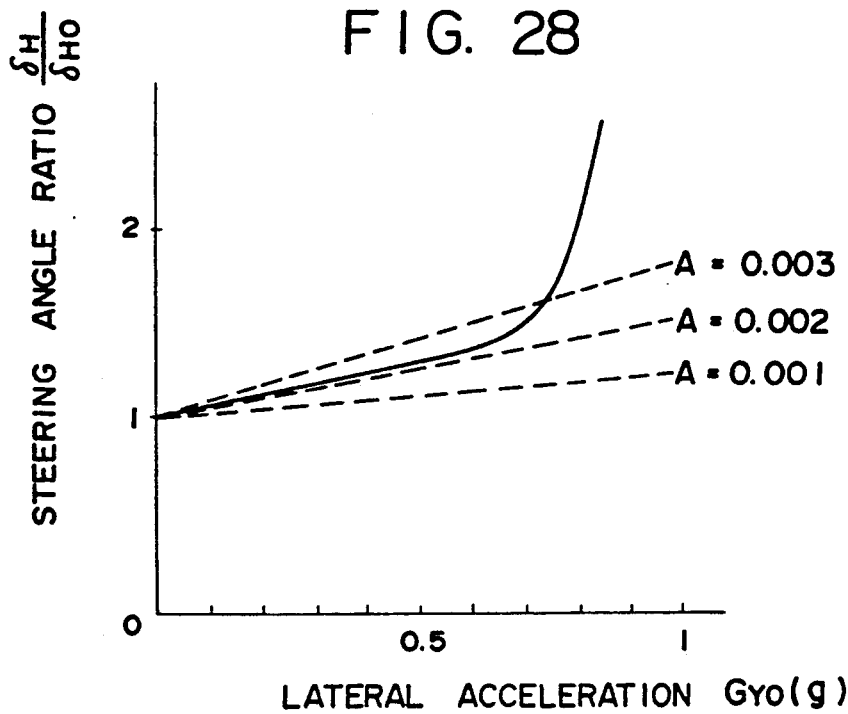
FIG. 28 is a graph showing a map which indicates the relationship between a lateral acceleration and a steering angle ratio for the explanation of a stability factor.

On the basis of the map shown in FIG. 28 which corresponds to a dry paved road (high-$\mu$ road), the stability factor A is set to 0.002, and the drive torque of the engine 11 is controlled so that the target lateral acceleration $G_{YO}$ for the motor vehicle 82 which is calculated according to the equation (3) will be less than 0.6 g.

For a slippery road such as an ice-covered road (low-$\mu$ road), the stability factor A may be set to about 0.005, for example. Inasmuch as the target lateral acceleration $G_{YO}$ is greater than the actual lateral acceleration $G_Y$ on the low-$\mu$ road, it is determined whether the target lateral acceleration $G_{YO}$ is larger than a predetermined threshold value, e.g., ($G_{YF}-2$), and if the target lateral acceleration $G_{YO}$ is larger than the threshold value, then it is determined that the motor vehicle 82 is running on a low-$\mu$ road, and the turn control process for the low-μ road is effected as required. Specifically, it is determined whether the target lateral acceleration $G_{YO}$ is larger than the threshold value, which is the sum of 0.005 g and the corrected lateral acceleration $G_{YF}$ calculated according to the equation (5), because the target lateral acceleration $G_{YO}$ is larger than the actual lateral acceleration $G_Y$ on the low-μ road, and if the target lateral acceleration $G_{YO}$ is larger than the threshold value, then it is determined that the motor vehicle 82 is running on the low-μ road.

Figure 29:
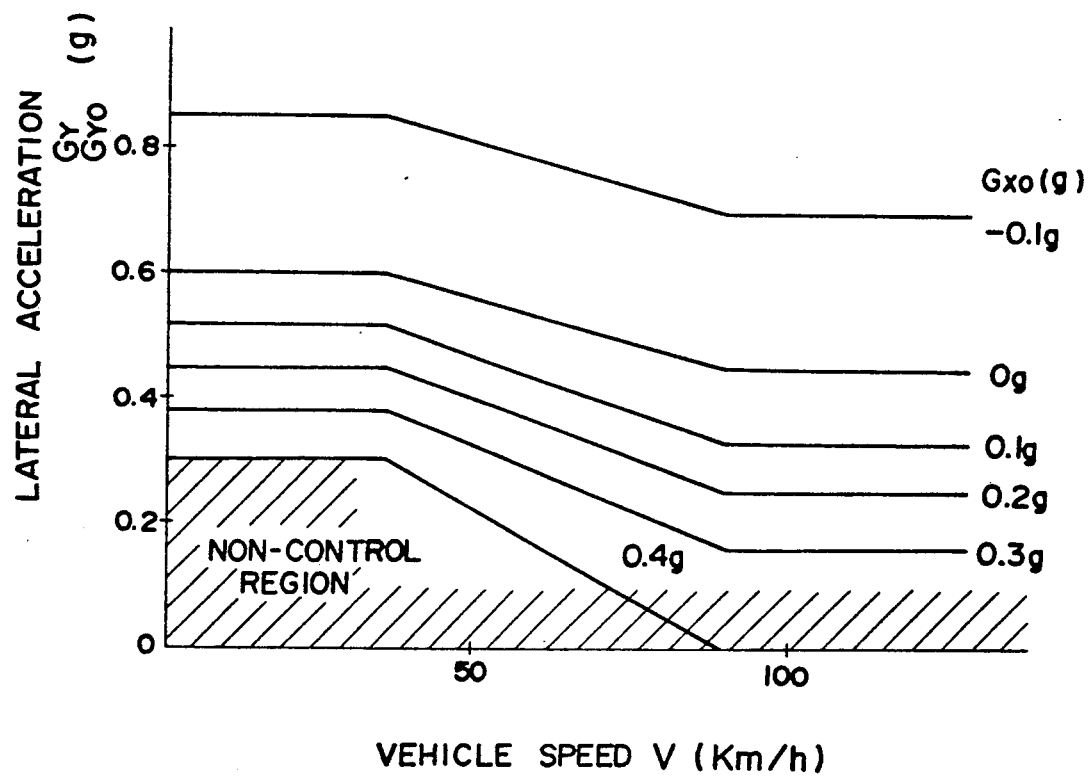
FIG. 29 is a graph showing a map which indicates the relationship between a target lateral acceleration, a target longitudinal acceleration, and a vehicle speed.

After the target lateral acceleration $G_{YO}$ has been calculated, the target longitudinal acceleration $G_{XO}$ for the motor vehicle 82, which has been established depending on the magnitude of the target lateral acceleration $G_{YO}$ and the vehicle speed V, is read from a map shown in FIG. 29, which is stored in the TCL 76, by a target longitudinal acceleration calculating unit 144. Then, the reference drive torque $T_B$ of the engine 11 which corresponds to the target longitudinal acceleration $G_{XO}$ is calculated in a reference drive torque calculating unit 145 according to the following equation (7):

$$T_B = \frac{G_{XO} \cdot W_b \cdot r + T_L}{\rho_m \cdot \rho_d \cdot \rho_T} \quad (7)$$

where $T_L$ is the road-load torque which is the resistance from the road surface and is determined as a function of the lateral acceleration $G_Y$ of the motor vehicle 82. The roadload torque $T_L$ is determined from a map shown in FIG. 30 in this embodiment.

If the target drive torque for the engine 11 were determined from only the steering shaft angle $\delta_H$ and the vehicle speed V, the intention of the driver would not be reflected at all, and the driver would not find the motor vehicle 82 satisfactorily maneuverable. It is thus preferable that the drive torque $T_d$ demanded by the driver from the engine 11 be determined from the depression of the accelerator pedal 31, and the target drive torque for the engine 11 be established in view of the demanded drive torque $T_d$.

According to the present embodiment, in order to determine the ratio at which the reference drive torque $T_B$ is employed, the reference drive torque $T_B$ is multiplied by a weighting coefficient c in a multiplier 146, thereby producing a corrected reference drive torque. The weighting coefficient $\alpha$ is empirically selected based on actual turns of the motor vehicle 82, and is about 0.6 for high-μ roads.

Based on the engine speed $N_E$ detected by the crankshaft angle sensor 55 and the accelerator opening $\theta_A$ detected by the accelerator opening sensor 77, the demanded drive torque $T_d$ desired by the driver is determined from the map shown in FIG. 24, and then the demanded drive torque $T_d$ is multiplied by $(1-\alpha)$ in a multiplier 147, thus producing a corrected demanded drive torque corresponding to the weighting coefficient $\alpha$. If $\alpha=0.6$, for example, then the reference drive torque $T_B$ and the demanded drive torque $T_d$ are employed at a ratio of 6 to 4. The accelerator opening $\theta_A$ is also of a value corrected at the detected fully closed position of the accelerator sensor 77.

Therefore, the target drive torque $T_{OC}$ for the engine 11 is calculated in an adder 148 according to the following equation (8):

$$T_{OC} = \alpha \cdot T_B + (1-\alpha) \cdot T_d \quad (8)$$

In the event that the target drive torque $T_{OC}$ for the engine 11 which is established every 15 milliseconds increases and decreases by a large amount, shocks are produced by acceleration or deceleration of the motor vehicle 82, lowering the riding comfort on the motor vehicle 82. If the amount by which the target drive torque $T_{OC}$ for the engine increases and decreases is large enough to lower the riding comfort on the motor vehicle 82, then it is desirable to limit the amount by which the target drive torque $T_{OC}$ increases and decreases.

In this embodiment, if the absolute value 51 $\Delta T |$ of the difference between a target drive torque $T_{OC(n)}$ and a target drive torque $T_{OC(n-1)}$ which are calculated presently and previously, respectively, in a change clipper 149 is smaller than an allowable amount $T_K$ by which the target drive torque $T_{OC}$ can increase and decrease, then the presently calculated target drive torque $T_{OC(n)}$ is employed as it is. If, however, the difference $\Delta T$ between the presently calculated target drive torque $T_{OC(n)}$ and the previously calculated target drive torque $T_{OC(n-1)}$ is not larger than a negative allowable amount $T_K$ of torque increase and decrease, then the present target drive torque $T_{OC(n)}$ is established according to the following equation:

$$T_{OC(n)} = T_{OC(n-1)} - T_K.$$

Thus, a reduction in the previously calculated target drive torque $T_{OC(n-1)}$ is limited by the allowable amount $T_K$ of torque increase and decrease, thereby reducing a deceleration shock produced when the drive torque of the engine 11 is reduced. If the difference $\Delta T$ between the presently calculated target drive torque $T_{OC(n)}$ and the previously calculated target drive torque $T_{OC(n-1)}$ is larger than the allowable amount $T_K$ of torque increase and decrease, then the present target drive torque $T_{OC(n)}$ is established according to the following equation:

$$T_{OC(n)} = T_{OC(n-1)} + T_K.$$

Therefore, if the difference $\Delta T$ between the presently calculated target drive torque $T_{OC(n)}$ and the previously calculated target drive torque $T_{OC(n-1)}$ exceeds the allowable amount $T_K$ of torque increase and decrease, then an increase in the previously calculated target drive torque $T_{OC(n-1)}$ is limited by the allowable amount $T_K$ of torque increase and decrease, thereby reducing an acceleration shock produced when the drive torque of the engine 11 is increased.

Figure 41:
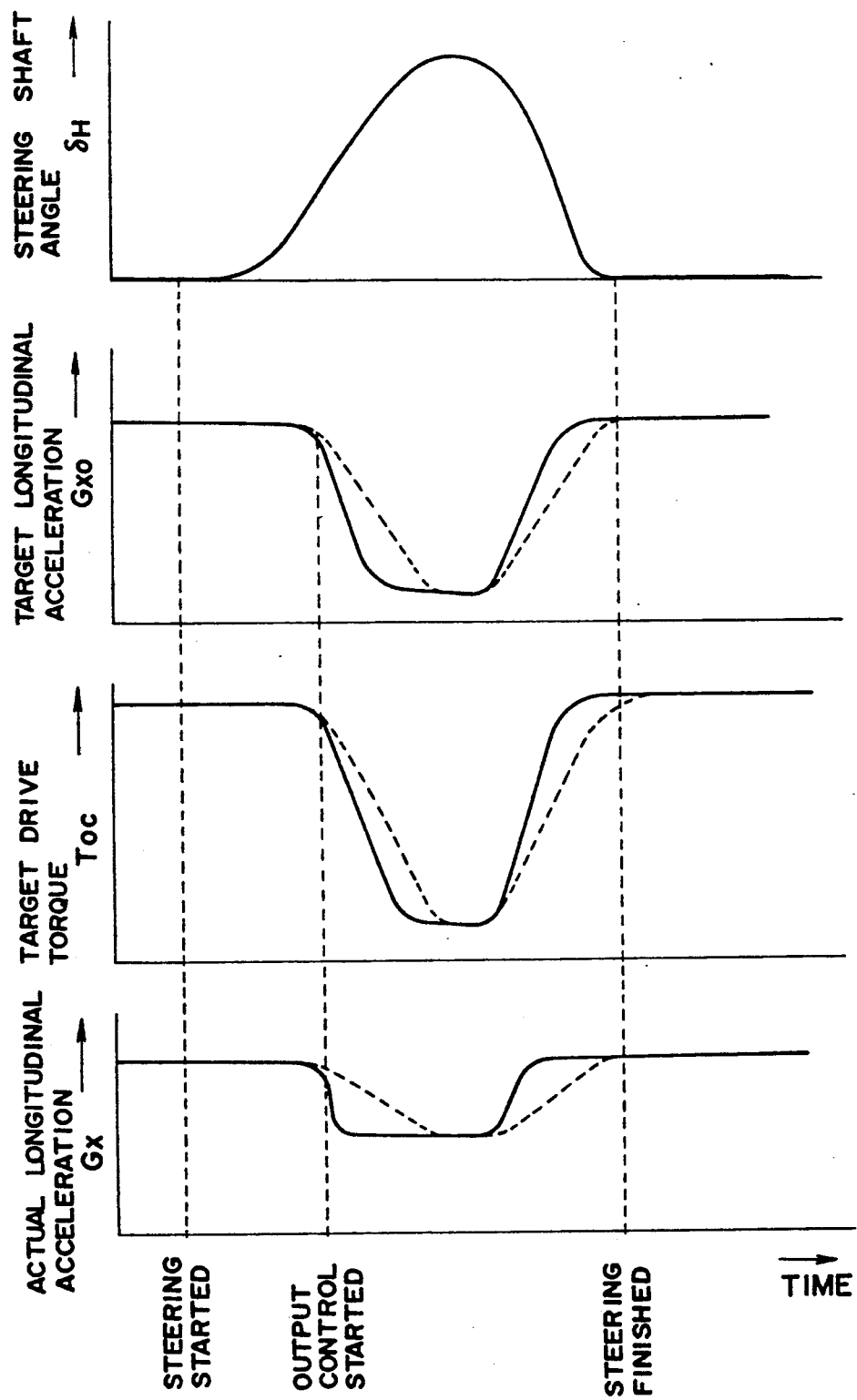
FIG. 41 is a graph showing the relationship between a steering shaft angle, a target drive torque, and a longitudinal acceleration.

FIG. 41 indicates, with solid-line curves, how the steering shaft angle $\delta_H$, the target longitudinal acceleration $G_{XO}$, the target drive torque $T_{OC}$, and the actual longitudinal acceleration $G_X$ vary at the time the increase and decrease in the target drive torque $T_{OC}$ are limited. It can be seen from FIG. 41 that the actual longitudinal acceleration $G_X$ varies more smoothly than would be if the increase and decrease in the target drive torque $T_{OC}$ were not limited, as indicated by the dotted-line curves, and the acceleration and deceleration shocks are reduced.

Thereafter, information relative to the target drive torque $T_{OC}$ is issued to the ECU 15 by a start/end detector 150 which determines the start or end of the turn control process.

When all conditions (a) through (d) given below are satisfied, the start/end detector 150 determines that the turn control process is started, and sets the turn control flag $F_C$. The start/end detector 150 also transmits the information relative to the target drive torque $T_{OC}$ to the ECU 15, and continues the above operation until it detects the end of the turn control process and resets the turn control flag $F_C$.

(a) The target drive torque $T_{OC}$ does not reach a value which is provided by subtracting a threshold value, e.g., 2 kgm, from the demanded drive torque $T_d$.

(b) The driver of the motor vehicle 82 operates on a manual switch (not shown) for the turn control process.

(c) The idling switch 68 is turned off.

(d) The control system for turning the motor vehicle 82 is normal.

If any one of conditions (e), (f), below, is satisfied after the start of the turn control process is detected by the start/end detector 150, then the start/end detector 150 determines that the turn control process comes to an end, and resets the turn control flag $F_C$. The start/end detector 150 also stops the transmission of the target drive torque $T_{OC}$ to the ECU 15.

(e) The target drive torque $T_{OC}$ is equal to or higher than the demanded drive torque $T_d$.

(f) The control system for turning the motor vehicle 82 is abnormal owing to a failure, a wire breakage, or the like.

Detection of the fully closed position of the accelerator opening sensor 77 will be described below.

As described before, the output voltage from the accelerator opening sensor 77 and the accelerator opening $\theta_A$ are proportional to each other, and the accelerator sensor 77 is mounted in the throttle body 21 such that when the accelerator opening $\theta_A$ is fully closed, the output voltage from the accelerator sensor 77 is 0.6 volt, for example. When the accelerator opening sensor 77 is detached and attached again for motor vehicle inspection, it is virtually impossible to put the accelerator opening sensor 77 exactly back into its original position. In addition, the accelerator opening sensor 77 may be displaced in position with respect to the throttle body 21 over a long period of time.

According to the present embodiment, the fully closed position of the accelerator opening sensor 77 is detected, learned, and corrected, so that the accelerator opening $\theta_A$ calculated on the basis of the detected signal from the accelerator opening sensor 77 is made highly reliable.

Figures 30, 31:
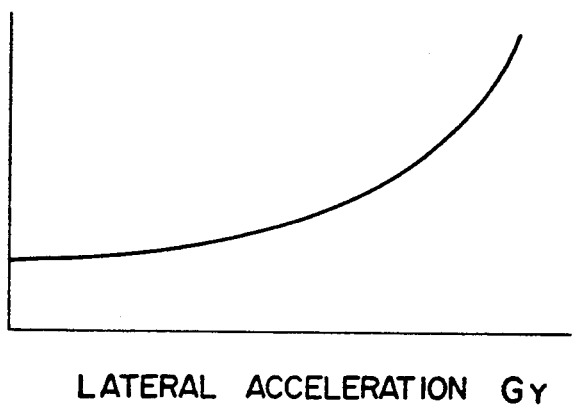
FIG. 30 is a graph showing the relationship between a lateral acceleration and a road-load torque.
FIG. 31 is a diagram showing a procedure for learning and correcting a fully closed position detected by an accelerator opening sensor.

FIG. 31 shows a procedure for learning and correcting the fully closed position detected by the accelerator opening sensor 77. As shown in FIG. 31, after the idling switch 68 is turned on and the ignition key switch 75 is turned off, the output voltage from the accelerator opening sensor 77 is monitored for a certain period of time, e.g., 2 seconds. A minimum value $\theta_{AL}$ of the output voltage of the accelerator opening sensor 77 is read as the fully closed position of the accelerator opening $\theta_A$, and stored in a RAM (not shown) with a backup in the ECU 15. The accelerator opening $\theta_A$ is corrected with the stored minimum value of the output voltage from the accelerator opening sensor 77 being used as a reference, until the fully closed position is learned next time.

Figure 32:
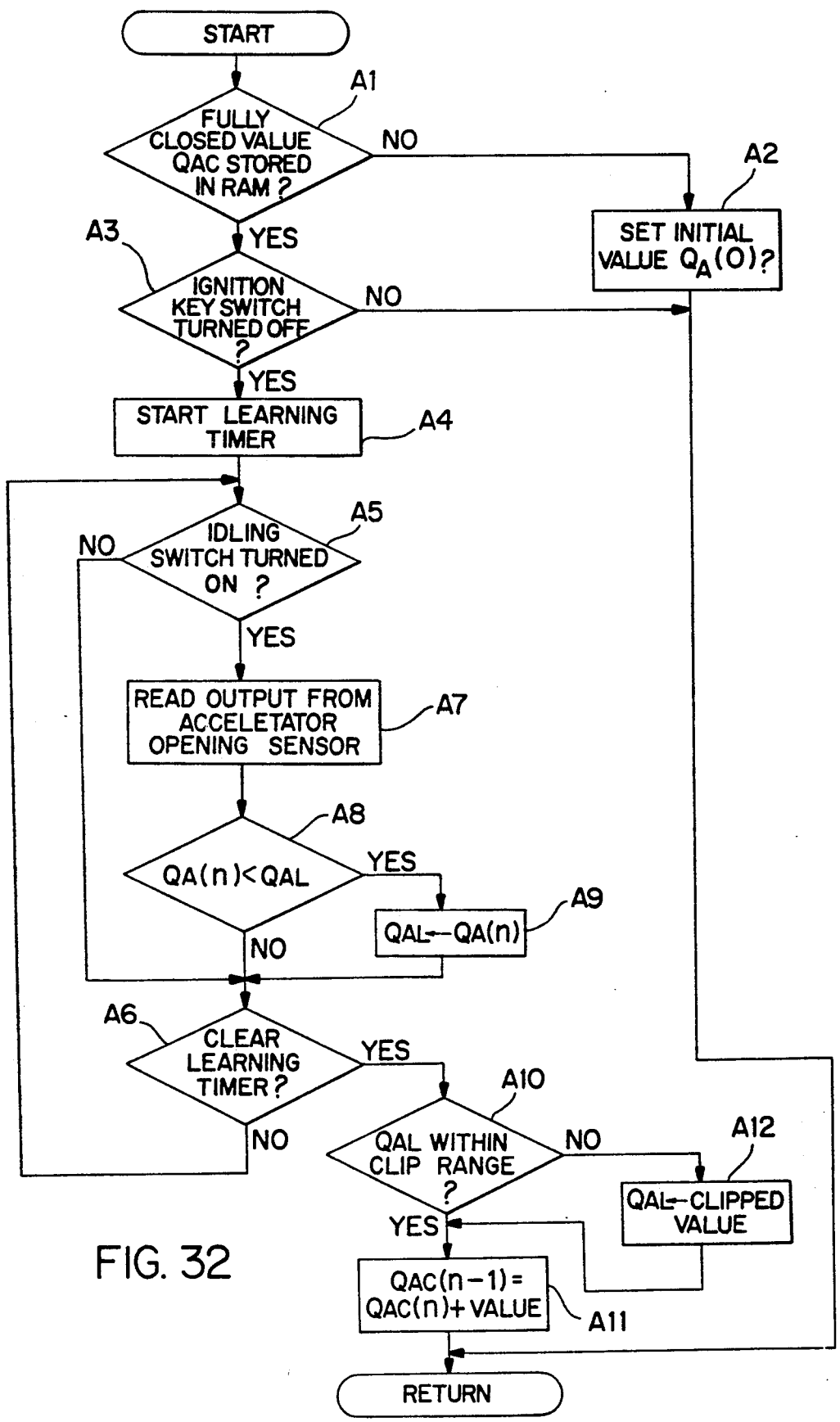
FIG. 32 is a flowchart of another process for learning and correcting a fully closed position detected by a accelerator opening sensor.

When the battery (not shown) on the motor vehicle 82 is removed, however, since the data stored in the RAM are erased, the learning procedure shown in FIG. 32 is employed.

The TCL 76 first determines, in a step A1, whether the fully closed position $\theta_{AC}$ of the accelerator opening $\theta_A$ is stored in the RAM or not. If the fully closed position $\theta_{AC}$ is not stored in the RAM in the step A1, then the TCL 76 stores an initial value $\theta_{A(O)}$ in the RAM in a step A2.

If the fully closed position $\theta_{AC}$ is stored in the RAM in the step A1, then the TCL 76 determines whether the ignition key switch 75 is turned off or not in a step A3. In the ignition key switch 75 is turned off in the step A3, then the TCL 76 instructs a learning timer (not shown) to start counting time in a step A4. After the learning timer starts counting time, the TCL 76 determines whether the idling switch 68 is turned on or not in a step A5.

If the idling switch 68 is turned off in the step A5, then the TCL 76 determines whether the count of the learning timer has reached a predetermined value, e.g., 2 seconds, or not in a step A6, and then control returns to the step A5. If the idling switch 68 is turned on in the step A5, then the TCL 76 reads the output voltage from the accelerator opening sensor 77 in a prescribed period in a step A7, and then determines whether the present accelerator opening $\theta_{A(n)}$ is smaller than the previous minimum value $\theta_{AL}$ of the accelerator opening $\theta_A$ or not in a step A8.

If the present accelerator opening $\theta_{A(n)}$ is larger than the previous minimum value $\theta_{AL}$ of the accelerator opening $\theta_A$ in the step A8, then the TCL 76 maintains the previous minimum value $\theta_{AL}$ of the accelerator opening $\theta_A$. Conversely, if the present accelerator opening $\theta_{A(n)}$ is smaller than the previous minimum value $\theta_{AL}$ of the accelerator opening $\theta_A$ in the step A8, then the present accelerator opening $\theta_{A(n)}$ is employed as a new minimum value $\theta_{AL}$ in a step A9. The above procedure is repeated until the count of the learning timer reaches the prescribed value, e.g., 2 seconds, in the step A6. The present fully closed position $\theta_{AC(n)}$ may be determined in the above manner, but control further proceeds to a clipping process in the illustrated embodiment.

When the count of the learning timer has reached the prescribed value, the TCL 76 determines, in a step A10, whether the minimum value $\theta_{AL}$ of the accelerator opening $\theta_A$ lies in a predetermined clip range, i.e., between 0.3 volt and 0.9 volt, or not. If the minimum value $\theta_{AL}$ of the accelerator opening $\theta_A$ is in the predetermined clip range, then the TCL 76 regards, in a step A11, the initial value $\theta_{A(O)}$ or the fully closed value $\theta_{AC}$ of the accelerator opening $\theta_A$, as it is shifted a certain value, e.g., 0.1 volt, in a direction toward the minimum value $\theta_{AL}$, as the presently learned fully closed value $\theta_{AC(n)}$. Thus, in case the initial value $\theta_{A(O)}$ or the fully closed value $\theta_{AC}$ of the accelerator opening $\theta_A$ is larger than the minimum value $\theta_{AL}$, then the presently learned fully closed value $\theta_{AC(n)}$ is established as:

$$\theta_{AC(n)} = \theta_{A(O)} - 0.1$$

or $$\theta_{AC(n)} = \theta_{AC(n-1)} - 0.1.$$

In case the initial value $\theta_{A(O)}$ or the fully closed value $\theta_{AC}$ of the accelerator opening $\theta_A$ is smaller than the minimum value $\theta_{AL}$, then the presently learned fully closed value $\theta_{AC(n)}$ is established as:

$$\theta_{AC(n)} = \theta_{A(0)} + 0.1$$

or $$\theta_{AC(n)} = \theta_{AC(n-1)} + 0.1.$$

If the minimum value $\theta_{AL}$ of the accelerator opening $\theta_A$ is outside the predetermined clip range in the step A10, then the limit value of the clip range which the minimum value $\theta_{AL}$ exceeds is employed as the minimum value $\theta_{AL}$ in a step A12, and then control goes to the step A11 in which the value as it is shifted a certain value toward this new minimum value $\theta_{AL}$ is employed as the presently learned fully closed value $\theta_{AC(n)}$ of the accelerator opening $\theta_A$.

The step A11 may be carried out immediately after the count of the learning timer has reached the prescribed value in the step A6. Specifically, the previous fully closed value $\theta_{AC(n-1)}$ is shifted a certain value toward the present minimum value $\theta_{AL}$, and regarded as the present fully closed value $\theta_{AC(n)}$. Thereafter, it is determined whether the present fully closed value $\theta_{AC(n)}$ falls within the clip range or not. If it falls within the clip range, then control returns, and if it does not fall within the clip range, then the present fully closed value $\theta_{AC(n)}$ is employed as the limit value of the clip range, after which control returns.

Since the upper and lower limits are established for the minimum value $\theta_{AL}$ of the accelerator opening $\theta_A$, no erroneous learning is carried out even when the accelerator opening sensor 77 fails. Because the amount by which the fully closed value is corrected in one cycle is set to a certain value, no erroneous learning takes place even in the presence of disturbances such as noise.

In the above embodiment, the fully closed value $\theta_{AC}$ of the accelerator opening sensor 77 starts being learned when the ignition key switch 75 is turned off. However, insofar as it is clear that the driver does not want to drive the motor vehicle 82 and the engine 11 is idling, the fully closed value may be detected, learned, and corrected. To this end, a seating sensor may be incorporated in a driver's seat, and when the seating sensor detects the driver unseated off the driver's seat through a change in the pressure on the driver's seat or a positional displacement, even with the ignition key switch 75 being turn on, the learning process following the step A4 may be initiated. Furthermore, when it is detected that a door lock device (not shown) is operated on from outside of the motor vehicle 82 or by a key entry system, the fully closed value $\theta_{AC}$ of the accelerator opening sensor 77 may start being learned. Alternatively, when the gearshift (not shown) of the hydraulic automatic transmission 13 is in a neutral or parking position (neutral position if a manual transmission is used), and the manual parking brake is applied, and also when the air conditioning system is turned off, i.e., when the idling speed is not high, the fully closed value $\theta_{AC}$ may start to be learned.

The motor vehicle 82 has a manual switch (not shown) with which the driver can select the turn control process. When the driver operates on the manual switch to select the slip control process, the following turn control process is carried as described in the following portion.

Figure 33:
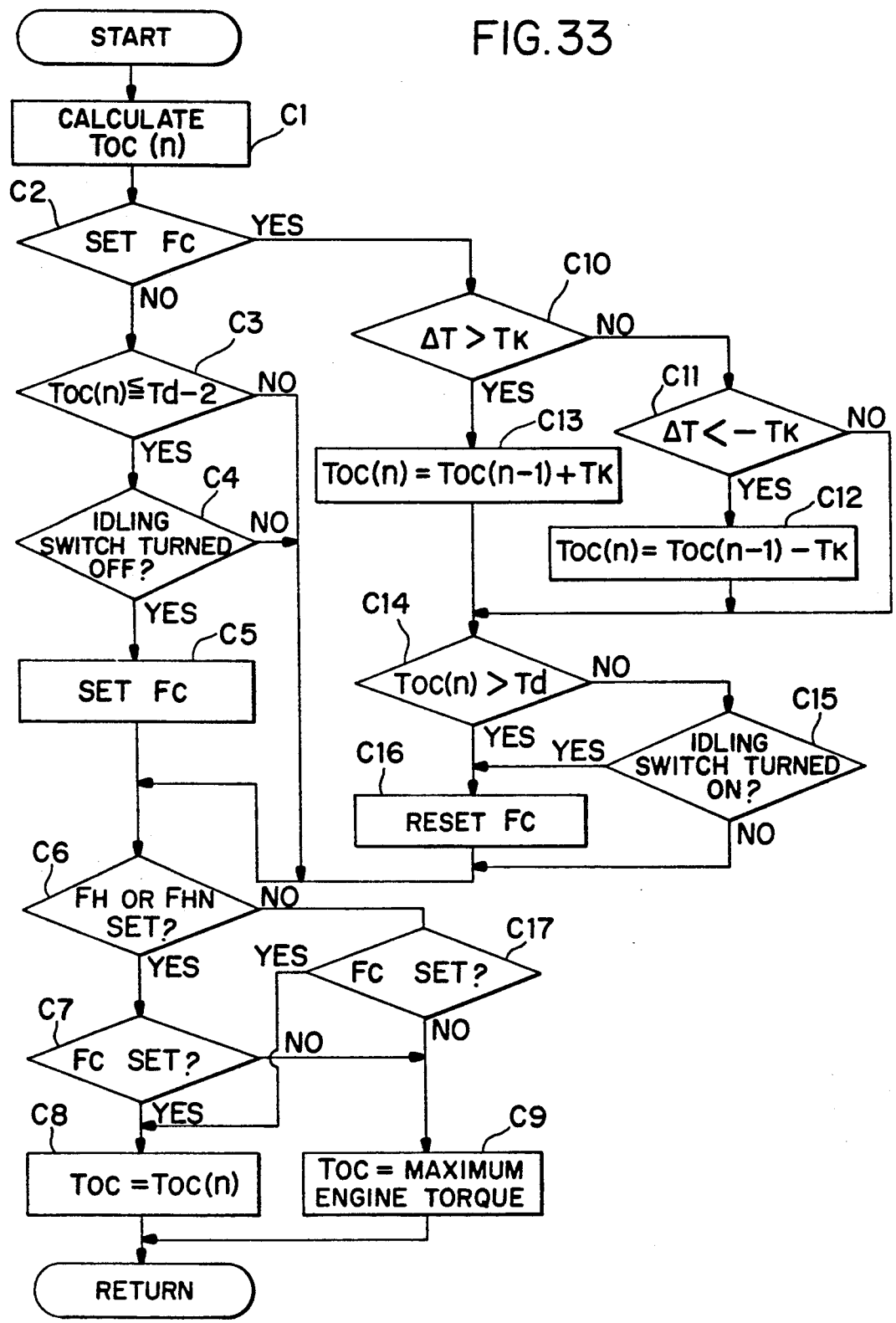
FIG. 33 is a flowchart of a turn control process.

FIG. 33 shows a control sequence for determining a target drive torque $T_{OC}$ for the turn control process for high-$\mu$ roads. As shown in FIG. 33, the TCL 76 calculates a target drive torque $T_{OC(n)}$ through the detection of various data and calculation steps, as described above, in a step C1. The calculation of the target drive torque $T_{OC(n)}$ is effected irrespective of the operation of the manual switch.

Then, the TCL 76 determines whether the motor vehicle 82 is in the turn control process, i.e., whether the turn control flag $F_C$ is set or not in a step C2. Since the motor vehicle 82 is not in the turn control process at first, the turn control flag $F_C$ is reset, and the TCL 76 determines, in a step C3, whether or not the target drive torque $T_{OC(n)}$ is equal to or smaller than $(T_d-2)$, for example. Although a target drive torque $T_{OC}$ can be calculated while the motor vehicle 82 is running straight, its value is normally larger than the demanded drive torque $T_d$. Since the demanded drive torque $T_d$ generally becomes smaller when the motor vehicle 82 makes a turn, the turn control process is started provided the target drive torque $T_{OC}$ is equal to or smaller than the threshold value $(T_d-2)$.

The threshold value is selected to be $(T_d-2)$ to provide a hysteresis property for preventing hunting in the turn control process.

If the target drive torque $T_{OC(n)}$ is equal to or smaller than the threshold value $(T_d-2)$ in the step C3, then the TCL 76 determines whether the idling switch 68 is turned off or not in a step C4.

If the idling switch 68 is turned off in the step C4, i.e., if the accelerator pedal 31 is stepped on by the driver, then the TCL 76 sets the turn control flag $F_C$ in a step C5. Then, the TCL 76 determines, in a step C6, whether at least one of the two steering angle neutral position learned flags $F_{HN}$, $F_H$ is set or not, i.e., whether the steering angle $\delta$ detected by the steering angle sensor 84 is reliable or not.

If at least one of the two steering angle neutral position learned flags $F_{HN}$, $F_H$ is set in the step C6, then the TCL 76 determines again whether the turn control flag $F_C$ is set or not in a step C7.

In the above process, since the turn control flag $F_C$ has been set in the step C5, the step C7 determines that the turn control flag $F_C$ is set. Then, the TCL 76 employs the target drive torque $T_{OC(n)}$, which has been calculated according to the equation (8), as a target drive torque $T_{OC}$ for the turn control process.

Even if at least one of the two steering angle neutral position learned flags $F_{HN}$, $F_H$ is not set in the step C6, the TCL 76 also determines whether the turn control flag $F_C$ is set in a step C17. If the turn control flag $F_C$ is set in the step C17, control goes to the step C8. Since the steering angle $\delta$ calculated according to the equation (2) is not reliable, the target drive torque $T_{OC}$ calculated according to the equation (8) using the corrected lateral acceleration $G_{YF}$ according to the equation (5) is employed as a target drive torque $T_{OC}$ for the turn control process.

If the turn control flag $F_C$ is not set in the step C17, then the TCL 76 does not employ the target drive torque $T_{OC}$ calculated according to the equation (8), but employs the maximum torque of the engine 11 as the target drive torque $T_{OC}$ in a step C9. Since the ECU 15 reduces the duty ratio of the torque control solenoid-operated valves 51, 56 to 0%, the engine 11 produces a drive torque depending on the depression by the driver of the accelerator pedal 31.

If the target drive torque $T_{OC(n)}$ is larger than $(T_d-2)$ in the step C3, then control does not go to the turn control process, but goes from the step C6 or C7 to the step C9. In the step C9, the ECU 15 reduces the duty ratio of the torque control solenoid-operated valves 51, 56 to 0%, so that the engine 11 produces a drive torque depending on the depression by the driver of the accelerator pedal 31.

If the idling switch 68 is turned on in the step C4, i.e., if the accelerator pedal 31 is not stepped on by the driver, then the TCL 76 also employs the maximum torque of the engine 11 as the target drive torque $T_{OC}$ in the step C9. Since the ECU 15 reduces the duty ratio of the torque control solenoid-operated valves 51, 56 to 0%, the engine 11 produces a drive torque depending on the depression by the driver of the accelerator pedal 31. Therefore, no turn control process is carried out.

If the turn control flag $F_C$ is set in the step C2, then the TCL 76 determines, in a step C10, whether the difference $\Delta T$ between the presently calculated target drive torque $T_{OC(n)}$ and the previously calculated target drive torque $T_{OC(n-1)}$ is larger than an allowable amount $T_K$ of torque increase and decrease. The allowable amount $T_K$ is an amount of torque which is small enough not to allow the driver and passengers to feel shocks upon acceleration and deceleration of the motor vehicle 82. If the target longitudinal acceleration $G_{XO}$ of the motor vehicle 82 is to be reduced to 0.1 g per second, then, using the equation (7), the allowable amount $T_K$ is given as:

$$T_K = 0.1 \cdot \frac{W_b \cdot r}{\rho_m \cdot \rho_d \cdot \rho_T} \cdot \Delta t$$

If the difference $\Delta T$ between the presently calculated target drive torque $T_{OC(n)}$ and the previously calculated target drive torque $T_{OC(n-1)}$ is not larger than the allowable amount $T_K$ of torque increase and decrease in the step C10, then the TCL 76 determines, in a step C11, whether the difference $\Delta T$ between the presently calculated target drive torque $T_{OC(n)}$ and the previously calculated target drive torque $T_{OC(n-1)}$ is larger than a negative allowable amount $T_K$ of torque increase and decrease.

If the difference $\Delta T$ between the presently calculated target drive torque $T_{OC(n)}$ and the previously calculated target drive torque $T_{OC(n-1)}$ is larger than the negative allowable amount $T_K$ of torque increase and decrease in the step C11, then since the absolute value $|\Delta T|$ of the difference between the presently calculated target drive torque $T_{OC(n)}$ and the previously calculated target drive torque $T_{OC(n-1)}$ is smaller than the allowable amount $T_K$ of torque increase and decrease, the presently calculated target drive torque $T_{OC(n)}$ is employed as it is.

If, however, the difference $\Delta T$ between the presently calculated target drive torque $T_{OC(n)}$ and the previously calculated target drive torque $T_{OC(n-1)}$ is not larger than the negative allowable amount $T_K$ of torque increase and decrease, then the present target drive torque $T_{OC(n)}$ is established, in a step C12, according to the following equation:

$$T_{OC(n)} = T_{OC(n-1)} - T_K.$$

Thus, a reduction in the previously calculated target drive torque $T_{OC(n-1)}$ is limited by the allowable amount $T_K$ of torque increase and decrease, thereby reducing a deceleration shock produced when the drive torque of the engine 11 is reduced.

If the difference $\Delta T$ between the presently calculated target drive torque $T_{OC(n)}$ and the previously calculated target drive torque $T_{OC(n-1)}$ is larger than the allowable amount $T_K$ of torque increase and decrease, then the present target drive torque $T_{OC(n)}$ is established, in a step C13, according to the following equation:

$$T_{OC(n)} = T_{OC(n-1)} + T_K.$$

Therefore, if the difference $\Delta T$ between the presently calculated target drive torque $T_{OC(n)}$ and the previously calculated target drive torque $T_{OC(n-1)}$ exceeds the allowable amount $T_K$ of torque increase and decrease, then an increase in the previously calculated target drive torque $T_{OC(n-1)}$ is limited by the allowable amount $T_K$ of torque increase and decrease, thereby reducing an acceleration shock produced when the drive torque of the engine 11 is increased.

After the present target drive torque $T_{OC(n)}$ is established, the TCL 76 determines whether the target drive torque $T_{OC(n)}$ is larger than the drive torque $T_d$ demanded by the driver in a step C14.

In case the turn control flag $F_C$ is set, since the target drive torque $T_{OC(n)}$ is not larger than the demanded drive torque $T_d$, the TCL 76 then determines whether the idling switch 68 is turned on or not in a step C15.

If the idling switch 68 is not turned on in the step C15, then since the motor vehicle 82 requires the turn control process, control goes to the steps C6, C8.

If the target drive torque $T_{OC(n)}$ is larger than the demanded drive torque $T_d$ in the step C14, then since the turn control process is finished, the TCL 76 resets the turn control flag $F_C$ in a step C16. If the idling switch 68 is turned on in the step C15, then since the accelerator pedal 81 is not stepped on, control goes from the step C15 to the step C16 in which the turn control flag $F_C$ is reset.

When the turn control flag $F_C$ is reset in the step C16, the TCL 76 employs the maximum torque of the engine 11 as the target drive torque $T_{OC}$, and the ECU 15 reduces the duty ratio of the torque control solenoid-operated valves 51, 56 to 0%, the engine 11 produces a drive torque depending on the depression by the driver of the accelerator pedal 31.

Figure 44:
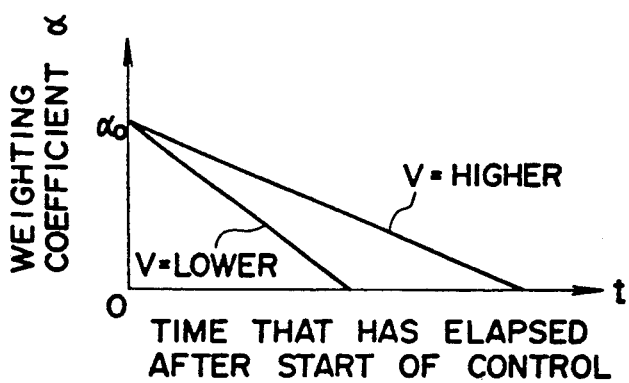
FIG. 44 is a graph showing the relationship between a vehicle speed and a weighting coefficient.
Figure 45:
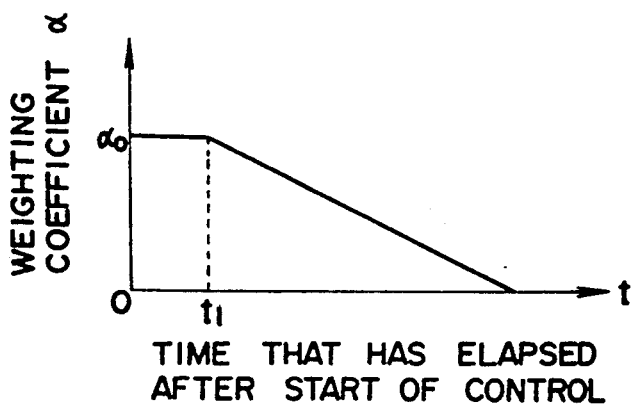

In the above embodiment, the weighting coefficient $\alpha$ is employed in view of the demanded drive torque $T_d$. The weighting coefficient $\alpha$ may not be of a fixed value, but may be variable with time after the turn control process has started. More specifically, the weighting coefficient $\alpha$ is empirically determined while the motor vehicle 82 is running. When the turn control process is over, i.e., in the vicinity of the exit end of the turning circle or path, drivability will be improved if the output torque is produced depending on the depression by the driver of the accelerator pedal. In view of this, the weighting coefficient $\alpha$ may be arranged to decrease with time after the turn control process has started, as shown in FIGS. 43 through 45.

Figure 43:
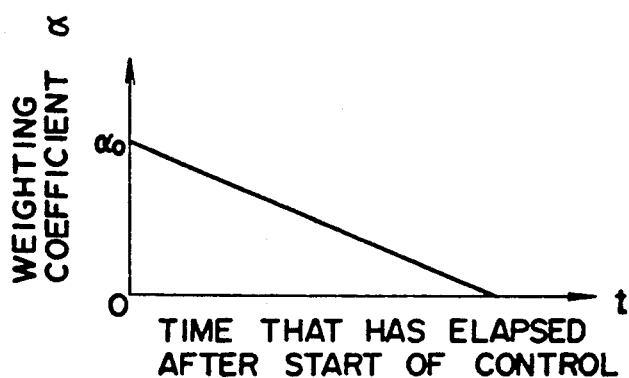
FIGS. 43 and 45 are graphs each showing a map which indicates the relationship between time after the control has started and a weighting coefficient.

In FIG. 43, the weighting coefficient $\alpha$ is progressively reduced at a constant ratio or gradient with time after the turn control process has started. In FIG. 44, the weighting coefficient $\alpha$ is slowly reduced when the vehicle speed V is higher, and rapidly reduced when the vehicle speed V is lower. In FIG. 45, the weighting coefficient $\alpha$ is kept at a constant level $\alpha_0$ (=1.0, for example) for a while after the turn control process has started, and then is progressively reduced after elapse of a certain period of time.

Figure 46:
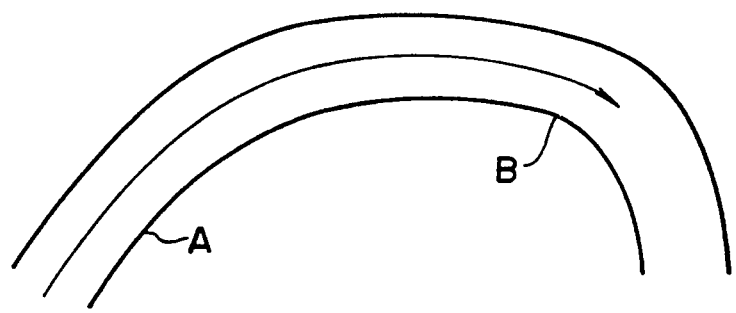
FIG. 46 is a schematic view of a path along which a motor vehicle turns.

For a turning circle or path which has a constant curvature, then no problem arises if the weighting coefficient $\alpha$ becomes zero after elapse of a certain period of time, and better drivability is assured. However, for a turning circle or path which has a gradual curve and then a sharper curve as shown in FIG. 46, the output power of the engine cannot be appropriately controlled if the weighting coefficient α becomes zero. This problem can be solved by increasing the weighting coefficient α when the steering wheel is additionally turned at a sharper curve.

Figure 47:
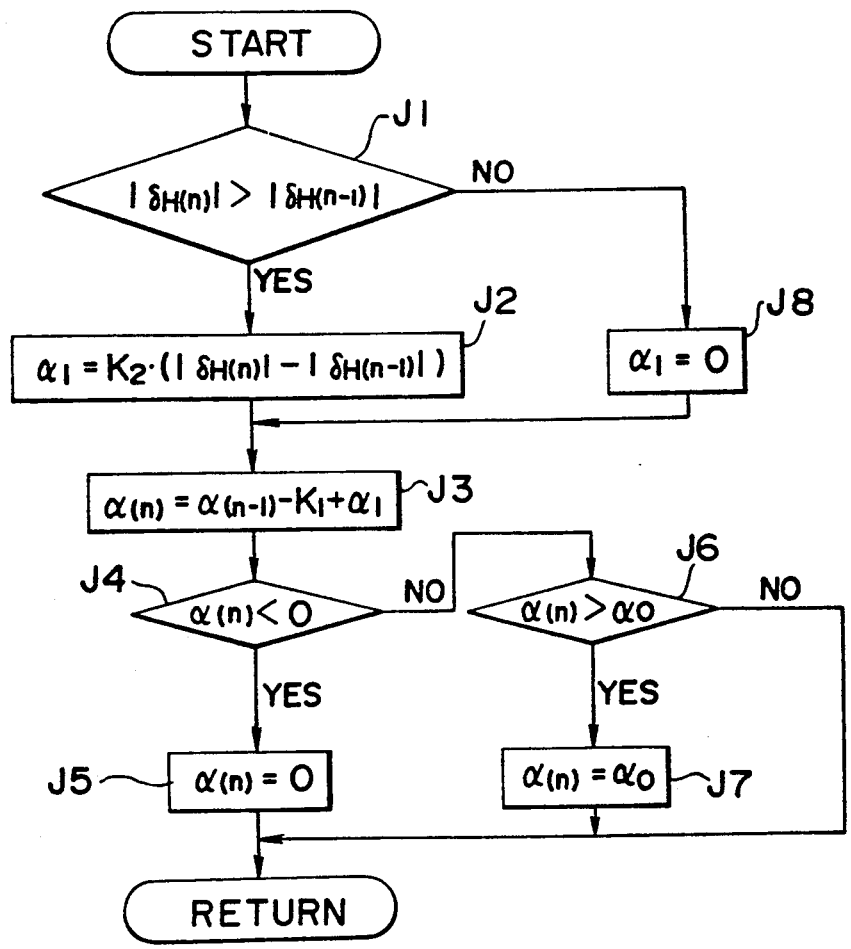
FIG. 47 is a flowchart of a process for calculating an increase in a weighting coefficient.

FIG. 47 shows a process for calculating an increase $\alpha_1$ in the weighting coefficient α. The calculation of the increase $\alpha_1$ is carried out in the step C1 of the flowchart shown in FIG. 33.

A step J1 determines whether a present steering wheel angle (i.e., a present steering shaft angle) $\delta_{H(n)}$ greater than a previous steering wheel angle $\delta_{H(n-1)}$.

If the present steering wheel angle $\delta_{H(n)}$ is smaller than the previous steering wheel angle $\delta_{H(n-1)}$, then since the turning circle or path along which the motor vehicle is running is gradually less curved or gradually becomes straight, the weighting coefficient increase $\alpha_1$ is set to 0 in a step J8.

If the present steering wheel angle $\delta_{H(n)}$ is larger than the previous steering wheel angle $\delta_{H(n-1)}$, then since the steering wheel is further turned, the difference between the present and previous steering wheel angles is multiplied by a coefficient $K_\alpha'$, producing an increase $\alpha_1$ in the weighting coefficient α in a step J1.

Once the weighting coefficient increase $\alpha_1$ is determined, a presently employed weighing coefficient $\alpha_{(n)}$ is calculated according to the following equation in a step J3:

$$\alpha_{(n)} = \alpha_{(n-1)} - K_\alpha + \alpha_1$$

where $K_\alpha$ is a coefficient for reducing the coefficient α per sampling time. The coefficient $K_\alpha$ corresponds to the gradient of the curve of the coefficient c shown in FIGS. 43 through 45.

Then, a step J4 determines whether the present weighting coefficient $\alpha_{(n)}$ is smaller than 0 or not. If the present weighting coefficient is smaller than 0, the present weighting coefficient $\alpha_{(n)}$ is set to 0 in a step J5 since it cannot be smaller than 0.

If the present weighting coefficient $\alpha_{(n)}$ is larger than 0 in the step J4, then a step J6 determines whether the present weighting coefficient $\alpha_{(n)}$ is larger than an initial value $\alpha_0$ or not. If the present weighting coefficient $\alpha_{(n)}$ is larger than the initial value $\alpha_0$, then the present weighting coefficient $\alpha_{(n)}$ is set to $\alpha_0$ since it cannot be larger than the initial value $\alpha_0$.

If the present weighting coefficient $\alpha_{(n)}$ is smaller than the initial value $\alpha_0$ in the step J6, then a corrected reference drive torque $(\alpha_{(n)} \cdot T_B)$ is determined using the determined present weighting coefficient $\alpha_{(n)}$.

Figure 48:
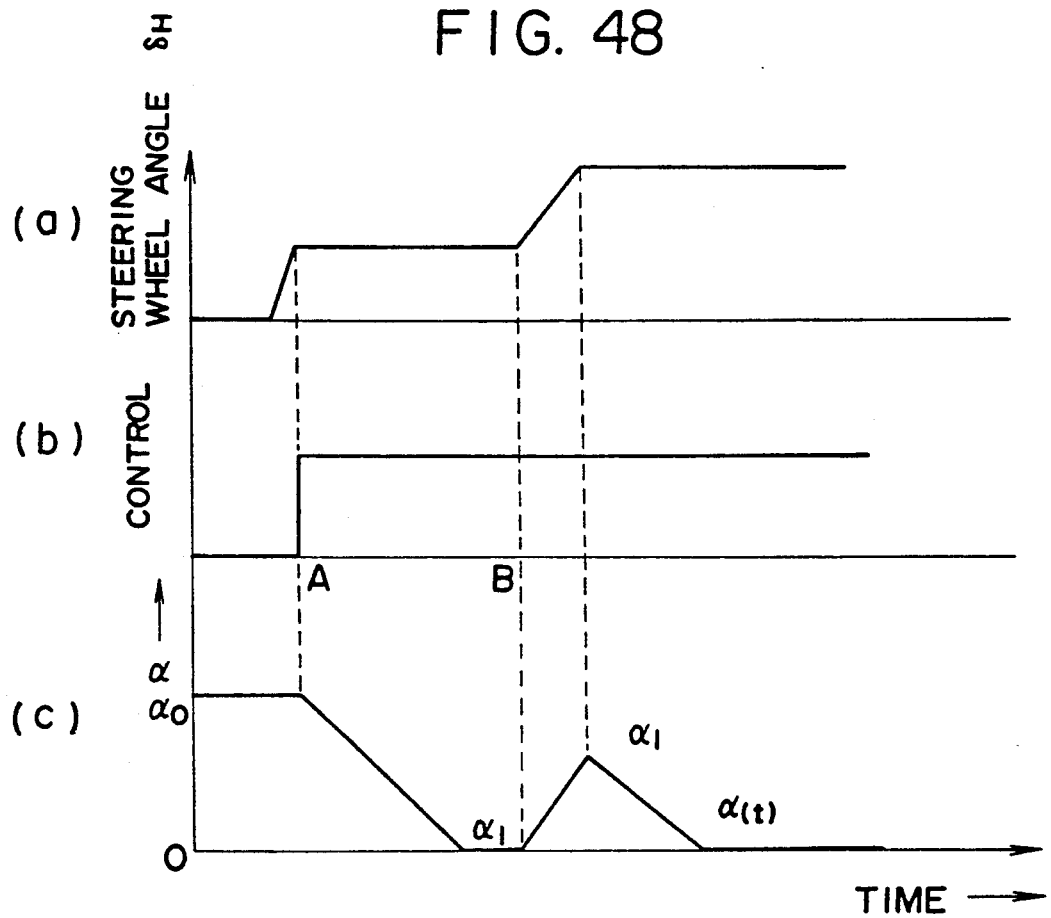
FIG. 48 is a diagram showing the manner in which a weighting coefficient, a steering wheel angle, etc. vary.

The weighting coefficient $\alpha_{(n)}$ varies as shown in FIG. 48. On the turning path shown in FIG. 46, the turn control process is started at a position A. After the weighting coefficient $\alpha_{(n)}$ is gradually reduced to 0, when the motor vehicle reaches a sharper curve at a position B and the driver additionally turns the steering wheel, the weighting coefficient $\alpha_{(n)}$ is increased by the increase $\alpha_1$ as shown in FIG. 48 at (c), lowering the drive torque produced by the engine 11.

Therefore, even when the motor vehicle goes into a sharper curve during the turn control process, the motor vehicle can be turned stably.

Figure 49:
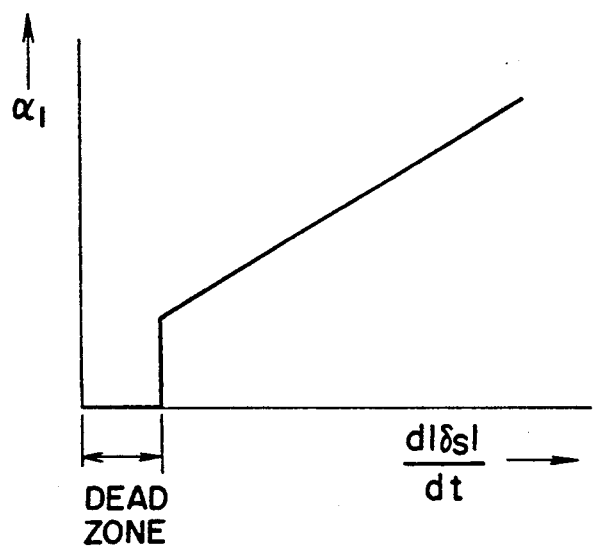
FIG. 49 is a graph showing a map which indicates an increase in a weighting coefficient.

Any increase in the steering wheel may also be detected by detecting the angular velocity of the steering wheel. In this case, a coefficient increase $\alpha_1$ depending on the angular velocity of the steering wheel is read from a map shown in FIG. 49 which stores the relationship between the angular velocity $(d|\delta_H|/dt)$ of the steering wheel and the coefficient increase $\alpha_1$. The coefficient increase $\alpha_1$ may be read from the map in the step J2 of the flowchart shown in FIG. 47.

In the above embodiment, the target drive torque for high-μ roads is calculated. If the target drive torque for the engine 11 were not varied depending on whether the road is a high-μ road or a low-μ road, e.g., if the engine 11 operated to produce a target drive torque for a high-μ road while the motor vehicle 82 is actually running on a low-μ road, then the front wheels 64, 65 would slip and the motor vehicle 82 would not run safely. Therefore, it is preferable for he TCL 76 to calculate a target drive torque $T_{OH}$ for high-μ roads and a target drive torque $T_{OL}$ for low-μ roads.

The target drive torque $T_{OL}$ for low-μ roads is calculated as described in the following portion.

On a low-μ road, the target lateral acceleration $G_{YO}$ is larger than the actual lateral acceleration $G_Y$. Therefore, it is determined whether the target lateral acceleration $G_{YO}$ is larger than a predetermined threshold vale, and if the target lateral acceleration $G_{YO}$ is larger than the threshold value, then it is determined that the motor vehicle 82 is running on a low-μ road, and the turn control process is carried out if necessary.

Figure 39:
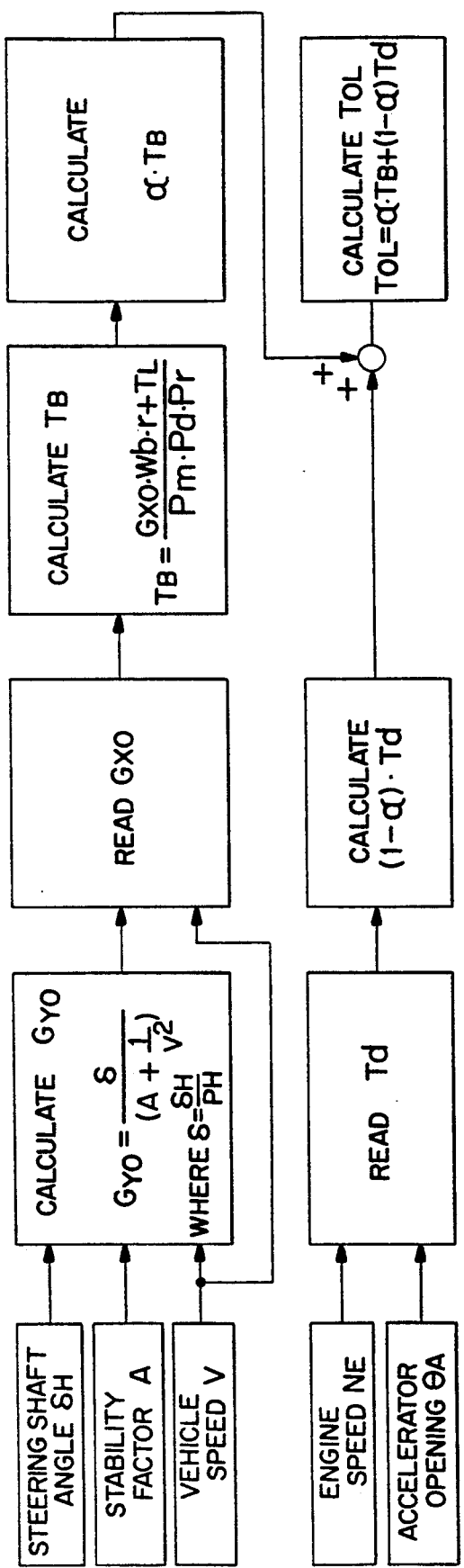
FIG. 39 is a block diagram showing a procedure for calculating a target drive torque for a road with a low coefficient of friction.

FIG. 39 shows a procedure for calculating a target drive torque for the turn control process for a low-μ road. As shown in FIG. 39, the target lateral acceleration $G_{YO}$ is calculated according to the equation (3) from the steering shaft angle $\delta_H$ and the vehicle speed V, and a value of 0.005 is employed as the stability factor A at this time.

Figure 40:
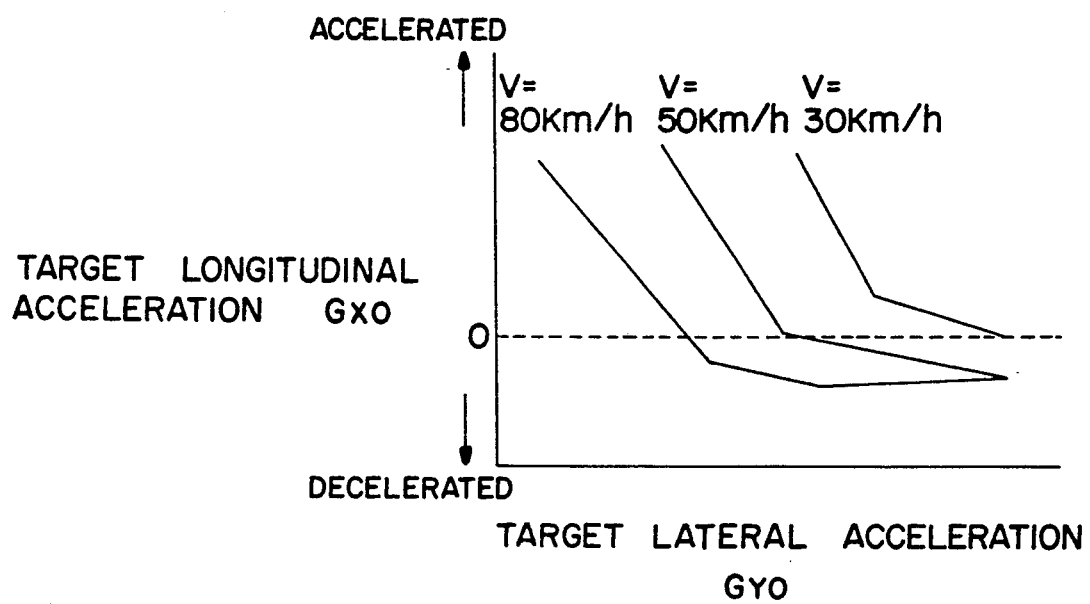
FIG. 40 is a graph showing a map which indicates the relationship between a target lateral acceleration, a target longitudinal acceleration, and a vehicle speed.

The target longitudinal acceleration $G_{XO}$ is then determined from the target lateral acceleration $G_{YO}$ and the vehicle speed V. In this embodiment, the target longitudinal acceleration $G_{XO}$ is read from a map shown in FIG. 40. The map shown in FIG. 40 stores the relationship between the vehicle speed V and the target longitudinal acceleration $G_{XO}$ with which the motor vehicle 82 can run with safety depending on the magnitude of the target lateral acceleration $G_{YO}$. The map is determined on the basis of running tests.

The reference drive torque $T_B$ is calculated according to the equation (7) based on the target longitudinal acceleration $G_{XO}$, or read from a map, so that a ratio at which the reference drive torque $T_B$ is employed is determined. The weighting coefficient α is larger than a weighting coefficient α for high-μ roads, and may be 0.8, for example, because the driver's demand is less reflected on low-μ roads to allow the motor vehicle to make safe and reliable turns on more dangerous low-μ roads.

The demanded drive torque $T_d$ is the same as the one which is calculated with respect to high-μ roads. Therefore, the target drive torque $T_{OL}$ which takes into account the reference drive torque $T_B$ and the demanded drive torque $T_d$ is calculated according to the following equation (8)' which is the same as the equation (8):

$$T_{OL} = \alpha \cdot T_B + (1-\alpha) \cdot T_d \quad (8)'.$$

The motor vehicle 82 has a manual switch (not shown) with which the driver can select the turn control process for low-μ roads. When the driver operates on the manual switch to select the slip control process for low-μ roads, the turn control process for low-μ roads is carried as described in the following portion.

Figure 42:
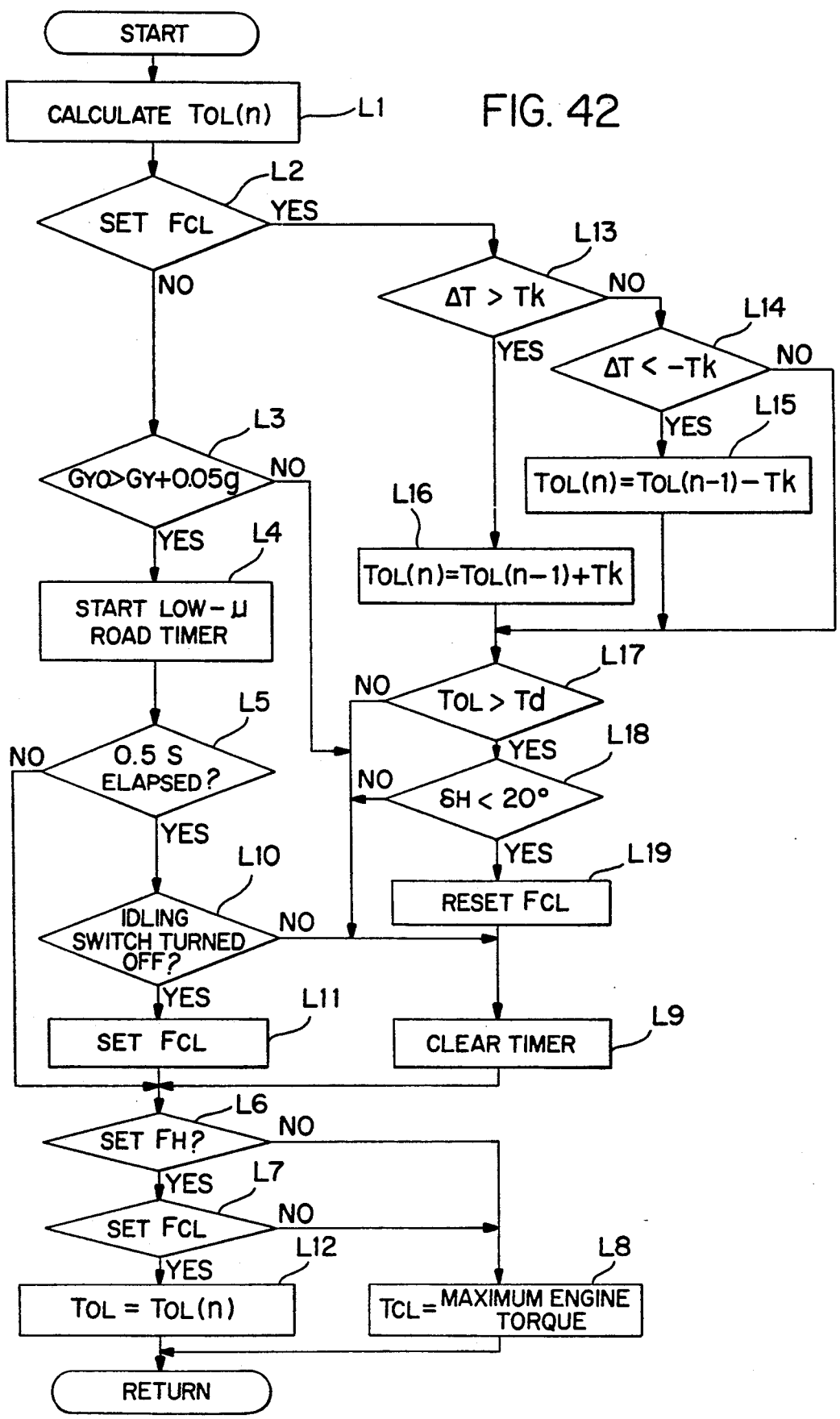
FIG. 42 is a flowchart of a turn control process for a road with a low coefficient of friction.

FIG. 42 shows a control sequence for determining a target drive torque $T_{OL}$ for the turn control process for low-μ roads. As shown in FIG. 42, the TCL 76 calculates a target drive torque $T_{OL(n)}$ through the detection of various data and calculation steps, as described above, in a step L1. The calculation of the target drive torque $T_{OL(n)}$ is effected irrespective of the operation of the manual switch.

Then, the TCL 76 determines whether the motor vehicle 82 is in the turn control process for low-μ roads, i.e., whether the turn control flag $F_{CL}$ for low-μ roads is set or not in a step L2. Since the motor vehicle 82 is not in the turn control process for low-μ roads at first, the turn control flag $F_{CL}$ for low-μ roads is reset, and the TCL 76 determines, in a step L3, whether or not the target lateral acceleration $G_{YO}$ is larger than a predetermined threshold value which is the sum of 0.05 g and the actual lateral acceleration $G_Y$ calculated on the basis of the difference between the speeds of the rear wheels 64, 65, because the target lateral acceleration $G_{YO}$ is larger than the actual lateral acceleration $G_Y$ on low-μ roads. If the target lateral acceleration $G_{YO}$ is larger than the threshold value ($G_Y$+0.05 g), then it is determined that the motor vehicle 82 is running on a low-μ road. The actual lateral acceleration $G_Y$ acting on the motor vehicle 82 is calculated according to the equation (5) above.

If the target lateral acceleration $G_{YO}$ is larger than the threshold value ($G_Y$+0.05 g) in the step L3, i.e., if the motor vehicle 82 is making a turn on a low-μ road, then the TCL 76 causes, in a step L4, a low-μ-road timer (not shown) therein to count up a period of time which may be 5 milliseconds, for example. Until the time counting of the low-μ-road timer is finished, control goes to a step L6, and the target lateral acceleration $G_{YO}$ and the actual lateral acceleration $G_Y$ are calculated respectively according to the equations (3) and (5) in each period of 15 milliseconds, after which the decision step L3 is repeated.

Specifically, until 0.5 second elapses after the low-μ-road timer has started to count time, control goes through the steps L6, L7 to a step L8 in which the TCL 76 employs the maximum torque of the engine 11 as the target drive torque $T_{OC}$ and the ECU 15 reduces the duty ratio of the torque control solenoid-operated valves 51, 56 to 0%, the engine 11 produces a drive torque depending on the depression by the driver of the accelerator pedal 31.

If the condition that the target lateral acceleration $G_{YO}$ is larger than the threshold value ($G_Y$+0.05 g) does not continue for 0.5 second, then the TCL 76 determines that the motor vehicle 82 is not running on a low-μ-road, and clears the low-μ-road timer in a step L9, after which control goes to the steps L6 through L8.

If the condition that the target lateral acceleration $G_{YO}$ is larger than the threshold value ($G_Y$+0.05 g) continues for 0.5 second, then the TCL 76 determines whether the idling switch 68 is turned off or not in a step L10. If the idling switch 68 is turned on in the step L10, i.e., if the accelerator pedal 82 is not stepped on by the driver, then control does not go to the turn control process for low-μ roads, but clears the low-μ-road timer in the step L9. Control then goes to the steps L6 through L8. The TCL 76 employs the maximum torque of the engine 11 as the target drive torque $T_{OC}$ and the ECU 15 reduces the duty ratio of the torque control solenoid-operated valves 51, 56 to 0%, the engine 11 produces a drive torque depending on the depression by the driver of the accelerator pedal 31.

If the idling switch 68 is turned off in the step L10, i.e., if the accelerator pedal 31 is stepped on by the driver, then the TCL 76 sets the turn control flag $F_{CL}$ for low-μ roads in a step L11. Then, the TCL 76 determines, in the step L6, whether the steering angle neutral position learned flag $F_H$ is set or not, i.e., whether the steering angle δ detected by the steering angle sensor 84 is reliable or not.

If the steering angle neutral position learned flag $F_H$ is set in the step L6, then the TCL 76 determines again whether the turn control flag $F_{CL}$ for low-μ roads is set or not in the step L7. If the turn control flag $F_{CL}$ for low-μ roads is set in the step L11, then the TCL 76 employs the target drive torque $T_{OL(n)}$, which has been calculated according to the equation (8)', as a target drive torque $T_{OL}$ for the turn control process for low-μ roads.

If the steering angle neutral position learned flag $F_H$ is not set in the step L6, then since the steering angle δ is not reliable, control goes to the step L8 in which the TCL 76 does not employ the target drive torque $T_{OL}$ calculated according to the equation (8)' in the step L1, but employs the maximum torque of the engine 11 as the target drive torque $T_{OL}$ and the ECU 15 reduces the duty ratio of the torque control solenoid-operated valves 51, 56 to 0%, the engine 11 produces a drive torque depending on the depression by the driver of the accelerator pedal 31.

If the turn control flag $F_{CL}$ for low-μ roads is set in the step L2, control goes to a step L13.

In the step L13 and following steps L14 through L16, the TCL 76 determines whether the difference ΔT between the presently calculated target drive torque $T_{OL(n)}$ and the previously calculated target drive torque $T_{OL(n-1)}$ is larger than an allowable amount $T_K$ of torque increase and decrease. If the difference ΔT, due to a torque increase or decrease, falls within the allowable amount $T_K$, then the presently calculated target drive torque $T_{OL(n)}$ is employed as it is. If the difference ΔT exceeds the allowable amount $T_K$, then the target drive torque $T_{OL}$ is limited by the allowable amount $T_K$.

Specifically, when the target drive torque $T_{OL}$ is to decrease, the present target drive torque $T_{OL(n)}$ is established, in a step L15, according to the following equation:

$$T_{OL(n)} = T_{OL(n-1)} - T_K.$$

When the target drive torque $T_{OL}$ is to increase, the present target drive torque $T_{OL(n)}$ is established, in a step L16, according to the following equation:

$$T_{OL(n)} = T_{OL(n-1)} + T_K.$$

After the present target drive torque $T_{OL}$ is established, the TCL 76 determines whether the target drive torque $T_{OL}$ is larger than the drive torque $T_d$ demanded by the driver in a step L17.

In case the turn control flag $F_{CL}$ for low-μ roads is set, since the target drive torque $T_{OL}$ is not larger than the demanded drive torque $T_d$, control goes to the step L9 in which the low-μ-road timer is cleared, after which control goes to the steps L6, L7. If the steering angle neutral position learned flag $F_H$ is set, and also if the turn control flag $F_{CL}$ for low-$\mu$ roads is set, the target drive torque $T_{OL}$ is determined as the drive torque $T_{OL}$ for the turn control process for low-$\mu$ roads.

Even if the target drive torque $T_{OL}$ is larger than the demanded drive torque $T_d$ in the step L17, if the steering shaft angle $\delta_H$ is not smaller than 20 degrees, for example, in a step L18, then since the motor vehicle 82 is making a turn, the turn control process is continued.

If the target torque $T_{OL}$ is larger than the demanded drive torque $T_d$ in the step L17 and also if the steering shaft angle $\delta_H$ is smaller than 20 degrees in the step L18, then since the turn of the motor vehicle 82 is finished, the TCL 76 resets the turn control flag $F_{CL}$ for low-$\mu$ roads in a step L19.

When the turn control flag $F_{CL}$ for low-$\mu$ roads is reset in the step L19, because it is no longer necessary to count time with the low-$\mu$-road timer, this low-$\mu$-road timer is reset in the step L9, and control goes to the steps L6, L7. Since the turn control flag $F_{CL}$ for low-$\mu$ roads is reset in the step L7, control goes to the step L8 in which the TCL 76 employs the maximum torque of the engine 11 as the target drive torque $T_{OC}$, and the ECU 15 reduces the duty ratio of the torque control solenoid-operated valves 51, 56 to 0%, the engine 11 produces a drive torque depending on the depression by the driver of the accelerator pedal 31.

In the above calculating process, in order to prevent shocks from taking place upon acceleration and deceleration due to abrupt changes in the drive torque produced by the engine 11, the target drive torques $T_{OH}$, $T_{OL}$ are limited by the allowable amount $T_K$ of torque increase and decrease. The target longitudinal acceleration $G_{XO}$ may also be limited in the same manner. Assuming that it is limited by an allowable amount $G_K$ of acceleration increase and decrease, the target longitudinal acceleration $G_{XO(n)}$ is calculated at the nth time as follows:

If $G_{XO(n)} - G_{XO(n-1)} > G_K$, then $G_{XO(n)} = G_{XO(n-1)} + G_K$, and if $G_{XO(n)} - G_{XO(n-1)} < -G_K$, then $G_{XO(n)} = G_{XO(n-1)} - G_K$.

If the sampling time of the main timer is selected to be 15 milliseconds to reduce any change in the target longitudinal acceleration $G_{XO}$ to 0.1 g per second, then the allowable amount $G_K$ is given as:

$G_K = 0.1 \cdot \Delta t$

After the target drive torques $T_{OC}$, $T_{OL}$ for the turn control process have been calculated, the TCL 76 selects an optimum final target drive torque $T_O$ from these two target drive torques or the three target drive torques $T_{OS}$, $T_{OC}$, $T_{OL}$, and transmits the selected optimum final target drive torque $T_O$ to the ECU 15. In view of safety of the motor vehicle 82 as it runs, the TCL 76 transmits the target drive torque of the smallest numerical value with priority to the ECU 15. Since, however, the target drive torque $T_{OS}$ for the slip control process is generally smaller at all times than the target drive torque $T_{OL}$ for the turn control process for low-$\mu$ roads, the final target drive torque $T_O$ may be selected in the order of the slip control process, the turn control process for low-$\mu$ roads, and the turn control process for high-$\mu$ road.

Figure 34A:
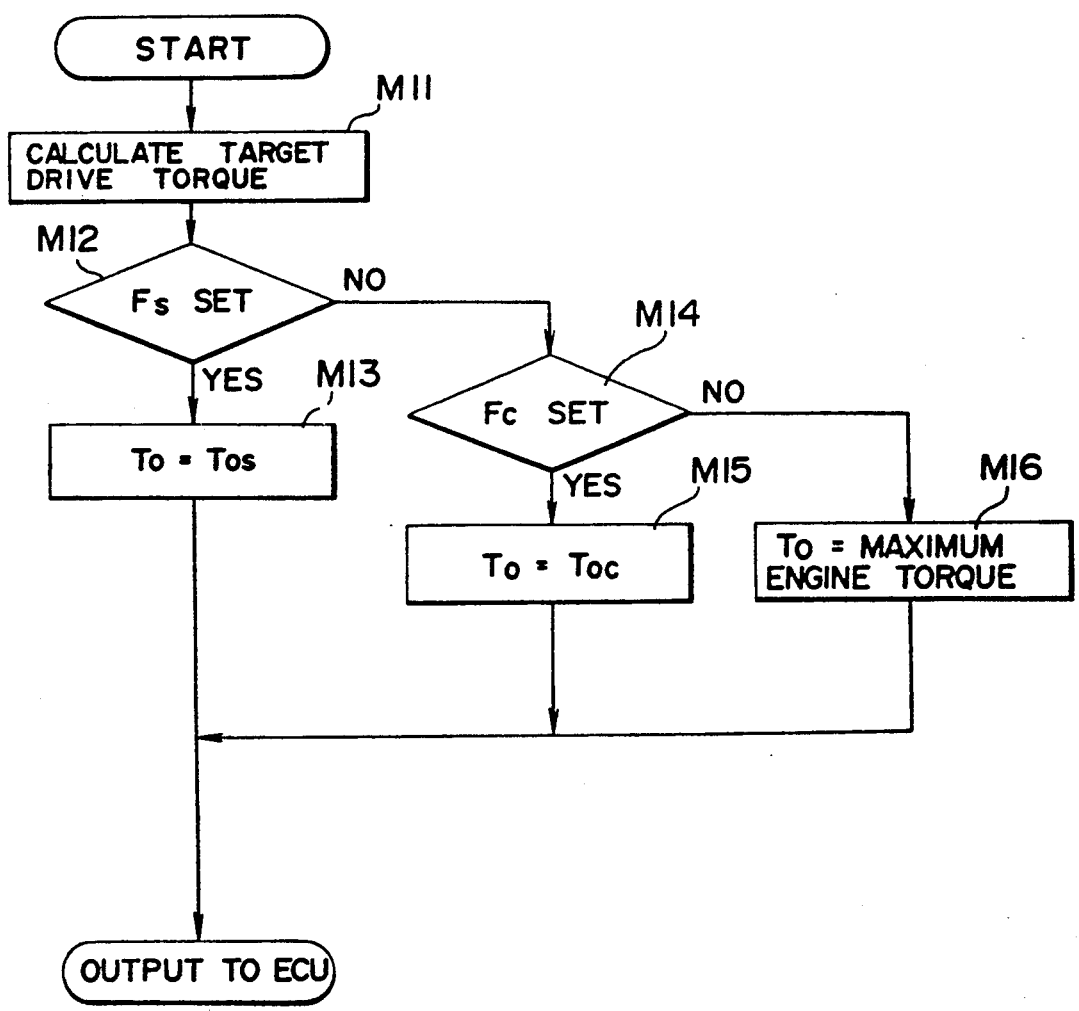
FIGS. 34[A] and 34[B] are flowcharts of different processes for selecting a final target torque.
Figure 34B:
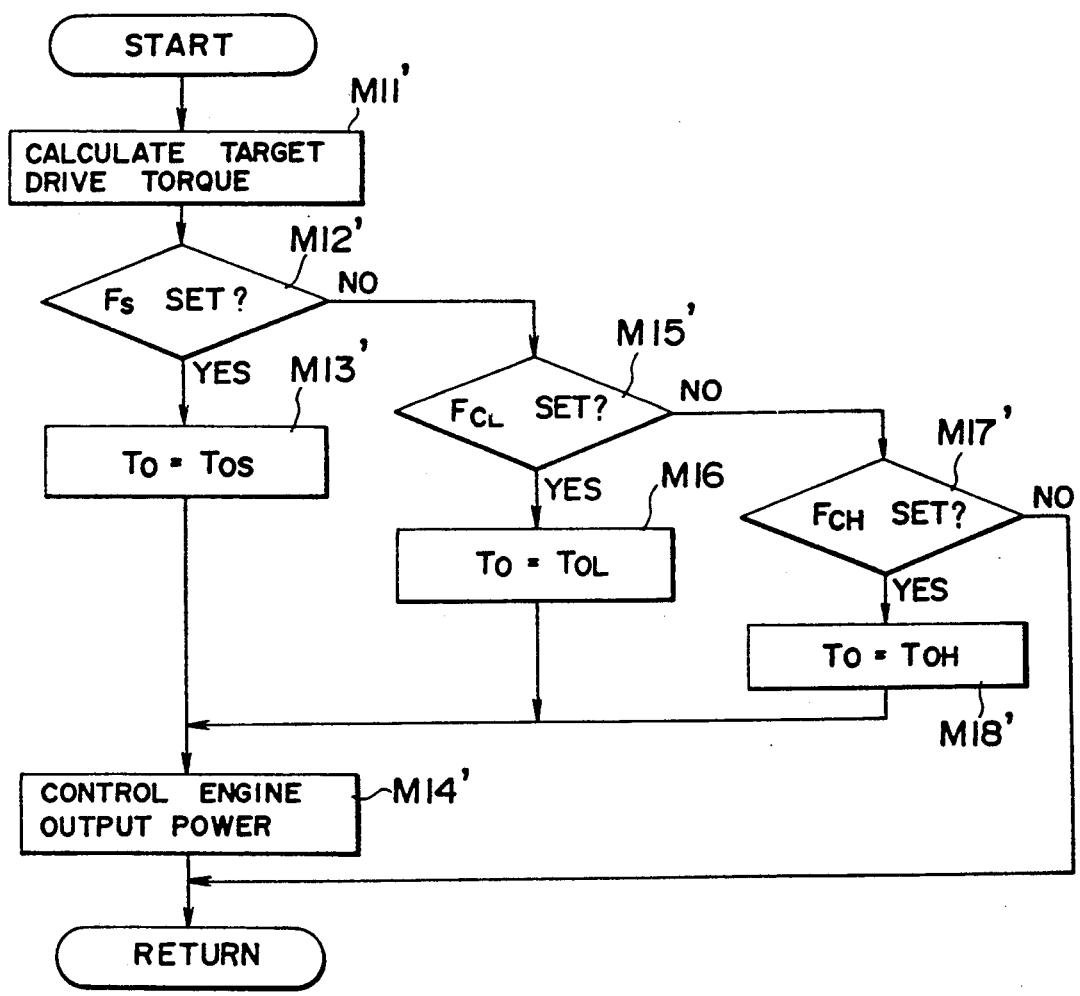

The process for selecting a final target drive torque from the target drive torques $T_{OS}$, $T_{OC}$ is shown in FIG. 34[A]. In FIG. 34[A], the target drive torque $T_{OS}$ for the slip control process and the target drive torque $T_{OC}$ for the turn control process are calculated in a step M11. Then, a step M12 determines whether the slip control flag $F_S$ is set or not. If the slip control flag $F_S$ is set, then the target drive torque $T_{OS}$ for the slip control process is selected as a final target drive torque $T_O$ in a step M13, and is transmitted to the ECU 15.

If the slip control flag $F_S$ is not set in the step M12, then a step M14 determines whether the turn control flag $F_C$ is set or not. If the turn control flag $F_C$ is set, then the target drive torque $T_{OC}$ for the turn control process is selected as a final target drive torque $T_O$ in a step M15, and is transmitted to the ECU 15.

If the turn control flag $F_C$ is not set in the step M14, then the TCL 76 transmits the maximum drive torque of the engine 11 as a final target drive torque $T_O$ to the ECU 15.

The process for selecting a final target drive torque from the target drive torques $T_{OS}$, $T_{OC}$, $T_{OL}$ is shown in FIG. 34[B]. In FIG. 34[B], the target drive torques $T_{OS}$, $T_{OC}$, $T_{OL}$ are calculated in a step M11'. Then, a step M12' determines whether the slip control flag $F_S$ is set or not. If the slip control flag $F_S$ is set, then the TCL 76 selects the target drive torque $T_{OS}$ for the slip control process as a final target drive torque $T_O$ in a step M13', and transmits the final target drive torque $T_O$ to the ECU 15.

The ECU 15 stores a map for determining a throttle opening $\theta_T$ using the engine speed $N_E$ and the drive torque of the engine 11 as parameters. In a step M14', the ECU 15 reads, from the map, a target throttle opening $\theta_{TO}$ corresponding to the present engine speed $N_E$ and the target drive torque $T_{OS}$. Then, the ECU 15 determines the difference between the target throttle opening $\theta_{TO}$ and the actual throttle opening $\theta_T$ detected by the throttle opening sensor 67. The ECU 15 sets the duty ratio of the torque control solenoid-operated valves 51, 56 to a value commensurate with the difference, and energizes the solenoids of the torque control solenoid-operated valves 51, 56 at the duty ratio, thereby operating the actuator 41 to lower the actual throttle opening $\theta_T$ to the target value $\theta_{TO}$.

If the slip control flag $F_S$ is not set in the step M12', then a step M15' determines whether the turn control flag $F_{CL}$ for low-$\mu$ roads is set or not. If the turn control flag $F_{CL}$ for low-$\mu$ roads is set, then the target drive torque $T_{OC}$ for the turn control process for low-$\mu$ roads is selected as a final target drive torque $T_O$ in a step M16'.

If the turn control flag $F_{CL}$ for low-$\mu$ roads is not set in the step M15', then a step M17' determines whether the turn control flag $F_{CH}$ for high-$\mu$ roads is set or not. If the turn control flag $F_{CH}$ for high-$\mu$ roads is set in the step M17', then the target drive torque $T_{OH}$ for the turn control process for high-$\mu$ roads is selected as a final target drive torque $T_O$ in a step M18', after which control goes to the step M14'.

If the turn control flag $F_{CH}$ for high-$\mu$ roads is not set in the step M17', then the TCL 76 transmits the maximum drive torque of the engine 11 as a final target drive torque $T_O$. The ECU 15 reduces the duty ratio of the torque control solenoid-operated valves 51, 56 to 0%, with the result that the engine 11 produces a drive torque depending on the depression by the driver of the accelerator pedal 31. In this embodiment, the duty ratio of the torque control solenoid-operated valves 51, 56 is not set to 0% unconditionally. Instead, the ECU 15 compares the actual accelerator opening $\theta_A$ and the maximum throttle opening limit value, and if the accelerator opening $\theta_A$ exceeds the maximum throttle opening limit value, the ECU 15 determines the duty ratio of the torque control solenoid-operated values 51, 56 such that the accelerator opening $\theta_A$ becomes the maximum throttle opening limit value, and then actuates the plungers 52, 57 of the valves 51, 56. The maximum throttle opening limit value is a function of the engine speed $N_E$, and indicates a fully closed position or a nearly fully closed position above a certain engine speed (e.g., 2,000 rpm). In a lower engine speed range, the maximum throttle opening limit value is progressively lowered down to an opening of several tens % as the engine speed $N_E$ is lowered.

The throttle opening $\theta_T$ is limited for the reason that control response is increased when the TCL 76 finds it necessary to lower the drive torque produced by the engine 11. More specifically, the present motor vehicle 82 is designed such that the bore diameter (or the cross-sectional area) of the throttle body 21 is made large to increase the acceleration capability of the motor vehicle 82 and maximum output power of the engine 11. When the engine 11 operates in a low speed range, the rate of intake air is saturated at the time the throttle opening $\theta_T$ is only several tens %. By limiting the throttle opening $\theta_T$ to a predetermined position rather than setting it to the fully closed position or a nearly fully closed position depending on the depression of the accelerator pedal 31, the difference between the target throttle opening $\theta_{TO}$ and the actual throttle opening $\theta_T$ at the time there is a command for reducing the drive torque is reduced, allowing the throttle opening $\theta_T$ to be reduced quickly to the target throttle opening $\theta_{TO}$.

In the above embodiment, the target drive torques for the turn control processes for high- and low-$\mu$ roads in addition to the target drive torque for the slip control process are calculated. It may also be possible to calculate another target drive control for a turn control process for a road having a coefficient of friction between those of high- and low-$\mu$ roads, and to select a final target drive torque from the target drive torques.

In addition to selecting the final target drive torque $T_O$, when the motor vehicle 82 is started so quickly that the output power of the engine 11 cannot be reduced quickly enough by fully closing the throttle valve 20 through the actuator 41 or when the road varies from a normal dry road to an ice-covered road, the TCL 76 establishes a retard ratio with respect to the basic regard $P_B$ of the ignition timing P which is established by the ECU 15, and transmits the retard ratio to the ECU 15.

The basic retard $P_B$ is a maximum retard which does not obstruct the normal operation of the engine 11, and is determined on the basis of the rate of intake air supplied to the engine 11 and the engine speed $N_E$. In the present embodiment, there are four retard ratios, i.e., a level 0 for setting the basic retard $P_B$ to 0, a level I for compressing the basic retard $P_B$ to ⅜ a level II for outputting the basic retard $P_B$ as it is, and a level III for outputting the basic retard $P_B$ as it is and fully closing the throttle valve 20. Basically, as the rate of change $G_s$ of the slip s goes larger, the retard ratio is selected such that it makes the retard larger.

Figure 35:
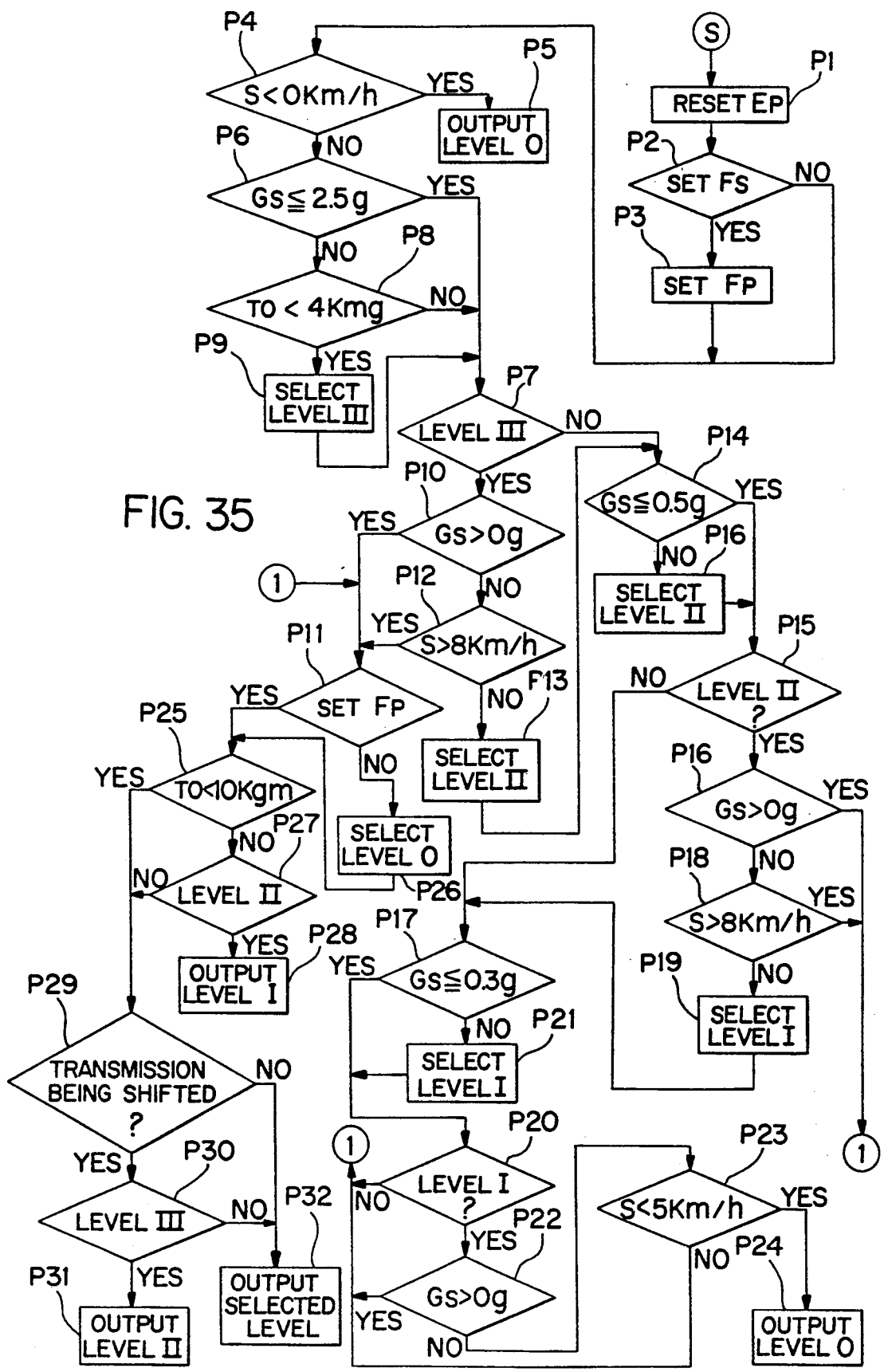
FIG. 35 is a flowchart of a process for selecting a retard ratio.

FIG. 35 shows a process for selecting a regard ratio. The TCL 76 first resets an ignition timing control flag $F_P$ in a step P1, and determines whether the slip control flag $F_S$ is set or not in a step P2. If the slip control flag $F_S$ is set in the step P2, then the TCL 76 sets the ignition timing control flag $F_P$ in a step P3, and determines whether the slip s is less than 0 km/hour or not in a step P4. If the slip control flag $F_S$ is not set in the step P2, then control goes to the step P4.

If the slip s is less than 0 km/hour in the step P4, i.e., if no problem arises when the drive torque of the engine 11 is increased, then the TCL 76 sets the retard ratio to the level 0 and outputs the level 0 to the ECU 15 in a step P5. Conversely, if the slip s is higher than 0 km/hour in the step P4, then the TCL 76 determines whether or not the rate of change $G_s$ of the slip s is equal to or smaller than 2.5 g in a step P6. If the rate of change $G_s$ of the slip s is equal to or smaller than 2.5 g in the step P6, then the TCL 76 determines whether the retard ratio is the level III or not in a step P7.

If the rate of change $G_s$ of the slip s exceeds 2.5 g in the step P6, i.e., if the front wheels 64, 65 are slipping abruptly, then the TCL 76 determines whether the final target drive torque $T_O$ is smaller than 4 kgm or not in a step P8. If the final target drive torque $T_O$ is smaller than 4 kgm in the step P8, i.e., if it is necessary to quickly reduce the drive torque of the engine 11, then the TCL 76 sets the retard ratio to the level III in a step P9, and control goes to the step P7. Conversely, if the final target drive torque $T_O$ is greater than 4 kgm in the step P8, then control goes directly from the step P8 to the step P7.

If the retard ratio is the level III in the step P7, then the TCL 76 determines whether the rate of change $G_s$ of the slip s exceeds 0 g or not in a step P10. If the rate of change $G_s$ of the slip s exceeds 0 g, i.e., if the slip s tends to increase, then the TCL 76 determines whether the ignition timing control flag $F_P$ is set or not in a step P11. If the rate of change $G_s$ of the slip s is smaller than 0 g in the step P10, i.e., if the slip s tends to decrease, then the TCL 76 determines whether the slip s exceeds 8 km/hour or not in a step P12.

If the slip s exceeds 8 km/hour in the step P12, then control goes to the step P11, and if the slip s is smaller than 8 km/hour, then the TCL 76 changes the retard ratio from the level III to the level II in a step P13, and then determines whether or not the rate of change $G_s$ of the slip s is equal to or smaller than 0.5 g in a step P14. If the retard ratio is not the level III in the step P7, then control also goes to the step P14.

If the rate of change $G_s$ of the slip s is equal to or less than 0.5 g in the step P14, i.e., if the slip s does not change excessively rapidly, then the TCL 76 determines whether the retard ratio is the level II or not in a step P15. If the rate of change $G_s$ of the slip s is in excess of 0.5 g in the step P14, then the TCL 76 sets the retard ratio to the level II in a step P16, and control goes to the step P15.

If the retard ratio is the level II in the step P15, then the TCL 76 determines whether the rate of change $G_s$ of the slip s exceeds 0 g in a step P16. If the retard ratio is not the level II in the step P15, then the TCL 76 determines whether or not the rate of change $G_s$ of the slip s is equal to or smaller than 0.3 g in a step P17. If the rate of change $G_s$ of the slip s does not exceed 0 g in the step P16, i.e., the slip s tends to decrease, then the TCL 76 determines whether the slip s exceeds 8 km/hour or not in a step P18. If the slip s is smaller than 8 km/hour in the step P18 then the TCL 76 changes the retard ratio from the level II to the level I in a step P19, after which control goes to the step P17. If the rate of change $G_s$ of the slip s is greater than 0 g in the step P16, i.e., if the slip s tends to increase, or if the slip s exceeds 8 km/hour in the step P18, i.e., if the slip s is large, then control goes back to the step P11.

If the rate of change $G_s$ of the slip s is equal to or less than 0.3 g in the step P17, i.e., if the slip s substantially does not tend to increase, then the TCL 76 determines whether the retard ratio is the level I or not in a step P20. If the rate of change $G_s$ of the slip s is in excess of 0.3 g in the step P17, i.e., if the slip s tends to increase even slightly, then the TCL 76 sets the retard ratio to the level I in a step P21, and control goes to the step P20.

If the retard ratio is the level I in the step P20, then the TCL 76 determines whether the rate of change $G_s$ of the slip s exceeds 0 g in a step P22. If the rate of change $G_s$ of the slip s is smaller than 0 g, i.e., if the slip s tends to decrease, then the TCL 76 determines whether the slip s is less than 5 km/hour in a step P23. If the slip s is less than 5 km/hour in the step P23, i.e., the front wheels 64, 65 virtually do not slip, then the TCL 76 sets the retard ratio to the level 0, and outputs the level 0 to the ECU 15 in a step P24. If the retard ratio is not the level I in the step P20, or if the rate of change $G_s$ of the slip s exceeds 0 g in the step P22, i.e., if the slip s tends to increase, or if the slip s is greater than 5 km/hour in the step P23, i.e., if the slip s is relatively large, then control goes back to the step P11.

If the ignition timing control flag $F_P$ is set in the P11, then the TCL 76 determines whether the final target drive torque $T_O$ is less than 10 kgm in a step P25. If the ignition timing control flag $F_P$ is not set in the step P11, then the TCL 76 sets the retard ratio to the level 0 in a step 26, and then control goes to the step P25.

If the final target drive torque $T_O$ is greater than 10 kgm in the step P25, i.e., if the engine 11 is producing a relatively large drive torque, then the TCL 76 determines whether the retard ratio is the level II in a step P27. If the retard ratio is the level II in the step P27, then the TCL 76 lowers the retard ratio to the level I and outputs the level I to the ECU 15 in a step P28.

If the final target drive torque $T_O$ is less than 10 kgm in the step P25, or the retard ratio is not the level II in the step P27, then the TCL 76 determines whether the hydraulic automatic transmission 13 is being shifted in a step P29. If the hydraulic automatic transmission 13 is being shifted in the step P29, then the TCL 76 determines whether the retard ratio is the level III in a step P30. If the retard ratio is the level III in the step P30, then the TCL 76 lowers the retard ratio to the level II and outputs the level II to the ECU 15 in a step P31. If the hydraulic automatic transmission 13 is not being shifted in the step P29, or if the retard ratio is not the level III in the step P30, then the TCL 76 outputs the retard ratio which has been selected to the ECU 15 in a step P32.

For example, if the retard ratio of the level III is selected in the step P9, if the rate of change $G_s$ of the slip s is in excess of 0 g and the slip s exceeds 8 km/hour, i.e., the slip s increases at a rapid rate, and if the final target drive torque $T_O$ is less than 10 kgm, so that the slippage of the front wheels 64, 65 cannot sufficiently be reduced only by retarding the ignition timing, then the retard ratio of the level III is selected to fully close the throttle valve opening, thus efficiently reducing the slippage at its initial stage.

The ECU 15 has a map (not shown) storing the relationship between the ignition timing P determined based on the engine speed $N_E$ and the rate of intake air supplied to the engine 11, and the basic retard $P_B$. The ECU 15 reads the ignition timing P and the basic retard $P_B$ from the map based on the detected signal from the crankshaft angle sensor 62 and the detected signal from the air flow sensor 70, and then corrects the ignition timing P and the basic retard $P_B$ thus read, based on the retard ratio from the TCL 76, thereby providing a target retard $P_O$. An upper limit for the target retard $P_O$ is established which corresponds to an upper limit temperature for exhaust gases that is low enough not to damage the catalyst for purifying the exhaust gases. The temperature of the exhaust gases is determined by the detected signal from the exhaust temperature sensor 74.

When the temperature of the coolant of the engine 11 which is detected by the coolant temperature sensor 71 is lower than a predetermined value, the process for retarding the ignition timing P, described below, is interrupted since retarding the ignition timing P which would induce knocking or stalling of the engine 11.

Figure 36:
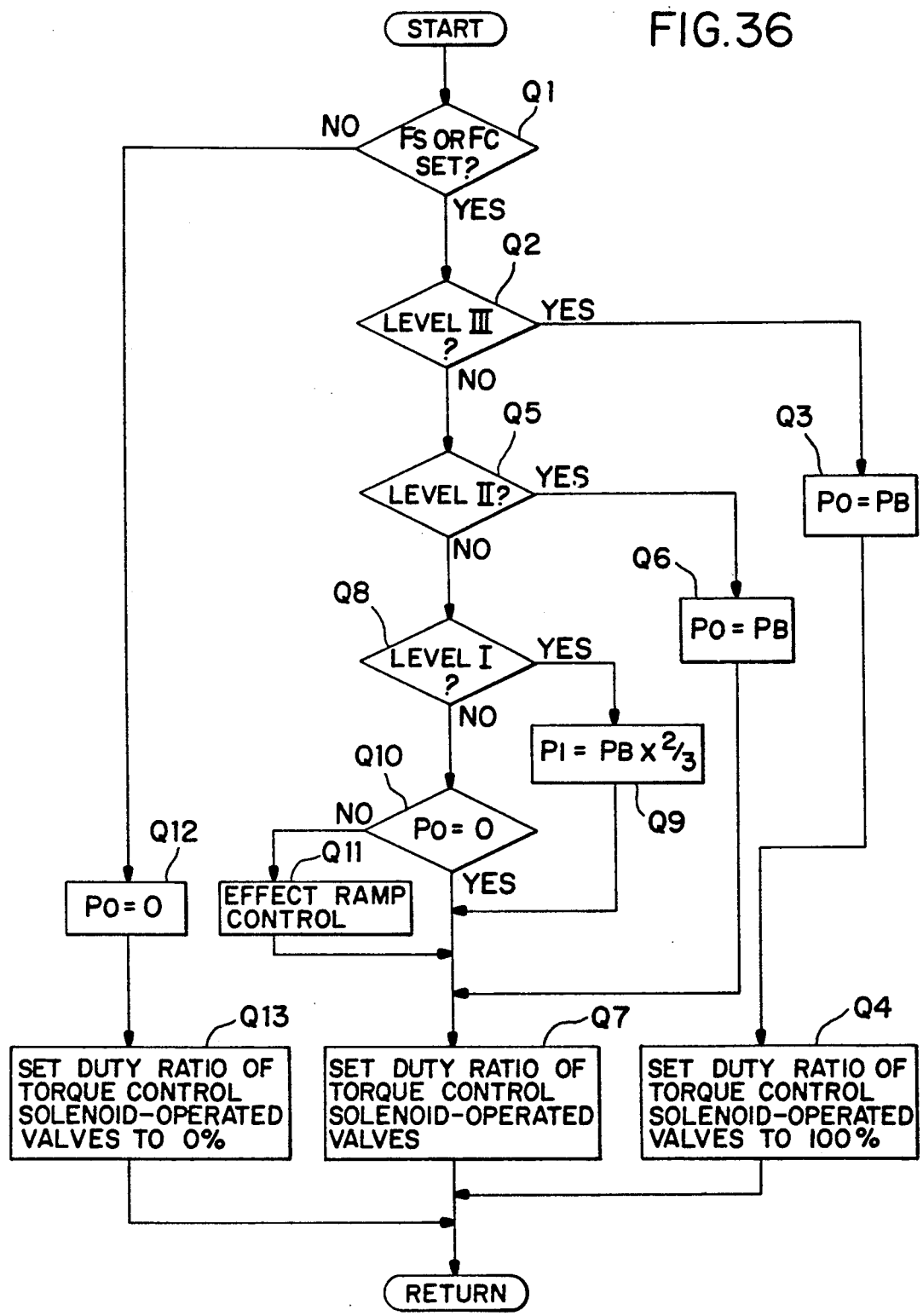
FIG. 36 is a flowchart of a process for controlling the output power of an engine.

FIG. 36 shows a procedure for calculating the target retard $P_O$ in the above retard control process. First, the ECU 15 determines whether the slip control flag $F_S$ is set or not in a step Q1. If the slip control flag $F_S$ is set in the step Q1, then the ECU 15 determines whether the retard ratio is set to the level III in a step Q2.

If the retard ratio is the level III in the step Q2, then the ECU 15 employs the basic retard $P_B$, read from the map, as the target retard $P_O$, retarding the ignition timing P by the target retard $P_O$ in a step Q3. Then, in order that the throttle valve 20 is fully closed irrespective of the final target drive torque $T_O$, the ECU 15 sets the duty ratio of the torque control solenoid-operated valves 51, 56 to 100%, forcibly and fully closing the throttle valve 20 in a step Q4.

If the retard ratio is not the level III in the step Q2, then the ECU 15 determines whether the retard ratio is set to the level II in a step Q5. If the retard ratio is the level II in the step Q5, then the ECU 15 employs the basic retard $P_B$, read from the map, as the target retard $P_O$, retarding the ignition timing P by the target retard $P_O$ in a step Q6. Then, the ECU 15 sets the duty ratio of the torque control solenoid-operated valves 51, 56 depending on the target drive torque $T_{OS}$, reducing the drive torque of the engine 11 irrespective of the depression by the driver of the accelerator pedal 31, in a step Q7.

The ECU 15 stores a map for determining a throttle opening $\theta_T$ using the engine speed $N_E$ and the drive torque of the engine 11 as parameters. The ECU 15 reads a target throttle opening $\theta_{TO}$ corresponding to the present engine speed $N_E$ and the target drive torque $T_{OS}$, from the map.

Then, the ECU 15 determines the difference between the target throttle opening $\theta_{TO}$ and the actual throttle opening $\theta_T$ detected by the throttle opening sensor 67. The ECU 15 sets the duty ratio of the torque control solenoid-operated valves 51, 56 to a value commensurate with the difference, and energizes the solenoids of the torque control solenoid-operated valves 51, 56 at the duty ratio, thereby operating the actuator 41 to lower the actual throttle opening $\theta_T$ to the target value $\theta_{TO}$.

If the maximum torque of the engine 11 is outputted as the target drive torque $T_{OS}$ to the ECU 15, then the ECU 15 lowers the duty ratio of the torque control solenoid-operated valves 51, 56 to 0%, causing the engine 11 to generate the drive torque depending on the depression by the driver of the accelerator pedal 31.

If the retard ratio is not the level III in the step Q5, then the ECU 1 determines whether the retard ratio is set to the level I in a step Q8. If the retard ratio is the level I in the step Q8, then the ECU 15 sets the target retard $P_O$ as indicated by the equation, below, and retards the ignition timing P by the target retard $P_O$, after which control goes to the step Q7.

$$P_O = P_B \cdot \frac{2}{3}$$

If the retard ratio is not the level I in the step Q8, then the ECU 15 determines whether the target retard $P_O$ is 0 or not in a step Q10. If the target retard $P_O$ is 0 in the step Q10, then control goes to the step Q7 in which the ECU 15 does not retard the ignition timing P, but sets the duty ratio of the torque control solenoid-operated valves 51, 56 depending on the target drive torque $T_{OS}$, reducing the drive torque of the engine 1 irrespective of the depression by the driver of the accelerator pedal 31.

If the target retard $P_O$ is not 0 in the step Q10, the ECU 15 reduces the target retard $P_O$ one degree in each sampling period $\Delta t$ of the main timer until $P_O=0$ through ramp control in a step Q11. After the shock due to a change in the drive torque of the engine 11 has been lessened, control goes to the step Q7.

If the slip control flag $F_S$ is reset in the step Q1, then the ECU 15 carries out a normal running control process in which the drive torque of the engine 11 is not reduced. The ECU 15 sets the target retard $P_O$ to 0, thus not retarding the ignition timing P in a step Q12, and then sets the duty ratio of the torque control solenoid-operated valves 51, 56 to 0%, allowing the engine 11 to produce a drive torque depending on the depression by the driver of the accelerator pedal 31.

Although certain preferred embodiments have been shown and described, it should be understood that many changes and modifications may be made therein without departing from the scope of the appended claims.

What is claimed is:

1. A system for controlling the output power of a motor vehicle having an engine, comprising:
    operation means to be operated by the driver of the motor vehicle for controlling the drive torque produced by the engine;
    torque control means for controlling the drive torque produced by the engine independently of said operation means operated by the driver of the motor vehicle;
    target drive torque calculating means for calculating a target drive torque depending on a lateral acceleration of the motor vehicle;
    operation amount detecting means for detecting an operated amount of said operation means for controlling the drive torque;
    demanded drive torque calculating means for calculating a demanded drive torque based on said operated amount;
    turn torque calculating means for adding said target drive torque and said demanded drive torque at a predetermined ratio to determine a turn target drive torque;
    selecting means for selecting said turn target drive torque as a final target drive torque; and
    electronic control means for controlling said torque control means to equalize the drive torque produced by the engine to said final target drive torque.

2. A system according to claim 1, further including a steering angle sensor for detecting an angle through which a steering shaft of the motor vehicle has turned, and a vehicle speed sensor for detecting a speed at which the motor vehicle runs, said target drive torque calculating means comprising means for calculating the lateral acceleration of the motor vehicle based on detected signals from said steering angle sensor and said vehicle speed sensor.

3. A system according to claim 1, further including an engine speed sensor for detecting a rotational speed of the engine, said operation means operated by the driver of the motor vehicle to control the drive torque by an acceleration pedal, and said demanded drive torque calculating means comprising means for calculating the demanded drive torque based on the rotational speed of the engine detected by said engine speed sensor and a depressed amount of said acceleration pedal detected by said operation amount detecting means.

4. A system according to claim 1, where said turn torque calculating means comprises means for determining the target drive torque depending on the lateral acceleration of the motor vehicle and the demanded drive torque, and means for varying said predetermined ratio with time after the output power of the motor vehicle has started to be controlled.

5. A system according to claim 1, where said turn torque calculating means comprises means for determining said turn target drive torque depending on the lateral acceleration of the motor vehicle and the demanded drive torque, and means for reducing the proportion of said turn target drive torque with time after the output power of the motor vehicle has started to be controlled, and increasing the proportion of said demanded drive torque with time after the output power of the motor vehicle has started to be controlled.

6. A system according to claim 1, further including steering amount calculating means for calculating an amount by which the motor vehicle is steered, said turn torque calculating means comprising means for determining said turn target drive torque depending on the lateral acceleration of the motor vehicle and the demanded drive torque, and means for varying said predetermined ratio with said amount.

7. A system according to claim 1, further including steering amount calculating means for calculating an amount by which the motor vehicle is steered, said turn torque calculating means comprising means for determining said turn target drive torque depending on the lateral acceleration of the motor vehicle and the demanded drive torque, and means for varying said predetermined ratio such that the proportion of said turn target drive torque increases as said amount increases.

8. A system according to claim 1, further including an engine speed sensor for detecting a rotational speed of the engine, said operation means operated by the driver of the motor vehicle to control the drive torque by an accelerator pedal and said demanded drive torque calculating means comprising means for detecting an undepressed accelerator position based on a depressed amount of said accelerator pedal detected by said operation amount detecting means and means for determining the demanded drive torque based on a rotational speed of the engine detected by said engine speed sensor.

9. A system according to claim 8, further including an ignition key switch for detecting when the engine is started, an idling switching for detecting when the engine is idling, and a timer for starting to count a fixed period of time when said ignition key switch is turned off, said demanded drive torque calculating means comprising means for detecting a minimum valve of said depressed amount detected by said operation amount detecting means and regarding said minimum value as the undepressed accelerator position of said operation amount detecting means while said idling switch is being turned on and said timer is counting said fixed period of time.

10. A system according to claim 9, wherein said demanded drive torque calculating means comprises means for clipping said minimum value with upper and lower clip values, and means for comparing the clipped minimum value with a value corresponding to a previous undepressed accelerator position and establishing a value corresponding to an undepressed accelerator position by shifting said value toward said minimum value, as a value corresponding to a present undepressed accelerator position by a predetermined value.

11. A system according to claim 1, further including slip torque calculating means for calculating a slip control target drive torque depending on an amount of slip of drive wheels of the motor vehicle, and said selecting means comprising means for selecting a smaller one of said turn target drive torque and said slip control target drive torque as said final target drive torque.

12. A system according to claim 1, further including slip torque calculating means for calculating a slip control target drive torque depending on an amount of slip of drive wheels of the motor vehicle, said turn torque calculating means comprising means for calculating turn target drive torques for a plurality of roads having different coefficients of friction, and said selecting means comprising means for selecting each of said turn target drive torques and said slip control target drive torques, successively from a smaller one, as said final target drive torque.

13. A method for controlling the output power of a motor vehicle having an engine, comprising the steps of:
(a) controlling the drive torque produced from the engine by the driver of the motor vehicle;
(b) controlling the drive torque produced from the engine independently of the controlling at said step (a) by the driver of the motor vehicle;
(c) calculating a target drive torque depending on a lateral acceleration of the motor vehicle;
(d) detecting an operated amount for controlling the drive torque of said step (a);
(e) calculating a demanded drive torque based on said operated amount;
(f) adding said target drive torque and said demanded drive torque at a predetermined ratio to determine a turn target drive torque;
(g) selecting said turn target drive torque as a final target drive torque; and
(h) equalizing the drive torque produced by the engine to said final target drive torque by controlling said drive torque at step (b).

14. A method according to claim 13, further comprising the steps of:
detecting the angle through which a steering shaft of the motor vehicle has turned by a steering angle sensor; and
detecting a speed at which the motor vehicle runs by a vehicle speed sensor;
said step (c) further including the step of calculating the lateral acceleration of the motor vehicle based on detected signals from said steering angle sensor and said vehicle speed sensor.

15. A method according to claim 13, further comprising the step of detecting a rotation speed of the engine by an engine speed sensor;
said step (a) further including the step of controlling the drive torque by the driver of the motor vehicle with an acceleration pedal;
said step (e) further including the step of calculating the demanded drive torque based on the rotational speed of the engine detected by said engine speed sensor and a depressed amount of said acceleration pedal detected at said step (d).

16. A method according to claim 13, wherein said step (f) further includes the steps of:
determining said turn target drive torque depending on the lateral acceleration of the motor vehicle and the demanded drive torque; and
varying said predetermined ratio with time after the output power of the motor vehicle has started to be controlled.

17. A method according to claim 13, wherein said step (f) further includes the steps of:
determining said turn target drive torque depending on the lateral acceleration of the motor vehicle and the demanded drive torque;
reducing the proportion of said turn target drive torque with time after the output power of the motor vehicle has started to be controlled; and
increasing the proportion of said demanded drive torque with time after the output power of the motor vehicle has started to be controlled.

18. A method according to claim 13, further comprising the step of calculating an amount by which the motor vehicle is steered;
said step (f) further includes the steps of,
determining said turn target drive torque depending on the lateral acceleration of the motor vehicle and the demanded drive torque, and
varying said predetermined ratio with said amount.

19. A method according to claim 13, further comprising the step of calculating an amount by which the motor vehicle is steered;
said step (f) further includes the steps of,
determining said turn target drive torque depending on the lateral acceleration of the motor vehicle and the demanded drive torque, and
varying said predetermined ratio such that the proportion of said turn target drive torque increases as said amount increases.

20. A method according to claim 13, further comprising the step of detecting a rotational speed of the engine by an engine speed sensor;
said step (a) further including the step of controlling the drive torque by the driver of the motor vehicle with an accelerator pedal;
said step (e) further including the steps of,
detecting an undepressed accelerator position based on a depressed amount of said accelerator pedal detected at said step (d), and
determining the demanded drive torque based on a rotation speed of the engine detected by said engine speed sensor.

21. A method according to claim 20, further comprising the steps of:
- detecting when the engine is started by an ignition key switch;
- detecting when the engine is idling by an idling switch;
- starting to count a fixed period of time by a timer when said ignition key switch is turned off;
- said step (e) further including the step of detecting a minimum value of said depressed amount detected at said step (d), and regarding said minimum value as the undepressed accelerator position at said step (d) while said idling switch is being turned on and said timer is counting said fixed period of time.

22. A method according to claim 21, wherein said step (e) further includes the steps of,
- clipping said minimum value with upper and lower clip values,
- comparing the clipped minimum value with a value corresponding to a previous undepressed accelerator position, and
- establishing a value corresponding to an undepressed accelerator position by shifting said value toward said minimum value by a predetermined value as a value corresponding to a present undepressed accelerator position.

23. A method according to claim 13, further comprising the step of calculating a slip control target drive torque depending on an amount of slip of drive wheels of the motor vehicle;
- said step (g) further including the step of selecting a smaller one of said turn target drive torque and said slip control target drive torque as said final target drive torque.

24. A method according to claim 13, further comprising the step of calculating a slip control target drive torque depending on an amount of slip of drive wheels of the motor vehicle;
- said step (f) further including the step of calculating turn target drive torques for a plurality of roads having different coefficients of friction;
- said step (g) further including the step of selecting each of said turn target drive torques and said slip control target drive torques, successively from a smaller one, as said final target drive torque.

* * * * *